United States Patent
Kawasaki et al.

(10) Patent No.: US 8,149,677 B2
(45) Date of Patent: Apr. 3, 2012

(54) OPTICAL PICKUP UNIT AND OPTICAL DISK APPARATUS HAVING A PHASE-DIFFERING PERIODIC STRUCTURE

(75) Inventors: Ryoichi Kawasaki, Isesaki (JP); Yoshitaka Hotta, Chofu (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 1126 days.

(21) Appl. No.: 11/549,921

(22) Filed: Oct. 16, 2006

(65) Prior Publication Data
US 2009/0022032 A1 Jan. 22, 2009

(30) Foreign Application Priority Data

Oct. 17, 2005 (JP) ................................ 2005-301588
May 18, 2006 (JP) ................................ 2006-138953

(51) Int. Cl.
G11B 7/135 (2012.01)
G11B 7/00 (2006.01)

(52) U.S. Cl. ................. 369/112.07; 369/44.41

(58) Field of Classification Search . 369/112.03–112.15
See application file for complete search history.

(56) References Cited

U.S. PATENT DOCUMENTS

| 5,754,503 A | 5/1998 | Senba et al. |
| 6,137,752 A | 10/2000 | Sakai |
| 2002/0163874 A1* | 11/2002 | Nakanishi et al. ........ 369/112.04 |
| 2003/0012092 A1* | 1/2003 | Katayama .................. 369/44.23 |
| 2004/0081064 A1* | 4/2004 | Ohnishi et al. ................ 369/125 |
| 2005/0030877 A1* | 2/2005 | Horiyama ................ 369/112.06 |
| 2005/0276206 A1* | 12/2005 | Katayama ................ 369/112.03 |
| 2006/0158989 A1* | 7/2006 | Kim et al. ................ 369/112.01 |
| 2007/0053270 A1* | 3/2007 | Ueyama et al. .......... 369/112.06 |
| 2007/0133374 A1* | 6/2007 | Arai ........................ 369/112.05 |

FOREIGN PATENT DOCUMENTS

| CN | 1215206 A | 4/1999 |
| CN | 1485831 | 3/2004 |
| JP | 9-81942 | 3/1997 |
| JP | 2004086957 | 3/2004 |
| JP | 2004-145915 | 5/2004 |
| JP | 2005353187 | 12/2005 |
| JP | 2007035193 | 2/2007 |

OTHER PUBLICATIONS

Office Action with English translation from Chinese Patent Application 2006101362965 dated Jan. 9, 2009.
Japanese Office Action for Application No. 200610136296.5, mailed Oct. 28, 2010 (w/English Translation), 11 pgs.
Japanese Office Action dated Feb. 1, 2011, for Application No. 2006-138953, (6 pages).

* cited by examiner

Primary Examiner — Nathan Danielsen
(74) Attorney, Agent, or Firm — Fish & Richardson P.C.

(57) ABSTRACT

An optical pickup unit comprises a diffraction grating that divides light into at least three luminous fluxes and condenses the three luminous fluxes to apply at least three focusing spots, independent of each other, onto a signal side of a medium. The diffraction grating is divided into at least four regions, a first region, a second region, a third region, and a fourth region.

18 Claims, 23 Drawing Sheets

--PRIOR ART--

--PRIOR ART--

--PRIOR ART--

--PRIOR ART--

OPTICAL PICKUP UNIT AND OPTICAL DISK APPARATUS HAVING A PHASE-DIFFERING PERIODIC STRUCTURE

CROSS-REFERENCE TO RELATED APPLICATIONS

This application claims priority from Japanese Patent Application No. 2005-301588, filed Oct. 17, 2005, and Japanese Patent Application No. 2006-138953, filed May 18, 2006, which is herein incorporated by reference.

BACKGROUND OF THE INVENTION

1. Field of the Invention

The present invention relates to an optical pickup unit and an optical disk apparatus that are capable of reproducing data recorded on media such as various types of optical disks and of recording data on media such as various types of optical disks.

2. Description of the Related Art

FIGS. 16 to 23 relate to a conventional optical pickup unit and a conventional optical disk apparatus.

With the use of an optical disk apparatus equipped with an optical pickup unit, optical signals are read out from an optical disk or written onto the optical disk. Within the optical disk apparatus equipped with the optical pickup unit, in order for a focusing spot to be correctly applied on a predetermined track of the optical disk, a tracking control is performed by detecting a tracking error indicative of deviation of the focusing spot relative to a desired track and adjusting a position of an objective lens based on such tracking error. The tracking by the optical pickup unit means the operation of following the fluctuation in the radial direction of the optical disk so that the focusing spot is always located on a target track. A tracking error detection method can be, e.g., a differential push-pull method (DPP method) using three beams.

Media such as optical disks can be, e.g., a DVD (Digital Versatile Disk (registered trademark). Media means objects for recording and conveying information on and through or the like. DVD can be, e.g., DVD-R (Recordable), DVD-RW (Re-writable), DVD-RAN (Random Access Memory), etc. A track pitch of DVD-R or CVD-RW is about 0.74 μm (micron), while that of DVD-RAM (versions 2.0, 2.1) is about 0.615 μm (micron). As seen, the tracking pitch differs between DVD-R or DVD-RW and DVD-RAM.

In the optical pickup unit and the optical disk apparatus with the tracking detection method being the DPP method, in the case of using an optical disk with a predetermined track pitch, no "phase difference" occurs between a leading sub-push-pull (leading sub-PP) signal and a trailing sub-push-pull (trailing sub-PP) signal, as shown in FIG. 16. If a "phase difference" occurs between the leading sub-push-pull (leading sub-PP) signal and the trailing sub-push-pull (trailing sub-PP) signal, such a "phase difference" is called, for example, a tracking error phase difference (TE phase difference).

For example, if the amount of the TE phase difference and the amount of eccentricity of the optical disk are both small, a tracking error signal (TE signal) of such a waveform as shown in FIG. 17 is obtained. When the TE signal of the waveform shown in FIG. 17 is observed, the performance of recording or reproducing onto or from the optical disk is not adversely affected and an almost stabilized tracking servo function works, while the tracking error detection is being performed at the optical pickup unit.

In the optical pickup unit and the optical disk apparatus with the tracking detection method being the DPP method, in the case of using an optical disk with another than the predetermined track pitch, a "phase difference" occurs between the leading sub-push-pull (leading sub-PP) signal and the trailing sub-push-pull (trailing sub-PP) signal, as shown in FIG. 18. Namely, the TE phase difference occurs between the leading sub-push-pull (leading sub-PP) signal and the trailing sub-push-pull (trailing sub-PP) signal.

When the TE phase difference occurs, the amplitude level and the signal quality of the TE signal deteriorate and the performance can be affected of recording or reproducing onto or from the optical disk. When the amount of the eccentricity of the optical disk is big, this effect becomes conspicuous, the operation of the tracking servo becomes destabilized, and the basic operation of the optical pickup unit can be adversely affected.

For example, when the amount of the TE phase difference is big and the amount of eccentricity of the optical disk is considerable, the TE signal of such a waveform as shown in FIG. 19 is obtained. When the TE signal waveform has, for example, a significantly shrunk part as shown in FIG. 19, the TE signal level comes to be considerably reduced due to the eccentricity of the optical disk, etc., and in the worst case, the tracking servo could possibly fail. Therefore, the amount of the TE phase difference should preferably be suppressed to be as small as possible.

Recently, there has been an increasing demand for the optical pickup unit or the optical disk apparatus capable of recording and reproducing data onto or from plural kinds of the optical disks with different track pitches. To respond to such a demand, for example, the unit or apparatus was proposed that was capable of performing the tracking control by detecting the tracking error in a manner not dependent on the track pitch.

Proposed, for example, was a tracking error detecting apparatus for an optical head that is capable of suppressing the offset caused by translational motion of an objective lens or inclination of an information recording medium while maintaining the amplitude of the tracking error signal at a maximum level even if the track pitch of the information recording medium varies and moreover of which the optical system is simple.

Such a conventional apparatus is disclosed in, for example, Japanese Patent Application Laid-Open Publication No. H09-81942 (pp. 1, 3, and FIGS. 1 to 7).

Into the tracking error detecting apparatus for the optical head described in the above-referenced patent application, the introduction is made of what resembles a diffraction grating 80 shown in FIG. 20. The diffraction grating 80 has phase shift regions 81 and 82 (FIG. 21) that cause a phase shift of n radian in part of laser light applied from a laser diode. The diffraction grating 80 (FIG. 20) is divided into two regions, the substantially rectangular first region 81 and the substantially rectangular second region 82 adjacent to the first region 81. A predetermined periodic structure is built within each of regions 81 and 82.

For example, the optical pickup and the optical information recording apparatus or reproducing apparatus utilizing the optical pickup were proposed which pickup, while retaining advantages of a new tracking error signal detection method (in-line DPP method), alleviated the problem of field characteristic deterioration of the tracking error signal which problem is the greatest with the in-line DPP method, was less dependent on differences in track pitch between disks and on displacement of the objective lens in a tracking direction, and was capable of outputting a practical tracking error signal with the tracking offset sufficiently reduced for any of plural kinds of optical disks of different pitches.

Such a conventional apparatus is disclosed in, for example, Japanese Patent Application Laid-Open Publication No. 2004-145915 (pp. 5-6, FIGS. 1, 7 to 22).

The field characteristic is characterized as the degree of deterioration of the tracking error signal due to a displacement in the tracking direction of the objective lens relative to the disk.

In the optical pickup and the optical information recording or reproducing apparatus utilizing the optical pickup described in the above-identified patent application, the introduction is made of what resembles a diffraction grating 90 shown in FIG. 22. The diffraction grating 90 has phase shift regions 91 and 93 that cause a phase shift of n radian in part of the laser light applied from the laser diode (FIG. 23). The diffraction grating 90 (FIG. 22) is divided into three regions, a substantially rectangular first region 91, a short-width second region 92 adjacent to the first region 91 and a substantially rectangular third region 93 adjacent to the second region 92. A predetermined periodic structure is built within each of regions 91, 92, and 93.

However, the optical pickup unit, and optical disk apparatus, equipped with the conventional diffraction grating 80 (FIG. 20) and the optical pickup unit, and optical disk apparatus, equipped with the conventional diffraction grating 90 (FIG. 22) were not considered to demonstrate entirely satisfactory performance.

Among the tracking characteristics of the optical pickup unit, the field characteristic is considered to be an important characteristic. However, the field characteristic and the tracking error phase difference characteristic are, in terms of performance, in a relationship of tradeoff. Here, the tradeoff means the relationship in which a plurality of conditions can not be met at the same time.

In the optical pickup unit equipped with the conventional a 3-division-type diffraction grating 90 (FIG. 22), the field characteristic or the tracking error phase difference characteristic can be changed only by the width 90$w$ of a center division part 90$m$ of the three-division-type diffraction grating 90. For this reason, both of the satisfactory field characteristic and tracking error phase difference characteristic was not necessarily realized, both of which are necessary for the drive side of the optical disk apparatus.

As shown in FIG. 22, the three-division-type diffraction grating 90 does not have a borderline for equally dividing the diffraction grating 90 in plan view. The borderline for equally dividing the diffraction grating is used, for example, as a positioning centerline for fixing the diffraction grating, while accurately adjusting its positioning, in a housing of the optical pickup unit. With no positioning centerline provided in the diffraction grating 90, it was difficult to accurately mount the diffraction grating 90 in the housing of optical pickup unit, using an optical axis adjusting camera (not shown). If the diffraction grating 90 is not accurately mounted in the housing of the optical pickup unit, the focusing spot may not accurately be applied and formed on the optical disk.

Recently, there has been a demand from the market for a single, high-grade optical pickup unit that is easy to perform the tracking control, and the optical disk apparatus equipped with the single, high-grade optical pickup unit that is easy to perform the tracking control in order that they can handle without difficulty plural kinds of optical disks having different track pitches, such as DVD-R, DVD-RW, DVD-RAM, etc.

For example, there is a market demand for the optical pickup unit that has no deterioration of the amplitude of the tracking error signal due to the displacement of the objective lens, or for the optical pickup unit that prevents an offset from remaining in the tracking error signal at the time of recording or reproducing data onto or from plural kinds of optical disks having different track pitches.

For example, there is a market demand for the optical pickup unit that can demonstrate optimum characteristics where the optical pickup unit is utilized. For example, the optical pickup unit used for optical disk apparatuses for notebook-type or laptop-type personal computers utilizes a small objective lens.

Personal computers (PCs) will now be described. A notebook-type or laptop-type PC, in view of the demand for ones of a lighter weight and a smaller thickness, is structured to house the optical disk apparatus equipped with a slim drive. The notebook-type PC or the laptop-type PC has its display and PC body structured as one unit, and by folding its display back toward the PC body, becomes of a thin size. The notebook-type PC is, for example, a general-use PC of a substantially A4 size or a smaller size as viewed in plan and is also called a book-type PC. The notebook-type PC or the laptop-type PC is characterized as a compact and easy-to-carry PC.

With the notebook-type PC and the laptop-type PC becoming smaller and thinner, the optical disk apparatus is becoming smaller and thinner. With the optical disk apparatus becoming smaller and thinner, the optical pickup unit is becoming smaller and thinner. With the optical pickup unit becoming smaller and thinner, the objective lens mounted in the optical pickup unit is becoming smaller and thinner. Since a small objective lens is considered to be disadvantageous in respect of the field characteristic, much importance is attached mainly to the field characteristic, in the case of the small objective lens. Accordingly, in designing of the optical pickup unit equipped with the small objective lens, much importance is attached mainly to the field characteristic.

For example, in the optical pickup unit used for the optical disk apparatus for the desktop-type PC, the field characteristic is considered to be important, but at the same time, more importance may be attached mainly to a sub-push-pull signal amplitude level characteristic (sub-PP signal amplitude level characteristic) and a tracking error phase difference characteristic (TE phase difference characteristic), than to the field characteristic. A desktop computer is a computer that can be used on desk, and is of the type that is not easy to carry.

Because the optical pickup unit used for the optical disk apparatus for the desktop-type PC has a large objective lens, the tendency exists that in designing, more importance is attached mainly to the sub-PP signal amplitude level characteristic and the TE phase difference characteristic, than to the field characteristic. As such, an optical pickup unit is in demand that can readily demonstrate optimum characteristics corresponding to the specifications, etc., of the optical disk apparatus on which the optical pickup unit is mounted.

SUMMARY OF THE INVENTION

It is therefore an object of the present invention to provide an optical pickup unit and optical disk apparatus that is easy to perform tracking control.

In order to solve the above problem, according to an aspect of the present invention there is provided an optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region.

With this configuration, tracking of the optical pickup unit is likely to be well performed for the signal side of the medium. Media means objects for recording and conveying information on and through or objects for recording and transmitting information on and through. The tracking of the optical pickup unit means the operation of following the fluctuation in the radial direction of a medium so that the focusing spot is always located on a target track. With the diffraction grating configured to have 4 divided regions, at least 3 focusing spots, independent of each other, are applied onto the signal side of the medium. Since at least 3 focusing spots are applied independently of each other onto the signal side of the medium, a tracking error signal (TE signal) is easily prevented from deteriorating at the times of recording on or reproducing from plural kinds of media having different track pitches. The optical pickup unit easy to perform tracking control can thus be provided.

In the optical pickup unit of the present invention, the diffraction grating may include one regional part having the first region and the second region adjacent to the first region, and the other regional part having the third region and the fourth region adjacent to the third region, and the diffraction grating may be divided into two equal parts, the one regional part and the other regional part, by a border between the second region and the third region adjacent to the second region.

With this configuration, the focusing spots on the signal side of a medium are formed as accurate focusing spots. Since a border between the second region of the diffraction grating and the third region adjacent to the second region divides the diffraction grating into two equal parts, one regional part having the first region and the second region adjacent to the first region and the other regional part having the third region and the fourth region adjacent to the third region, light applied to the diffraction grating at the time of mounting the diffraction grating in the optical pickup unit is easily applied so as to be substantially equally divided into two parts respectively on one regional part and the other regional part of the diffraction grating. Because the light is easily applied so as to be substantially equally divided into two parts respectively on one regional part of the diffraction grating and the other regional part of the diffraction grating, the diffraction grating can very likely be accurately mounted in the optical pickup unit. Therefore, the focusing spot is likely to be accurately formed on the signal side of a medium. Accordingly, accurate tracking of the optical pickup unit can be easily performed for the signal side of the medium.

In the optical pickup unit of the present invention, a periodic structure of the third region may be a periodic structure having a phase differing 3 to 180 degrees from that of a periodic structure of the second region.

With this configuration, the focusing spots on the signal side of a medium are easily formed as focusing spots having greater accuracy. Since the periodic structure of the third region of the diffraction grating has a phase differing 3 to 180 degrees from that of the periodic structure of the second region of the diffraction grating, the border is substantially clarified between the second region of the diffraction grating and the third region of the diffraction grating adjacent to the second region. When the periodic structure of the third region of the diffraction grating has a phase differing by less than 3 degrees from that of the periodic structure of the second region of the diffraction grating, the border is not clarified between the second region and the third region. When the periodic structure of the third region has a phase differing 180 degrees from that of the periodic structure of the second region, the border is most clarified between the second region and the third region. When the periodic structure of the third region has a phase differing 3 to 90 degrees from that of the periodic structure of the second region, the diffraction grating is formed that has the border clarified between the second and third regions and has proper properties. Since the border between the second region of the diffraction grating and the third region of the diffraction grating is substantially clarified, the border is clarified between one regional part of the diffraction grating having the first region and the second region adjacent to the first region and the other regional part of the diffraction grating having the third region and the fourth region adjacent to the third region. Therefore, light is applied so as to be substantially equally divided into two parts respectively on one regional part of the diffraction grating and the other regional part of the diffraction grating. When the light is applied so as to be substantially equally divided into two parts respectively on one regional part of the diffraction grating and the other regional part of the diffraction grating, the diffraction grating is accurately mounted in the optical pickup unit.

In the optical pickup unit of the present invention, the second region and the third region may be disposed between the first region and the fourth region; a periodic structure of the second region may be a periodic structure having a phase different from that of a periodic structure of the first region; a periodic structure of the third region may be a periodic structure having a phase different from that of the periodic structure of the second region; a periodic structure of the fourth region may be a periodic structure having a phase different from that of the periodic structure of the third region; and the periodic structure of the fourth region may be a periodic structure having a phase differing about 180 degrees from that of the periodic structure of the first region.

This configuration makes it possible to distinguish the first region, the second region, the third region, and the forth region of the diffraction grating from each other and at the same time, clarify the phase difference between the first region and the fourth region of the diffraction grating. Since the periodic structure of the fourth region of the diffraction grating has a phase differing about 180 degrees from that of the periodic structure of the first region of the diffraction grating, at least 3 focusing spots are formed well on the signal side of a medium. By forming at least 3 focusing spots well on the signal side of the medium, the tracking error signal is easily prevented from deteriorating at the times of recording on or reproducing from plural kinds of media with different track pitches.

In the optical pickup unit of the present invention, the second region and the third region may be disposed between the first region and the fourth region; a periodic structure of the second region may be a periodic structure having a phase differing 30 to 180 degrees from that of a periodic structure of the first region; a periodic structure of the third region may be a periodic structure having a phase differing 3 to 180 degrees from that of the periodic structure of the second region; and a periodic structure of the fourth region may be a periodic structure having a phase differing 30 to 180 degrees from that of the periodic structure of the third region.

With this configuration, the first region, the second region, the third region, and the fourth region of the diffraction grating are substantially clearly distinguished. Since the periodic structure of the second region of the diffraction grating has a phase differing 30 to 180 degrees from that of the periodic structure of the first region of the diffraction grating, the first region of the diffraction grating and the second region of the diffraction grating are clearly distinguished. Since the periodic structure of the third region of the diffraction grating has a phase differing 3 to 180 degrees from that of the periodic structure of the second region of the diffraction grating, the second region of the diffraction grating and the third region of the diffraction grating are substantially distinguished. Since the periodic structure of the fourth region of the diffraction grating has a phase differing 30 to 180 degrees from that of the periodic structure of the third region of the diffraction grating, the third region of the diffraction grating and the fourth region of the diffraction grating are clearly distinguished. By dividing the diffraction grating into four regions and distinguishing the four regions from each other, at least three focusing spots, independent of each other, are applied on the signal side of the medium. Since at least three focusing spots are applied, independently of each other, on the signal side of the medium, the tracking of the optical pickup unit can be easily performed for the signal side of the medium. By appropriately setting the phase of the periodic structure of each region to be within a determined numerical range, degrees of freedom in designing of the diffraction grating increase and degrees of freedom in designing of the optical pickup unit also increase. Therefore, the optical pickup unit is configured that can easily exhibit optimum performance corresponding to the location where it is used.

In the optical pickup unit of the present invention, the diffraction grating may be formed in a substantially rectangular sheet shape; in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side. And in viewing the diffraction grating in plan, a periodic structure of the second region adjacent to the first region at its right side is a periodic structure having a phase shifted to the plus side relative to that of a periodic structure of the first region; a periodic structure of the third region adjacent to the second region at its right side is a periodic structure having a phase shifted to the plus side relative to that of the periodic structure of the second region and a periodic structure of the fourth region adjacent to the third region at its right side is a periodic structure having a phase shifted to the plus side relative to that of the periodic structure of the third region.

With this configuration, a sub-push-pull signal amplitude level increases and sub-push-pull signal amplitude level characteristic easily improves. The sub-push-pull signal amplitude level is prevented from decreasing and the sub-push-pull signal amplitude level characteristic is prevented from lowering. At least three focusing spots formed on the signal side of the medium include a main spot and a pair of sub-spots sandwiching the main spot. The sub-push-pull signal amplitude level that is considered to be a signal amplitude level associated with the main spot and the sub-spots is defined as follows;

$$\text{Sub-push-pull signal amplitude level (\%)} = (\text{Sub-push-pull signal amplitude value/Main-push-pull signal amplitude value}) \times 100 \qquad (1)$$

The amount of the tracking error phase difference decreases and the tracking error phase difference characteristic easily improves. The amount of the tracking error phase difference is prevented from increasing and the tracking error phase difference characteristic is prevented from lowering.

In the optical pickup unit of the present invention, the diffraction grating may be formed in a substantially rectangular sheet shape; in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side. And in viewing the diffraction grating in plan, a periodic structure of the second region adjacent to the first region at its right side is a periodic structure having a phase shifted to the minus side relative to that of a periodic structure of the first region; a periodic structure of the third region adjacent to the second region at its right side is a periodic structure having a phase shifted to the minus side relative to that of the periodic structure of the second region; and a periodic structure of the fourth region adjacent to the third region at its right side is a periodic structure having a phase shifted to the minus side relative to that of the periodic structure of the third region.

With this configuration, the sub-push-pull signal amplitude level increases and the sub-push-pull signal amplitude level characteristic easily improves. The sub-push-pull signal amplitude level is prevented from decreasing and the sub-push-pull signal amplitude level characteristic is prevented from lowering. The amount of the tracking error phase difference decreases and the tracking error phase difference characteristic easily improves. The amount of the tracking error phase difference is prevented from increasing and the tracking error phase difference characteristic is prevented from lowering.

In the optical pickup unit of the present invention, the second region and the third region may be disposed between the first region and the fourth region; a periodic structure of the second region may be a periodic structure having a phase differing about 75 degrees from that of a periodic structure of the first region; a periodic structure of the third region may be a periodic structure having a phase differing about 30 degrees from that of the periodic structure of the second region; and a periodic structure of the fourth region may be a periodic structure having a phase differing about 75 degrees from that of the periodic structure of the third region.

With this configuration, the sub-push-pull signal amplitude level increases and the sub-push-pull signal amplitude level characteristic improves. The sub-push-pull signal amplitude level is prevented from decreasing and the sub-push-pull signal amplitude level characteristic is prevented from lowering. The sub-push-pull signal amplitude level characteristic of this optical pickup unit is better than the signal amplitude level characteristic of the optical pickup unit equipped with the conventional diffraction grating that is divided into three phase regions. The amount of the tracking error phase difference decreases and the tracking error phase difference characteristic improves. The amount of the tracking error phase difference is prevented from increasing and the tracking error phase difference characteristic is prevented from lowering. The tracking error phase difference characteristic of this optical pickup unit is better than the tracking error phase difference characteristic of the optical pickup unit equipped with the conventional diffraction grating that is divided into three phase regions.

In the optical pickup unit of the present invention, the second region and the third region may be disposed between the first region and the fourth region; a periodic structure of the second region may be a periodic structure having a phase differing about 60 degrees from that of a periodic structure of the first region; a periodic structure of the third region may be a periodic structure having a phase differing about 60 degrees from that of the periodic structure of the second region; and a periodic structure of the fourth region may be a periodic structure having a phase differing about 60 degrees from that of the periodic structure of the third region.

With this configuration, the sub-push-pull signal amplitude level increases and the sub-push-pull signal amplitude level characteristic considerably improves. The sub-push-pull signal amplitude level is prevented from decreasing and the sub-push-pull signal amplitude level characteristic is prevented from lowering. The sub-push-pull signal amplitude level characteristic of this optical pickup unit improves greatly over the signal amplitude level characteristic of the optical pickup unit equipped with the conventional diffraction grating that is divided into three phase regions. The amount of the tracking error phase difference decreases and the tracking error phase difference characteristic considerably improves. The amount of the tracking error phase difference is prevented from increasing and the tracking error phase difference characteristic is prevented from lowering. The tracking error phase difference characteristic of this optical pickup unit improves greatly over the tracking error phase difference characteristic of the optical pickup unit equipped with the conventional diffraction grating that is divided into three phase regions.

In the optical pickup unit of the present invention, the diffraction grating may be formed in a substantially rectangular sheet shape; in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side. And in viewing the diffraction grating in plan, a periodic structure of the second region adjacent to the first region at its right side is a periodic structure having a phase shifted to the plus side relative to that of a periodic structure of the first region; a periodic structure of the third region adjacent to the second region at its right side is a periodic structure having a phase shifted to the minus side relative to that of the periodic structure of the second region; and a periodic structure of the fourth region adjacent to the third region at its right side is a periodic structure having a phase shifted to the plus side relative to that of the periodic structure of the third region.

With this configuration, the tracking error amplitude level increases and the field characteristic easily improves. It is prevented that the tracking error amplitude level decreases and that the field characteristic lowers.

In the optical pickup unit of the present invention, the diffraction grating may be formed in a substantially rectangular sheet shape; in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side. And in viewing the diffraction grating in plan, a periodic structure of the second region adjacent to the first region at its right side is a periodic structure having a phase shifted to the minus side relative to that of a periodic structure of the first region; a periodic structure of the third region adjacent to the second region at its right side is a periodic structure having a phase shifted to the plus side relative to that of the periodic structure of the second region; and a periodic structure of the fourth region adjacent to the third region at its right side is a periodic structure having a phase shifted to the minus side relative to that of the periodic structure of the third region.

With this configuration, the tracking error amplitude level increases and the field characteristic easily improves. It is prevented that the tracking error amplitude level decreases and that the field characteristic lowers.

In the optical pickup unit of the present invention, the second region and the third region may be disposed between the first region and the fourth region; a periodic structure of the second region may be a periodic structure having a phase differing about 105 degrees from that of a periodic structure of the first region; a periodic structure of the third region may be a periodic structure having a phase differing about 30 degrees from that of the periodic structure of the second region; and a periodic structure of the fourth region may be a periodic structure having a phase differing about 105 degrees from that of the periodic structure of the third region.

With this configuration, the tracking error amplitude level increases and the field characteristic more easily improves. It is prevented that the tracking error amplitude level decreases and that the field characteristic lowers. The field characteristic of this optical pickup unit is better than the field characteristic of the optical pickup unit equipped with the conventional diffraction grating that is divided into three phase regions.

In the optical pickup unit of the present invention, the second region and the third region may be disposed between the first region and the fourth region; a periodic structure of the second region may be a periodic structure having a phase differing about 120 degrees from that of a periodic structure of the first region; a periodic structure of the third region may be a periodic structure having a phase differing about 60 degrees from that of the periodic structure of the second region; and a periodic structure of the fourth region may be a periodic structure having a phase differing about 120 degrees from that of the periodic structure of the third region.

With this configuration, the tracking error amplitude level increases and the field characteristic easily improve. It is prevented that the tracking error amplitude level decreases and that the field characteristic lowers. The field characteristic of this optical pickup unit improves greatly over the field characteristic of the optical pickup unit equipped with the conventional diffraction grating that is divided into three phase regions.

In the optical pickup unit of the present invention, the second region and the third region may be disposed between the first region and the fourth region; a periodic structure of the second region may be a periodic structure having a phase differing about 180 degrees from that of a periodic structure of the first region; a periodic structure of the third region may be a periodic structure having a phase differing about 180 degrees from that of the periodic structure of the second region; and a periodic structure of the fourth region may be a periodic structure having a phase differing about 180 degrees from that of the periodic structure of the third region.

With this configuration, for example, it is easily prevented that the amount of the tracking error phase difference considerably increases and that the tracking error phase difference characteristic considerably lowers.

The optical pickup unit of the present invention may comprise an objective lens that condenses the three luminous fluxes to apply the at least three focusing spots, independent of each other, onto a signal side of a medium; the second region and the third region may be disposed between the first region and the fourth region; a combined region of the second region and the third region may be a central part of the diffraction grating; and the width of the central part may be from 16 to 28% of the diameter of the light passing through a pupil of the objective lens.

With this configuration, the tracking error signal is easily prevented from lowering due to the displacement of the objective lens, at the times of the recording on or reproducing from plural kinds of media having different pitches. If, as compared with the diameter of the light passing through the pupil of the objective lens, the width of the center part of the diffraction grating is set to less than 16%, the tracking error amplitude level decreases and the field characteristic is likely to lower. If, as compared with the diameter of the light passing through the pupil of the objective lens, the width of the center part of the diffraction grating is set to greater than 28%, the sub-push-pull signal amplitude level decreases and the sub-push-pull signal amplitude level characteristic is likely to lower. Further, if, as compared with the diameter of the light passing through the pupil of the objective lens, the width of the center part of the diffraction grating is set to greater than 28%, the amount of the tracking error phase difference increases and the tracking error phase difference characteristics tend to lower. By setting the width of the center part of the diffraction grating to 16-28% of the diameter of the light passing through the pupil of the objective lens, the tracking error amplitude level, the sub-push-pull signal amplitude level, and the amount of the tracking error phase difference are easily set to proper values. For example, by setting the width of the center part of the diffraction grating to about 20% of the diameter of the light passing through the pupil of the objective lens, the tracking error amplitude level, the sub-push-pull signal amplitude level, and the amount of the tracking error phase difference are easily set to proper values. Since the tracking error amplitude level, the sub-push-pull signal amplitude level, and the amount of the tracking error phase difference are set to proper values, the tracking control of the optical pickup unit can easily be performed.

In the optical pickup unit of the present invention, the width of the second region or of the third region may be from 10 to 100 μm.

With this configuration, the tracking of the optical pickup unit is easily performed well for the signal side of the medium. The tracking error signal is easily prevented from deteriorating, at the times of recording or reproducing data on or from plural kinds of media of different pitches. If the width of the second region or the third region of the diffraction grating is made as small as less than 10 μm, or if the width of the second region or the third region of the diffraction grating is made as great as greater than 100 μm, the tracking error signal deteriorates, and accurate tracking of the optical pickup unit can not easily be performed. For example, by setting the width of the second region or the third region of the diffraction grating to about 30-80 μm, the tracking error signal is easily prevented from deteriorating. Therefore, accurate tracking of the optical pickup unit can easily be performed for the signal side of the medium.

The optical pickup unit of the present invention may comprise an objective lens that condenses the three luminous fluxes to apply the at least three focusing spots, independent of each other, onto the signal side of the medium, and a photodetector that receives reflected light of the three focusing spots from the medium.

With this configuration, the tracking of the optical pickup unit can accurately be performed for the signal side of the media. It is easily prevented that the amplitude of the tracking error signal deteriorates and that an offset remains in the tracking error signal due to the displacement of the objective lens, at the times of recording or reproducing data on or from plural kinds of media of different pitches.

An optical disk apparatus according to the present invention comprises the optical pickup unit of the present invention.

With this configuration, reading data from media and writing data onto media can properly be performed by the optical disk apparatus equipped with the optical pickup unit. When plural kinds of media of different pitches are inserted into the optical disk apparatus and data is read from the media or data is written onto the media, the tracking error signal is easily prevented from deteriorating. Therefore, the optical disk apparatus can be provided that is equipped with the optical pickup unit easy to perform the tracking control.

BRIEF DESCRIPTION OF THE DRAWINGS

For more thorough understanding of the present invention and advantages thereof, the following description should be referenced together with accompanying drawings.

DETAILED DESCRIPTION OF THE INVENTION

At least the following matters will become clearer from the description of this specification and accompanying drawings.

First Embodiment

Figure 1:
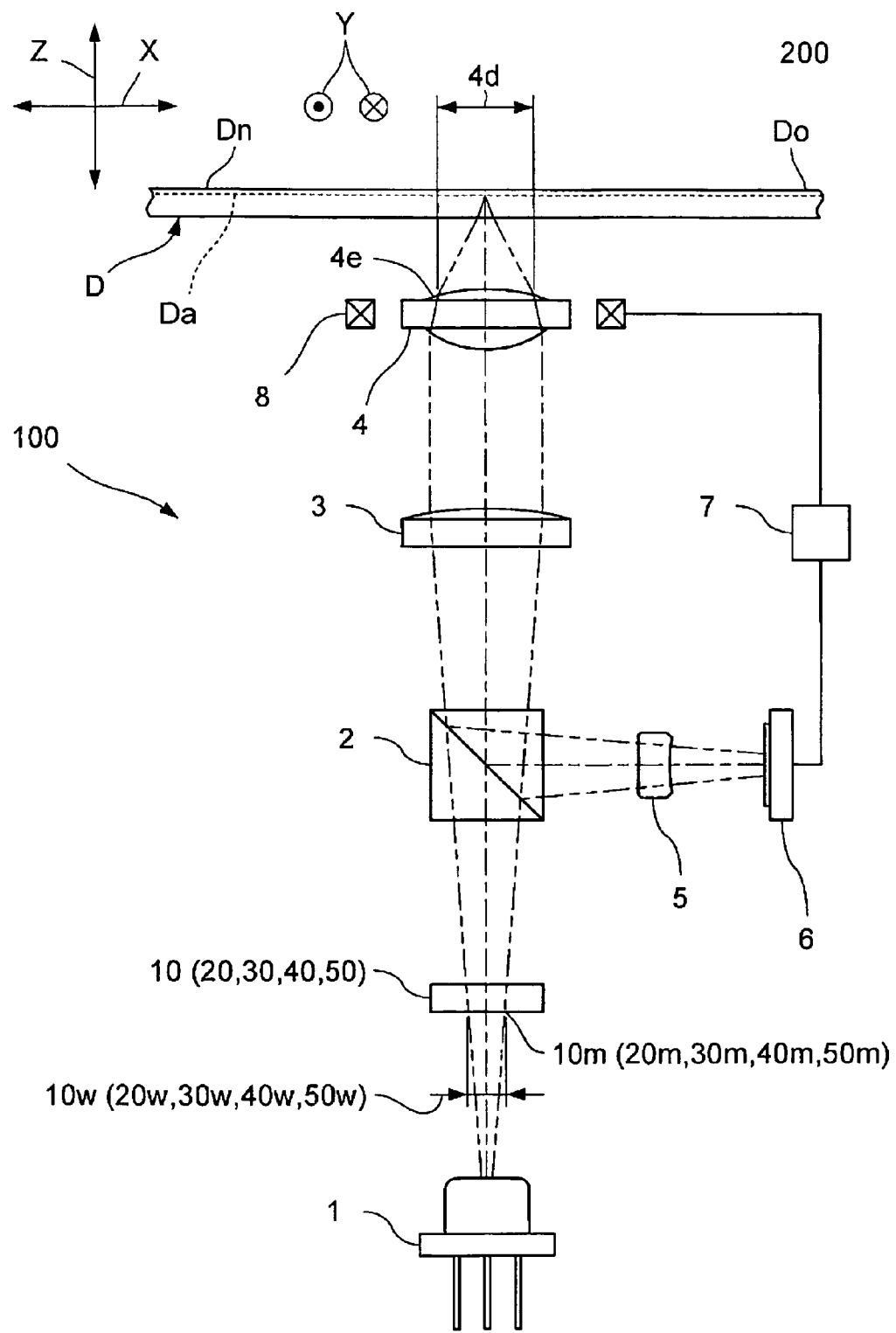
FIG. 1 is an explanatory diagram of a first embodiment of an optical pickup unit and optical disk apparatus according to the present invention.
Figure 2:
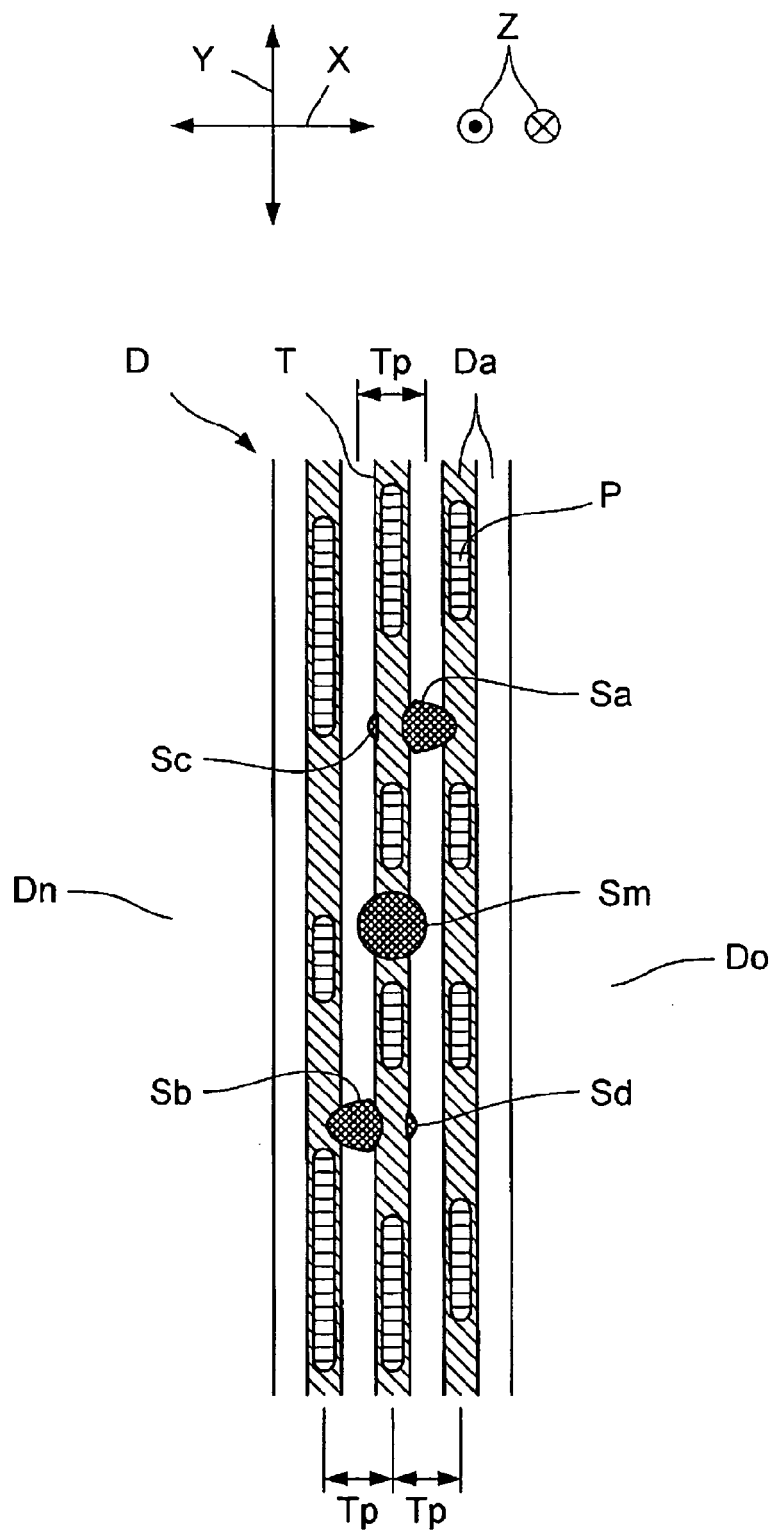
FIG. 2 is an explanatory diagram of focusing spots on a medium such as an optical disk.
Figure 3:
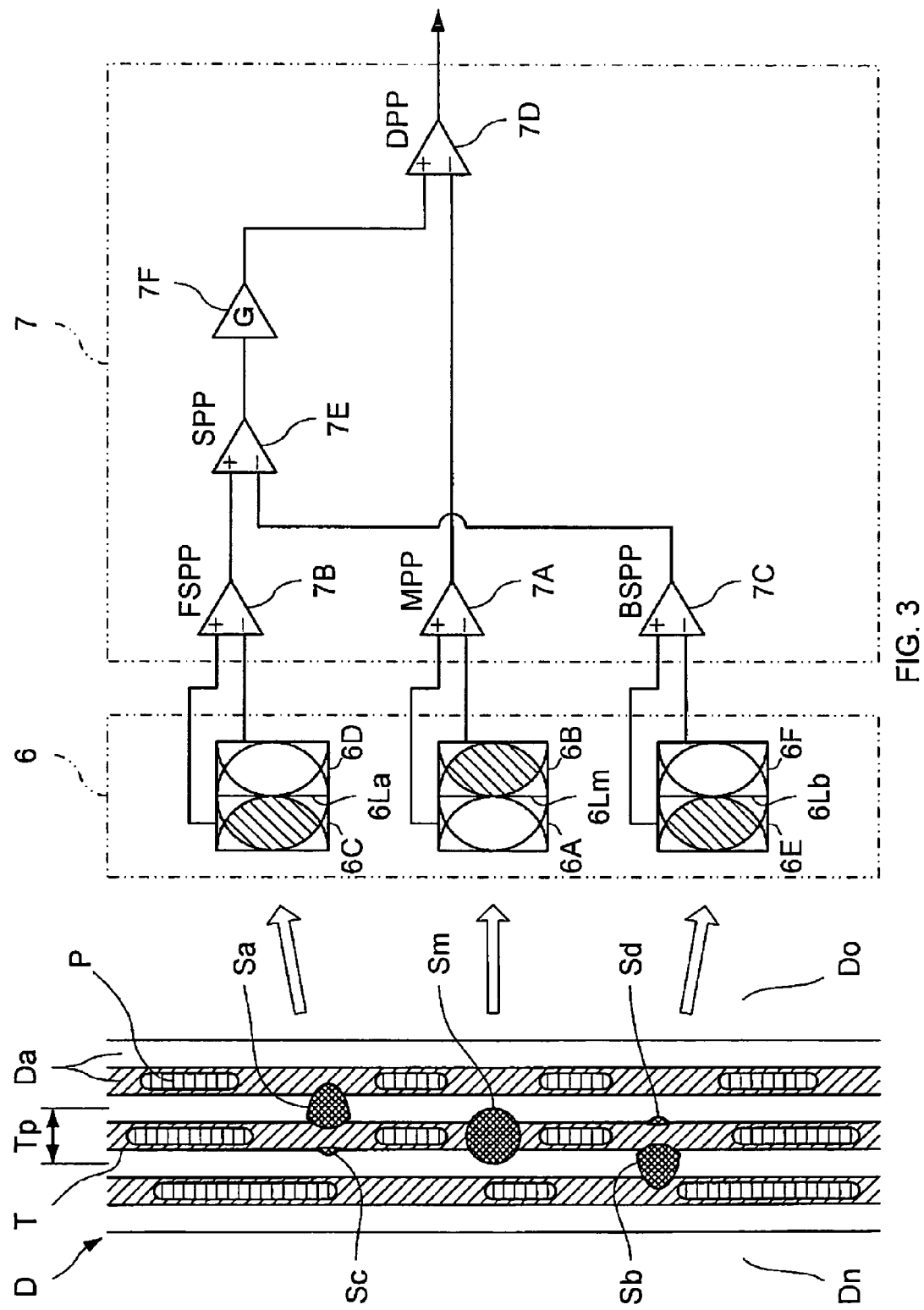
FIG. 3 is an explanatory diagram of a photodetector and an arithmetic unit of the optical pickup unit.
Figure 4:
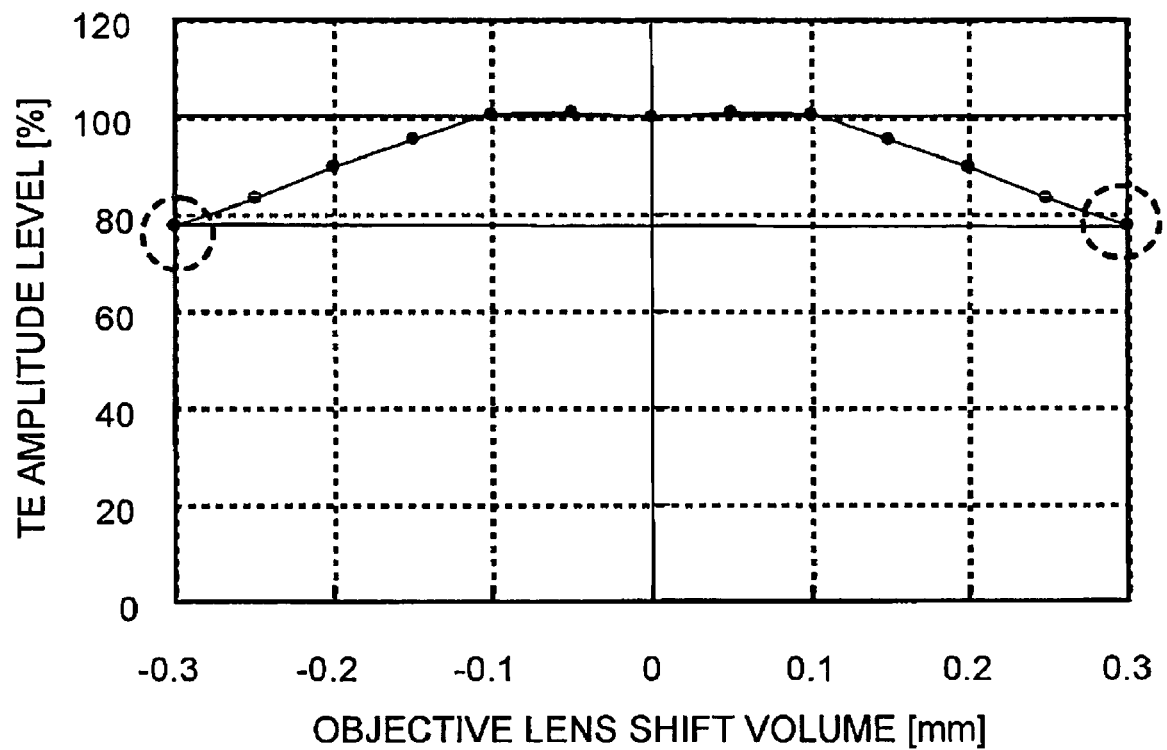
FIG. 4 is an explanatory diagram of a relationship between an objective lens shift volume and a tracking error amplitude level.
Figure 5:
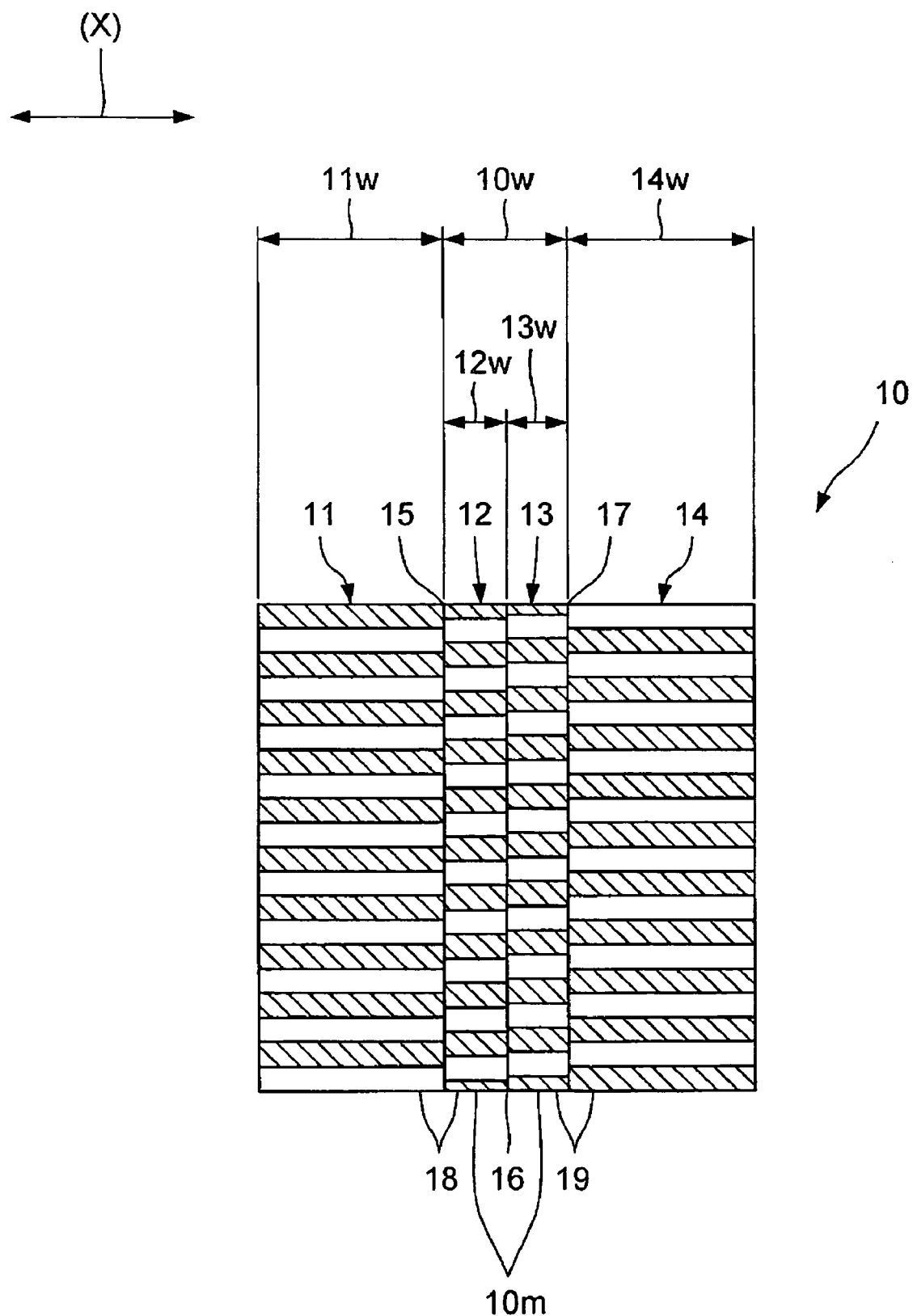
FIG. 5 is a schematic plan view of a first embodiment of a diffraction grating mounted in the optical pickup unit.

FIG. 1 is an explanatory diagram of a first embodiment of an optical pickup unit and an optical disk apparatus according to the present invention. FIG. 2 is an explanatory diagram of focusing spots on a medium such as an optical disk, etc. FIG. 3 is an explanatory diagram of a photodetector and an arithmetic unit mounted in the optical pickup unit. FIG. 4 is an explanatory diagram of a relationship between an objective lens shift volume and a tracking error amplitude level. FIG. 5 is a schematic plan view of a first embodiment of a diffraction grating mounted in the optical pickup unit.

As shown in FIG. 1, this optical pickup unit 100 has a light emitting device 1 or a laser diode 1 that emits a laser light or a laser (light amplification by stimulated emission of radiation). The optical pickup or the optical pickup unit is abbreviated as "OPU". The laser diode is abbreviated as "LD". This OPU 100 is equipped with the diffraction grating 10 of a substantially rectangular shape as viewed in plan that divides one laser luminous flux applied by the LD1 into at least three luminous fluxes.

This OPU 100 is equipped with a beam splitter ("BS") 2 that transmits the laser light or reflects/refracts the laser light. This OPU 100 is equipped with a collimator lens ("CL" for short) 3 that changes diffused light to a parallel light, or vice versa. This OPU 100 is equipped with an objective lens ("OBL" for short) 4 (FIG. 1) that condenses the three luminous fluxes and irradiates at least three focusing spots, Sa, Sb, and Sm (FIGS. 2 and 3), independent of each other, on a signal side Da of the optical disk D.

This OPU 100 has the OBL 4 condense the three luminous fluxes separately and irradiate at least three focusing spots, Sa, Sb, and Sm (FIGS. 2 and 3), independent of each other, on a signal side Da of the optical disk D. Small spots Sc and Sd, also applied on the signal side Da of the optical disk D, are irrelevant to a signal, etc., of the optical disk D. The shape and size of each of the spots Sa, Sb, Sc, Sd, and Sm are shown only as a matter of convenience, for easy understanding of the spots Sa, Sb, Sc, Sd, and Sm.

This OPU 100 (FIG. 1) is equipped with a sensor lens 5 that causes astigmatism in the light applied to a photodetector or photodiode IC ("PD" or "PDIC" for short) 6, for the focusing control of the OBL 4 relative to the signal side Da of the optical disk D. This OPU 100 is equipped with the PD 6 (FIG. 1) that receives reflected lights of the three focusing spots Sa, Sb, and Sm on the optical disk D (FIGS. 2 and 3), at three corresponding light receiving faces, each divided into two or more parts, 6A, 6B, 6C, 6D, 6E, 6F (FIG. 3).

This OPU 100 is equipped with an arithmetic unit 7 that performs a calculation of the signal generated at the PD6. This OPU 100 is equipped with an objective lens driving part 8 that drives the OBL 4 in a tracking direction X or in a focusing direction Z, or tilts the OBL 4, in response to the signal generated at the arithmetic unit 7.

By the rotation of the disk D, the focusing spots Sa, Sb, and Sm move relative to the disk D, substantially along a track T on the signal side Da of the disk D (FIGS. 2 and 3). At that time, the main spot Sa (FIGS. 2 and 3), formed by the irradiation of the laser light on the disk D from the OPU 100, follows pits P formed on the track T on the signal side Da of the disk D. By this means, the data or information recorded on the disk D is read by the OPU 100 (FIG. 1).

By irradiating a main beam onto the track T (FIGS. 2 and 3) on the signal side Da of the disk D by the OPU 100, and forming pits P on the track T, data or information is recorded on the disk D. The focusing spots Sa, Sb, and Sm move substantially in a track direction Y of the optical disk, or in a pit direction Y, or in a tangential direction Y. The definition of the directions X, Y, and Z in this patent specification is a matter of convenience.

In the OPU 100 shown in FIG. 1, the laser light applied from the PD1 is diffracted by the diffraction grating 10 into three beams, a main beam of the zero order diffraction and sub-beams of the 1 order diffraction, which transmit through the BS2 and are converted by the CL3 into parallel light and incident on the OBL 4. The laser light incident on the OBL 4 is focused by the OBL 4 and applied on the signal side Da of the disk D. A record signal is written or read by use of the main beam of the zero-order of the diffracted light.

The laser light applied on the signal side of the disk D is reflected, and, through the OBL 4 and CL3, goes back to the BS2, and is reflected by the BS2 and received by the PD6 through the sensor lens 5. The signal generated by the PD6 is sent to the arithmetic unit 7 for calculation, and the signal generated in the arithmetic unit 7 is sent to the objective lens driving part 8. With a flow of an electric signal through the objective lens driving part 8, the OBL 4 moves.

The volume of the shift of the objective lens when the OBL 4 is driven in an optical disk radial direction X, relative to the diffraction grating, is about ±0.3 mm as shown in FIG. 4. Namely, the objective lens shift volume is from about −300 μm to +300 μm. Depending on the design, specifications, etc., of the OPU 100 (FIG. 1) or the optical disk apparatus 200, the objective lens shift volume (FIG. 4) can be about 0.25 mm. Namely, the objective lens shift volume can be from about −250 μm to +250 μm.

A tracking error amplitude level or a TE amplitude level (FIG. 4) in the OPU 100 (FIG. 1) is from about 40% to 100%, and preferably about 60% to 100%, and more preferably about 70% to 100%. In FIG. 4, the TE amplitude level in excess of 100% means, for example, a measurement error at the time of the detection of the TE amplitude level being included.

The TE amplitude level of the CPU 100 is ideally 100%. For example, when the TE amplitude level of the OPU 100 is about less than 40%, the tracking error field characteristic or TE field characteristic of the OPU 100 become lower and the tracking of the OBL 4 of the OPU 100 is not accurately performed for the optical disk D. The tracking error field characteristic is characterized, for example, as the degree of deterioration of the tracking error signal in accordance with the displacement of the OBL 4 in the tracking direction X, relative to the optical disk D.

For example, when the TE amplitude level of the OPU 100 is about 60% or over, the TE field characteristic of the OPU 100 is easily prevented from lowering, and accurate tracking of the OBL 4 of the OPU 100 is easily performed for the optical disk D. For example, by setting the TE amplitude level of the OPU 100 to be about 70% or over, the TE field characteristic of the OPU 100 is easily prevented from lowering and accurate tracking of the OBL 4 of the OPU 100 is easily performed for the optical disk D.

For accurate tracking of the OBL 4 of the OPU 100 for the optical disk D, the objective lens shift volume is within the range of about 0.6 mm in width, from about −0.3 mm to +0.3 mm. By setting the objective lens shift volume to be within the range of about 0.6 mm, from about −0.3-n to +0.3 nm, the TE field characteristic of the OPU 100 is easily prevented from lowering.

Depending on the design, specifications, etc., of the OPU 100 or the optical disk apparatus, it is desirable, for example, that the objective lens shift volume be within the range of about 0.5 mm in width, from about −0.25 mm to about +0.25 mm. By setting the objective lens shift volume to be within the range of about 0.5 mm, from 0.25 mm to about +0.25 mm, the TE field characteristic of the OPU 100 is prevented from lowering.

The use of the OPU 100 built in the optical disk apparatus 200 (FIG. 1) permits the reproduction or the recording of data or information from or on the optical disk D. The optical disk can be, for example, a CD-type optical disk or a DVD-type optical disk. CD is an abbreviation of Compact Disk (registered trademark). DVD is an abbreviation of Digital Versatile Disk (registered trademark).

Media such as optical disks will now be described in detail. Media means objects for recording and conveying information or objects for recording and transmitting information. The optical disks are, for example, read-only optical disks such as CD-ROM and DVD-ROM, recordable optical disks such as CD-R, DVD-R, DVD+R, and a data-writable/erasable or rewritable optical disks such as CD-RW, DVD-RW, DVD+RW (registered trademark), DVD-RAM, HD DVD (registered trademark), and Blu-ray Disk (registered trademark).

"ROM" in CD-ROM or DVD-ROM is an abbreviation of a Read Only Memory. CD-R or DVD-ROM is only for the reading of the data and information. "R" in CD-R or DVD-R is an abbreviation of "Recordable". CD-R or DVD-R or DVD+R is data/information recordable. "RW" in CD-RW or DVD-RW or DVD+RW is an abbreviation of "Re-Writable". CD-RN or DVD-RW or DVD+RW is data/information rewritable. DVD-RAM is an abbreviation of Digital Versatile Disk Random Access Memory. DVD-RAM is data/information readable/writable/erasable.

"HD DVD" is an abbreviation of High Definition DVD. The HD DVD has compatibility with conventional DVD type disks and has a larger storage capacity than the conventional DVD-type disks. The conventional CD used an infrared laser. A red laser has been used for the conventional DVD. However, a blue-purple laser is used for reading data or information recorded on an optical disk of the HD DVD. "Blu-ray" means the blue-purple laser employed for realization of high definition recording, as opposed to the red laser used for the conventional signal reading and writing.

The optical disk can also be such an optical disk that has signal faces on both sides of the disk and is recordable/erasable or rewritable. The optical disk can also be such an optical disk that has two layers of signal faces and is recordable/erasable or rewritable. The optical disk can also be such an optical disk for the HD DVD that has three layers of signal faces and is recordable/erasable or rewritable. The optical disk can also be such an optical disk for the Blu-ray Disk that has four layers of signal faces and is recordable/erasable or rewritable.

The OPU 100 is used for reproducing data recorded on the optical disks and recording data on the optical disks that are recordable or rewritable. The OPU 100 handles the CD-type optical disks, DVD-type optical disks, etc. This OPU 100 can handle plural kinds of optical disks. The optical disk D is, for example, a D'D-RAM.

A substantially spiral track T (FIGS. 2 and 3) is formed on the signal side Da of the optical disk D, from an inner circumference side Dn to an outer circumference side Do. The track T has many pits P formed thereon. With use of a leading sub-spot Sa and a trailing sub-spot Sb, a main spot Sm almost accurately tracks the pits P on the track T. A tracking error detection method of this OPU 100 (FIG. 1) uses a phase-shift diffraction grating and is based or a three-beam in-line DPP method.

As shown in FIG. 5, the diffraction grating 10 has phase shift regions 11 and 14 (FIG. 5; that cause a phase shift of n radian in part of the laser light applied from the LD 1 (FIG. 1). The diffraction grating 10 is divided into at least four regions, a substantially rectangular first region 11, a substantially rectilinear second region 12 adjacent to the first region 11, a substantially rectilinear third region 13 adjacent to the second region 12, and a substantially rectangular fourth region 14 adjacent to the third region 13. A predetermined periodic structure is built within each of the regions 11, 12, 13, and 14.

In the diffraction grating shown in FIG. 5, for the sake of convenience, the second region 12 and the third region 13 are so drawn as to have a certain width, for easy understanding of the phase state of the second region 12 and the phase state of the third region 13. In practice, however, the second region 12 and the third region 13 of the diffraction grating 10 form a fine line having a width 10w of, e.g., about 20 to 200 μm. The periodic structure of each of the regions 11, 12, 13, and 14 making up the diffraction grating 10 is a periodic structure with a minute recess and raised-portion repeated. The diffraction grating 10 is a glass sheet of, e.g., about 3 to 10 mm square and about 0.3 to 3 mm in thickness.

The diffraction grating 10 shown in FIG. 5 mounted in the OPU 100 makes it easier to perform well the tracking of the OPU 100 for the signal side Da of the optical disk D. The tracking of the OPU 100 means the operation of causing the focusing spots Sa, Sb, and Sm to be constantly on a target track T following the deviation of the optical disk D in its radius direction. To be more specific, the tracking means the operation of observing and tracking the minute pits (holes, etc.), grooves, a wobble, etc., on the signal side Da of the optical disk D by use of light and determining the position of the track formed substantially in spiral. Because of the division of the diffraction grating 10 into four regions 11, 12, 13, and 14, at least three focusing spots Sa, Sb, and Sm (FIGS. 2 and 3), independent of each other, are applied on the signal side Da of the optical disk D. Since at least three focusing spots Sa, Sb, and Sm (FIGS. 2 and 3) are, independently of each other, applied on the signal side Da of the optical disk D, the tracking error signal is easily prevented from deteriorating, for example, due to the displacement of the OBL 4 (FIG. 1), at the times of recording data onto plural kinds of optical disks D of different track pitches Tp or reproducing data from plural kinds of optical disks D of different track pitches Tp. The single OPU 100 can thus be provided that is easy to perform the tracking control.

As shown in FIG. 5, the diffraction grating 10 has one regional part 18 of a substantially rectangular shape having the first region 11 and the second region 12 adjacent to the first region 11, and the other regional part 19 of the substantially rectangular shape having the third region 13 adjacent to the second region 12 and the fourth region 14 adjacent to the third region 13. The width 11w of the first region 11 of the diffraction grating and the width 14w of the fourth region 14 are about the same. The width 12w of the second region 12 of the diffraction grating 10 and the width 13w of the third region 13 are about the same. A borderline 16 between the second region 12 of the diffraction grating 10 and the third region 13 adjacent to the second region 12 divides the diffraction grating 10 into two equal parts, one regional part 18 and the other regional part 19 that make up the diffraction grating 10.

As a result, the focusing spots Sa, Sb, and Sm on the signal side of the optical disk D are formed as accurate focusing spots Sa, Sb, and Sm. Since the borderline 16 between the second region 12 of the diffraction grating 10 and the third region 13 adjacent to the second region 12 divides the diffraction grating 10 into two equal parts, one regional part 18 having the first region 11 and the second region 12 adjacent to the first region 11 and the other regional part 19 having the third region 13 and the fourth region 14 adjacent to the third region 13, the laser light from the LD 1 applied on the diffraction grating 10 can have its optical axis easily adjusted, for example, with an optical axis adjusting camera not shown, at the time of mounting the diffraction grating 10 in the housing (not shown) of the OPU 100. The laser light applied from the LD 1, striking the diffraction grating 10, and then transmitting through the OPU 4 is observable, with the use of, for example, the optical axis adjusting camera.

A conventional three-division-type diffraction grating 90 (FIG. 22) did not have a positioning borderline that divides the diffraction grating 90 into two equal parts, as viewed in plan. Because of the absence of the borderline used as the positioning centerline in the diffraction grating 90, difficulty was faced in irradiating the laser light onto the diffraction grating 9C, while setting the center of the laser light to the center of the diffraction grating 90, and accurately mounting the diffraction grating 90 in the housing of the optical pickup unit, using the optical axis adjusting camera.

On the other hand, in the four-division-type diffraction grating 10 shown in FIG. 5, the borderline 16 is provided in the diffraction grating 10 that divides the diffraction grating 10, substantially at its center, into two equal parts, one regional part 18 of the substantially rectangular shape and the other regional part 19 of the substantially rectangular shape. This borderline 16 makes it easier to irradiate the laser light so as to be substantially equally divided into two parts respectively on one regional part 18 of the substantially rectangular shape and the other regional part 19 of the substantially rectangular shape that make up the diffraction grating 10, at the time of adjusting the optical axis, using the optical axis adjusting camera, etc.

Because of increased ease in irradiating the laser light so as to be substantially equally divided into two parts respectively on one regional part 18 of the substantially rectangular shape and the other regional part 19 of the substantially rectangular shape that make up the diffraction grating 10, the diffraction grating 10 can easily be mounted in the housing of the OPU 100, while accurately adjusting the position of the diffraction grating 10. Therefore, the focusing spots Sa, Sb, and Sm can very likely be accurately formed on the signal side Da of the optical disk D. Accordingly, accurate tracking of the OPU 100 can easily be performed for the signal side Da of the optical disk D.

As compared with the periodic structure of the second region 12 of the diffraction grating 10, the third region 13 of the diffraction grating 10 has the periodic structure with a phase different by within the range of 3 to 180 degrees.

Therefore, the focusing spots Sa, Sb, and Sm on the signal side Da of the optical disk D are likely to be formed as focusing spots Sa, Sb, and Sm having higher accuracy. Since, as compared with the periodic structure of the second region 12 of the diffraction grating 10, the third region 13 of the diffraction grating 10 has the periodic structure with a phase different by within the range of 3 to 180 degrees, the borderline 16 is substantially clear between the second region 12 of the diffraction grating 10 and the third region 13 of the diffraction grating 10 adjacent to the second region 12.

If, as compared with the periodic structure of the second region 12, the third region 13 has the periodic structure with a phase different by less than 3 degrees, the borderline 16 is not clarified between the second region 12 and the third region 13. When, as compared with the periodic structure of the second region 12, the third region 13 has the periodic structure with a phase different by 180 degrees, the borderline 16 is most clarified between the second region 12 and the third region 13. When, as compared with the periodic structure of the second region 12, the third region 13 has the periodic structure with a phase different by, for example, 3 to 90 degrees, the diffraction grating 10 is formed to have proper characteristics, while the borderline 16 is clarified between the second region 12 and the third region 13.

Since the borderline 16 is substantially clarified between the second region 12 of the diffraction grating 10 and the third region 13 of the diffraction grating 10, the borderline 16 is clarified between the one regional part 18 of the diffraction grating 10 having the first region 11 and the second region 12 adjacent to the first region 11 and the other regional part 19 of the diffraction grating having the third region 13 and the fourth region 14 adjacent to the third region 13. Therefore, the laser 13 light is applied so as to be substantially equally divided into two parts respectively on one regional part 28 of the diffraction grating 10 and the other regional part 19 of the diffraction grating 10. By irradiating the laser light so as to be substantially equally divided into two parts respectively on one regional part 18 of the diffraction grating 10 and the other regional part 19 of the diffraction grating 10, the diffraction grating 10 is accurately mounted in the housing of the OPU 100.

The substantially rectilinear second region 12 and the substantially rectilinear third region 13 forming part of the diffraction grating 10 are arranged between the substantially stripes-like first region 11 and the substantially stripes-like fourth region 14 forming part of the diffraction grating 10. The periodic structure of the second region 12 is of a different phase from that of the periodic structure of the first region 11. The periodic structure of the third region 13 is of a different phase from that of the periodic structure of the second region 12. The periodic structure of the fourth region 14 is of a different phase from that of the periodic structure of the third region 13. The periodic structure of the fourth region 14 is of a phase about 180 degrees different from that of the periodic structure of the first region 11.

As a result, the first region 11, second region 12, the third region 13, and the fourth region 14 in the diffraction grating 10 are distinguished from each other and the phase difference is clarified between the first region 11 and the fourth region 14 in the diffraction grating 10. Since the periodic structure of the fourth region 14 of the diffraction grating 10 is of a phase about 180 degrees different from that of the periodic structure of the first region 11, at least three focusing spots Sa, Sb, and Sm are formed well on the signal side Da of the optical disk D. With use of the at least three focusing spots Sa, Sb, and Sm formed well on the signal side Da of the optical disk D, the tracking error signal is easily prevented from deteriorating, for example, due to the displacement of the OBL 4, at the times of recording or reproducing data on or from plural kinds of optical disks D having different track pitches Tp.

The first region 11 and the second region 12 are separated by the borderline 15 between the first region 11 and the second region 12. The second region 12 and the third region 13 are separated by the borderline 16 between the second region 12 and the third region 13. The third region 13 and the fourth region 14 are separated by the borderline 17 between the third region 13 and the fourth region 14.

Relative to the periodic structure of the first region 11, the second region 12 has the periodic structure with a phase different by within the range of 30 to 180 degrees. Relative to the periodic structure of the second region 12, the third region 13 has the periodic structure with a phase different by within the range of 3 to 180 degrees. Relative to the periodic structure of the third region 13, the fourth region 14 has the periodic structure with a phase different by within the range of 30 to 180 degrees.

As a result, the first region 11, the second region 12, the third region 13, and the fourth region 14 are substantially clearly distinguished from each other in the diffraction grating 10. Since, relative to the periodic structure of the first region 11 of the diffraction grating 10, the second region 12 of the diffraction grating 10 has the periodic structure with a phase different by within the range of 30 to 180 degrees, the first region 11 of the diffraction grating 10 and the second region 12 of the diffraction grating 10 are clearly distinguished from each other. Since, relative to the periodic structure of the second region 12 of the diffraction grating 10, the third region 13 of the diffraction grating 10 has the periodic structure with a phase different by within the range of 3 to 180 degrees, the second region 12 of the diffraction grating 10 and the third region 13 of the diffraction grating 10 are substantially distinguished from each other. Since, relative to the periodic structure of the third region 13 of the diffraction grating 10, the fourth region 14 of the diffraction grating 10 has the periodic structure with a phase different by within the range of 30 to 180 degrees, the third region 13 of the diffraction grating 10 and the fourth region 14 of the diffraction grating 10 are clearly distinguished from each other.

By dividing the diffraction grating 10 into four regions, distinguished from each other, the at least three focusing spots Sa, Sb, and Sm, independent of each other, are applied on the signal side Da of the optical disk D. Since at least three focusing spots Sa, Sb, and Sm are applied independently of each other on the signal side Da of the optical disk D, the tracking of the OPU 100 can easily be performed for the signal side Da of the optical disk D. By appropriately setting the phase of the periodic structure of each region to be within a predetermined range of values, degrees of freedom in designing of the diffraction grating 10 improve and at the same time, degrees of freedom in designing of the CPU 100 also improve. Therefore, the OPU 100 is configured that is likely to have optimum characteristics corresponding to the location of use.

The diffraction grating 10 is formed as a sheet of a substantially rectangular shape. The diffraction grating 10, as viewed in plan, appears a substantially rectangular sheet.

The diffraction grating 10 is now viewed in plan, with the longitudinal, substantially rectangular first region 11, the longitudinal, substantially rectilinear second region 12, the longitudinal, substantially rectilinear third region 13, and the longitudinal, substantially rectangular fourth region 14 arranged side by side. In this state, if, relative to the phase of one region of the diffraction grating 10, the phase of another region adjacent to the one region at its right side is shifted substantially in a stepwise right ascending manner, the phase of the other region is described as being shifted to the plus (+) side.

The diffraction grating 10 is now viewed in plan, with the longitudinal, substantially rectangular first region 11, the longitudinal, substantially rectilinear second region 12, the longitudinal, substantially rectilinear third region 13, and the longitudinal, substantially rectangular fourth region 14 arranged side by side. In this state, if, relative to the phase of one region of the diffraction grating 10, the phase of another region adjacent to the one region at its right side is shifted substantially in a stepwise right descending manner, the phase of the other region is described as being shifted to the minus (−) side.

The definitions of the plus (+) phase and the minus (−) phase in this patent specification are a matter of convenience, for describing phase differences of the diffraction grating. The definitions of the "longitudinal" and the "transverse" are also a matter of convenience, for describing the diffraction grating.

In viewing the diffraction grating 10 in plan, relative to the periodic structure of the first region 11, the second region 12 adjacent to the first region 1 at its right side has the periodic structure of a phase shifted to the plus side. In viewing the diffraction grating 10 in plan, relative to the periodic structure of the second region 12, the third region 13 adjacent to the second region 12 at its right side has the periodic structure of a phase shifted to the plus side. In viewing the diffraction grating 10 in plan, relative to the periodic structure of the third region 13, the fourth region 14 adjacent to the third region 13 at its right side has the periodic structure of a phase shifted to the plus side.

The diffraction grating 10 is configured in such a manner that the phases of the regions 11, 12, 13, and 14 are shifted stepwise, one after the other. The diffraction grating 10 has the periodic structures of so-called forward phases.

Depending on the design specifications, etc., of the OPU, the diffraction grating 10 may have its stripes turned over laterally with the borderline (16) as the center, with keeping symbols, lead lines, dimension lines, etc., as they are. Describing specifically, for example, in viewing the diffraction grating (10) in plan, relative to the periodic structure of the first region (11), the second region (12) adjacent to the first region (11) at its right side can have a periodic structure having its phase shifted to the minus side. Further, in viewing the diffraction grating (10) in plan, relative to the periodic structure of the second region (12), the third region (13) adjacent to the second region (12) at its right side can have a periodic structure having its phase shifted to the minus side. Further, in viewing the diffraction grating (10) in plan, relative to the periodic structure of the third region (13), the fourth region (14) adjacent to the third region (13) at its right side can have a periodic structure having its phase shifted to the minus side.

The diffraction grating (10) is configured in such a manner that the phases of the periodic structures of regions (11), (12), (13), and (14) are shifted stepwise, one after the other. The diffraction grating (10) has the periodic structures of so-called forward phases.

Figure 14:
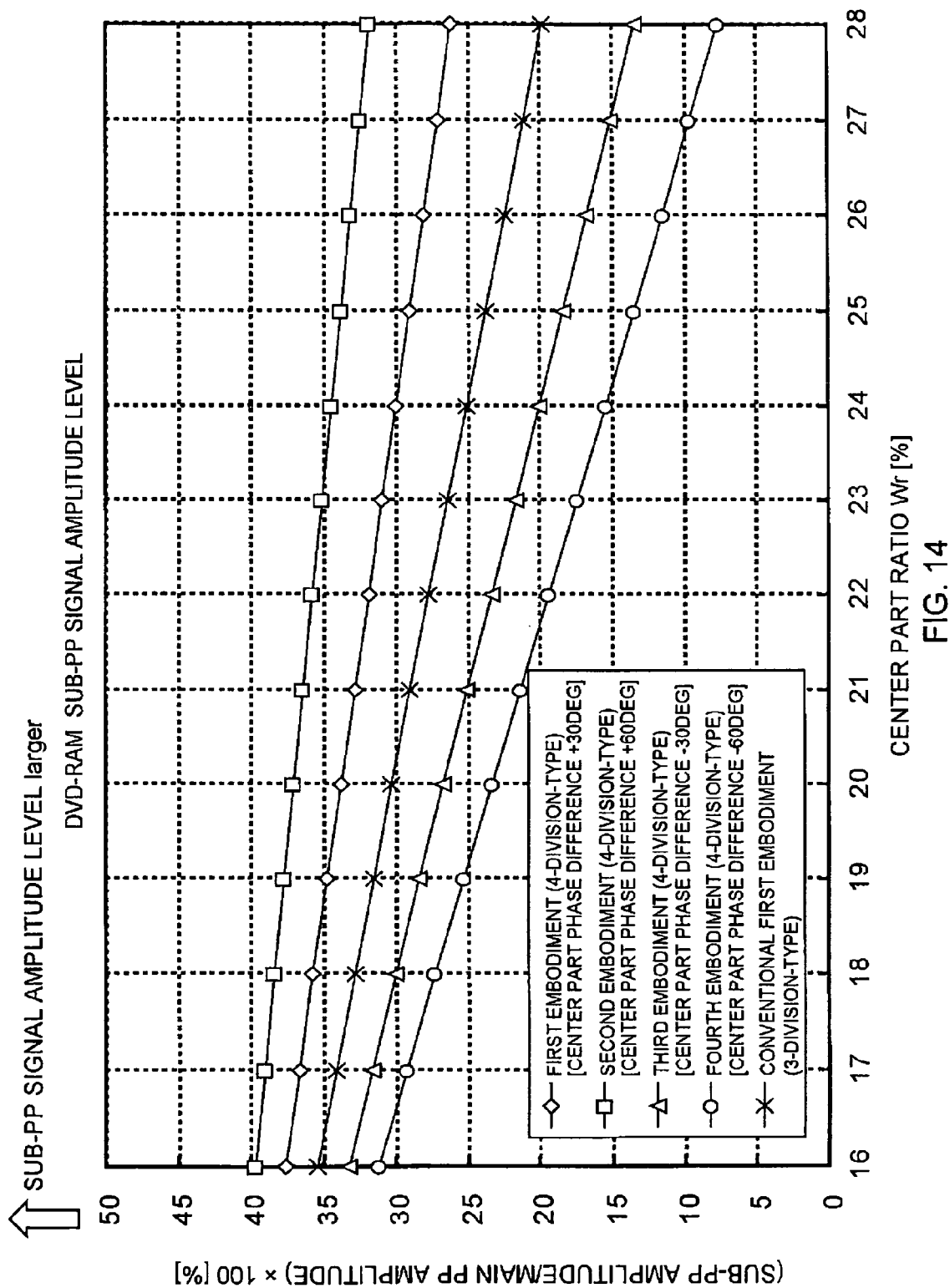
FIG. 14 is an explanatory diagram of sub-push-pull signal amplitude level characteristic.

By mounting the diffraction grating having the periodic structure of the forward phases on the OPU, a sub-push-pull signal amplitude level (sub-PP signal amplitude level) increases, and a sub-push-pull signal amplitude level characteristic (sub-PP signal amplitude level characteristic) is likely to improve (FIG. 14). The sub-PP signal amplitude level (%) is prevented from decreasing and the sub-PP signal amplitude level characteristic is prevented from lowering.

The at least three focusing spots Sa, Sb, and Sm applied on the signal side Da of the optical disk D include a main spot Sm, and a pair of sub-spots Sa and Sb sandwiching the main spot Sm. The sub-PP signal amplitude level that is the signal amplitude level associated with the main spot Sm and sub-spots Sa and Sb, is defined by the following equation:

$$\text{Sub-push-pull signal amplitude level (\%)} = (\text{Sub-push-pull signal amplitude value/Main push-pull signal amplitude value}) \times 100 \quad (1)$$

Figure 15:
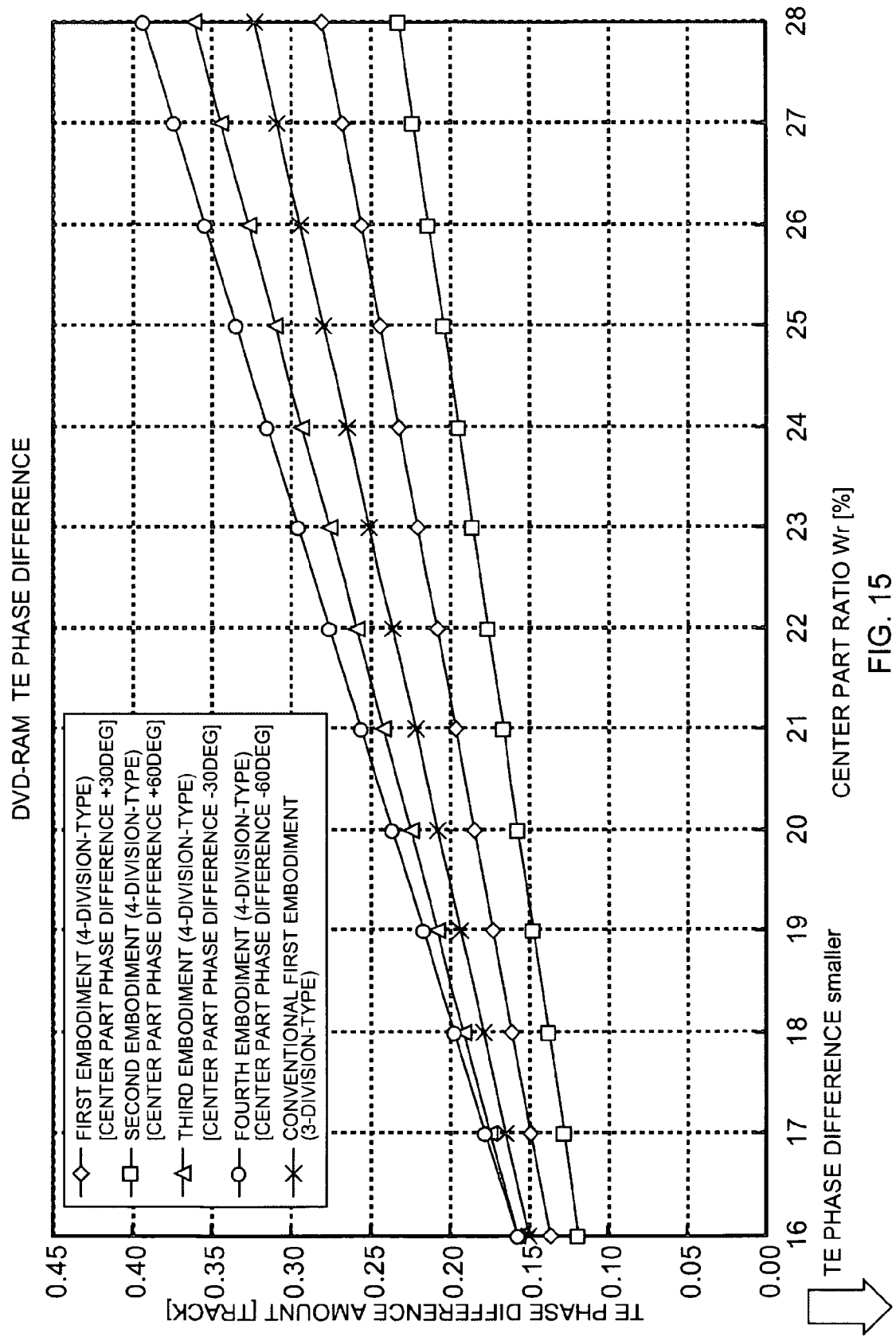
FIG. 15 is an explanatory diagram of tracking error phase difference characteristic of the optical pickup unit.
Figure 16:
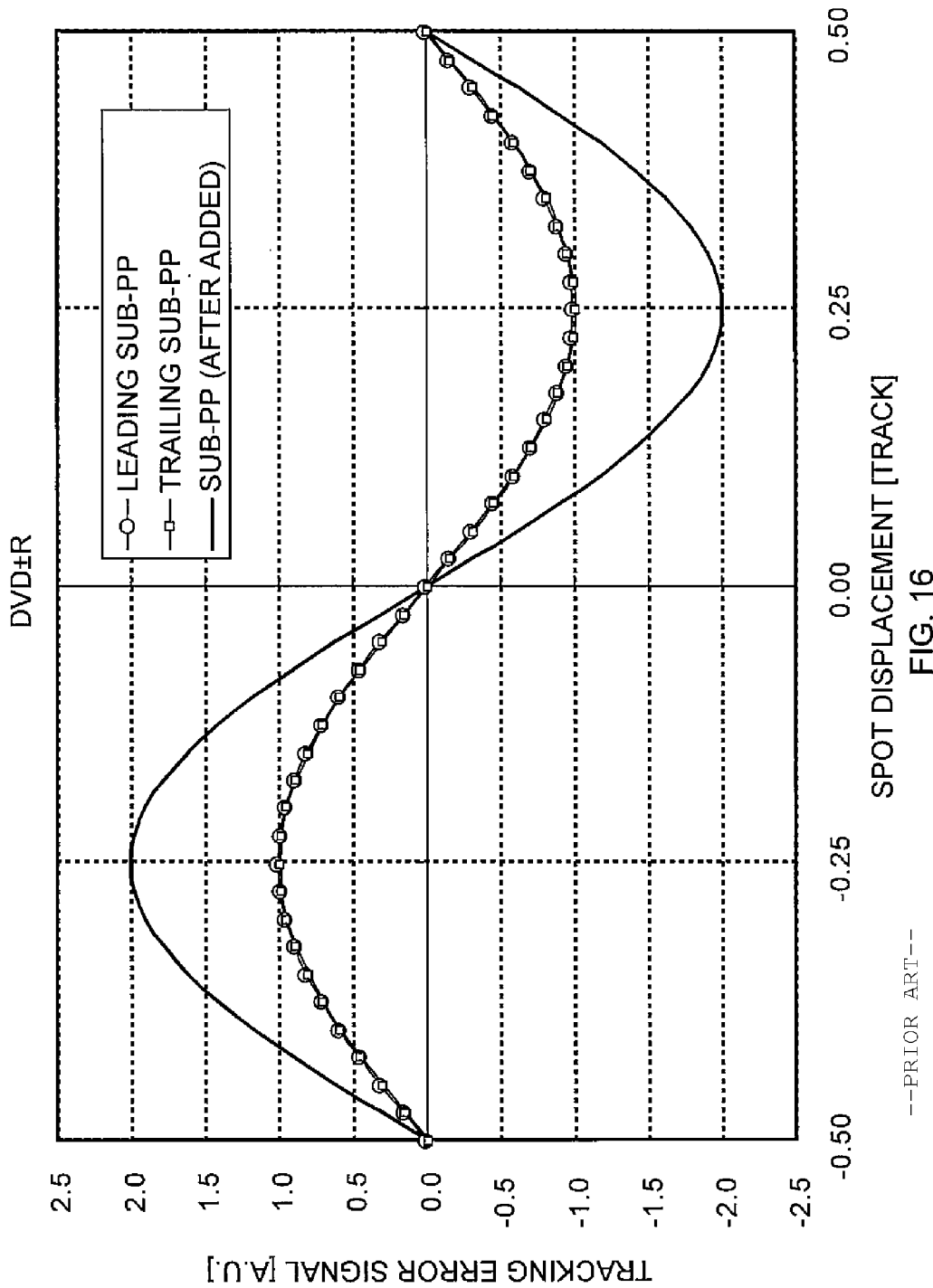
FIG. 16 is a waveform diagram of the sub-push-pull signal at the time of using a medium of a predetermined track pitch in a conventional optical pickup unit and optical disk apparatus.
Figure 17:
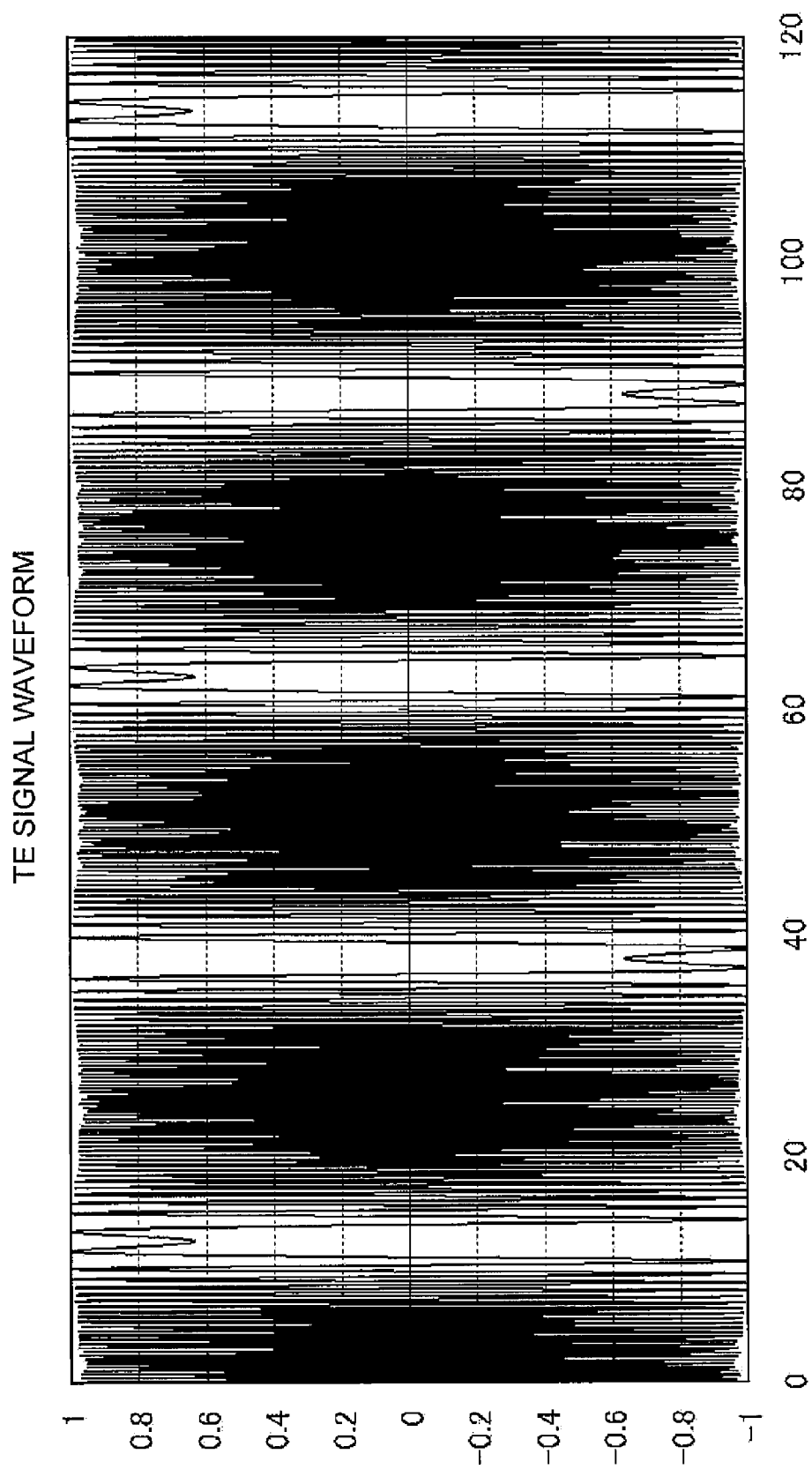
FIG. 17 is a waveform diagram of a tracking error signal if both of the amount of the tracking error phase difference and the amount of eccentricity of the optical disk are small.
Figure 18:
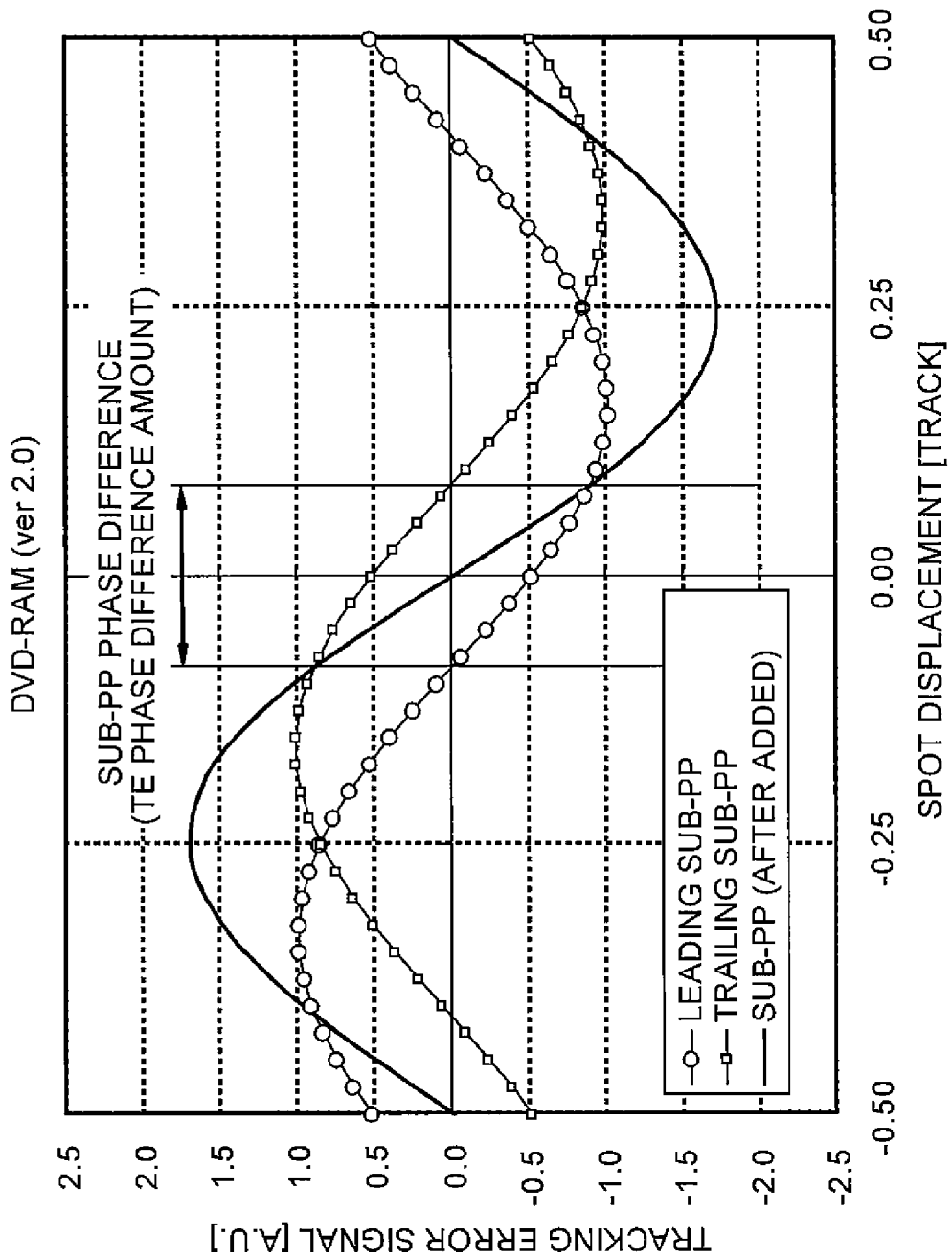
FIG. 18 is a waveform diagram of the sub-push-pull signal at the time of using a medium of another than the predetermined track pitch in the conventional optical pickup unit and optical disk apparatus.
Figure 19:
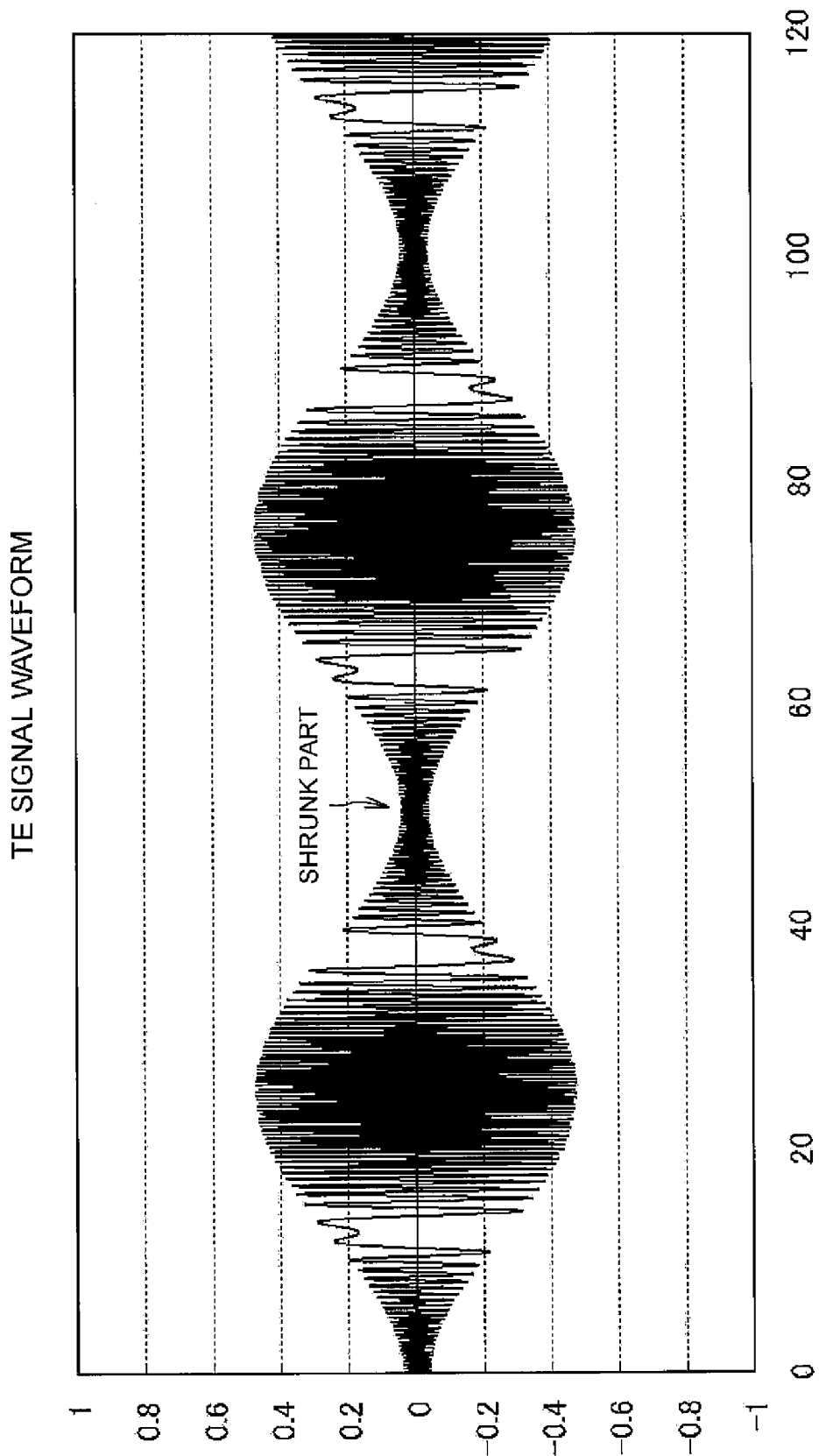
FIG. 19 is a waveform diagram of the tracking error signal if both of the amount of the tracking error phase difference and the amount of eccentricity of the optical disk are large.
Figure 20:
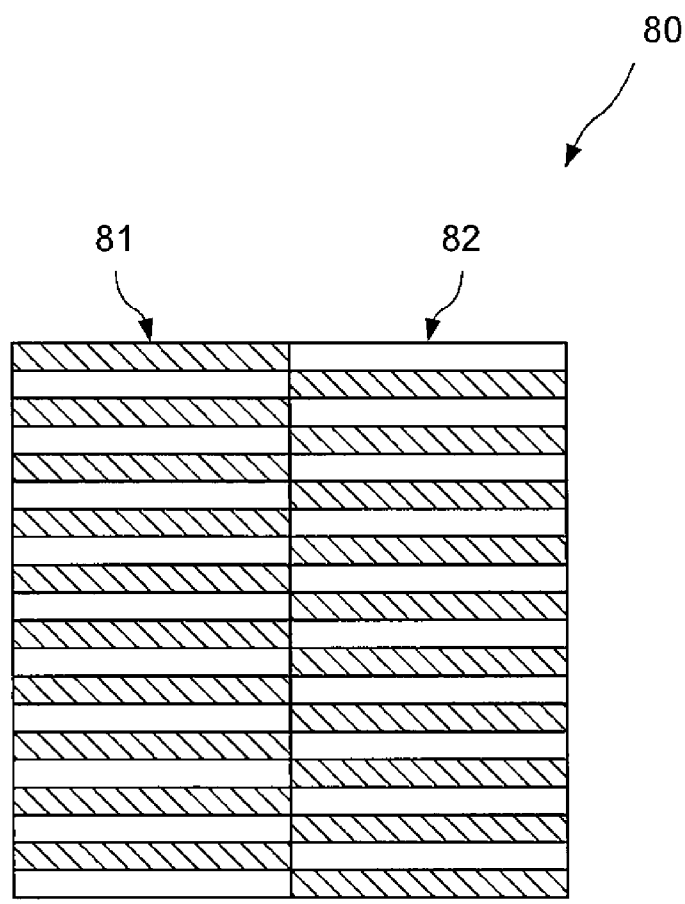
FIG. 20 is a schematic plan view of a first embodiment of the diffraction grating mounted in the conventional optical pickup unit.
Figure 21:
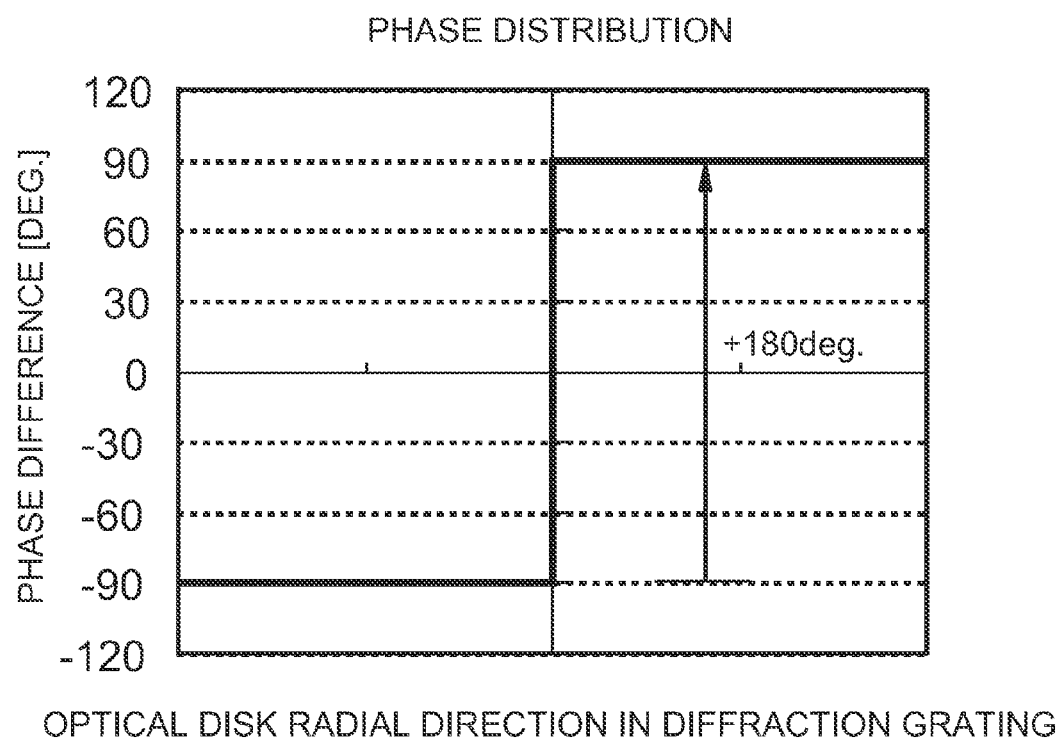
FIG. 21 is a diagram of the relationship between the optical disk radial direction and the phase difference in the diffraction grating of FIG. 20.

The amount of a tracking error phase difference (TE phase difference amount) decreases and the tracking error phase difference characteristic (TE phase difference characteristic) is likely to improve (FIG. 15). The TE phase difference amount is prevented from increasing and the TE phase difference characteristic is prevented from lowering.

Since the sub-PP signal amplitude level characteristic improve and also the TE phase difference characteristic improves, this OPU is preferably installed in an optical disk apparatus for a desktop-type PC. Since the OPU used in the optical disk apparatus for the desktop-type PC can use a large-size OBL, still considering the field characteristic, the sub-PP signal amplitude level characteristic and the TE phase difference characteristic may be given greater importance than the field characteristic in designing.

As shown in FIG. 5, relative to the periodic structure of the first region 11, the second region 12 has a periodic structure of a phase differing about +75 degrees. Relative to the periodic structure of the second region 12, the third region 13 has a periodic structure of a phase differing about +30 degrees. Relative to the periodic structure of the first region 11, the third region 13 has a periodic structure of a phase differing about +105 degrees. Relative to the periodic structure of the third region 13, the fourth region 24 has a periodic structure of a phase differing about +75 degrees. Relative to the periodic structure of the first region 11, the fourth region 14 has the periodic structure of the phase differing about +180 degrees.

By mounting thus configured diffraction grating 10 in the OPU, the sub-PP signal amplitude level (%) increases and the sub-PP signal amplitude level characteristic improves (FIG. 14). The sub-PP signal amplitude level (%) is prevented from decreasing and the sub-PP signal amplitude level characteristic is prevented from lowering. The sub-PP signal amplitude level characteristic of this OPU 100 is better (FIG. 14) than the sub-PP signal amplitude level characteristic of an OPU (not shown) having the conventional diffraction grating 90, which is divided into three phase regions 91, 92, and 93 (FIG. 22).

The TE phase difference amount decreases and the TE phase difference characteristic is improved (FIG. 15). The TE phase difference amount is prevented from increasing and the TE phase difference characteristic is prevented from lowering. The TE phase difference characteristic of this OPU 100 is better (FIG. 15) than the TE phase difference characteristic of an OPU (not shown) having the conventional diffraction grating 90, which is divided into three phase regions 91, 92, and 93 (FIG. 22).

Figure 22:
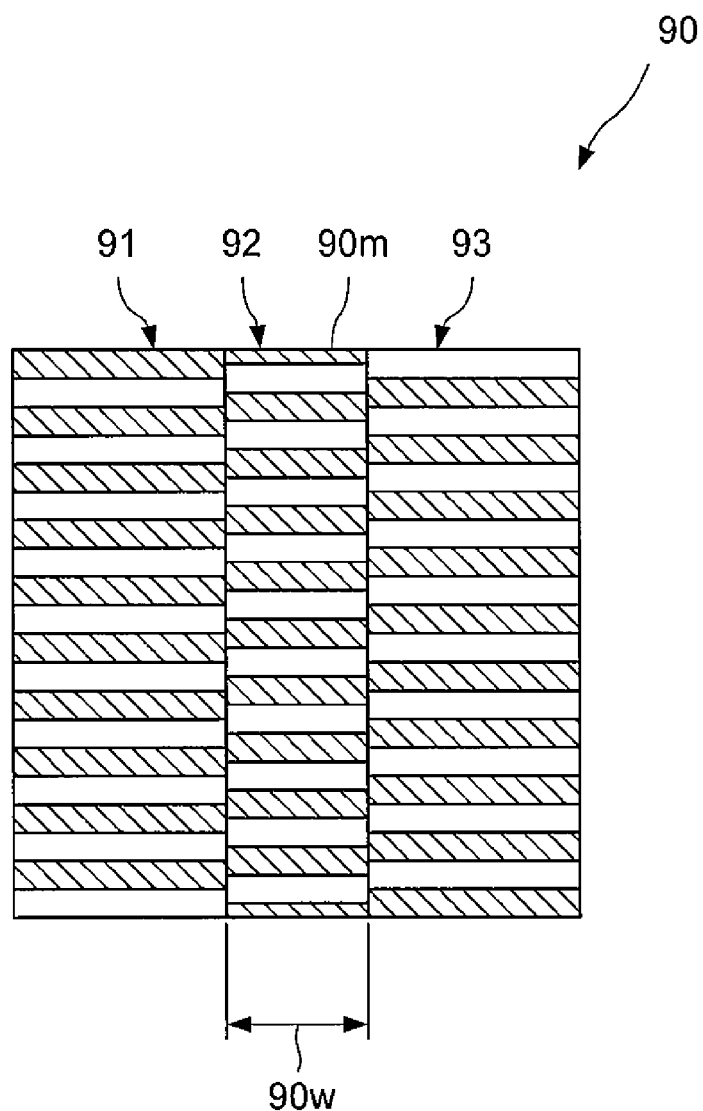
FIG. 22 is a schematic plan view of a second embodiment of the diffraction grating mounted in the conventional optical pickup unit.
Figure 23:
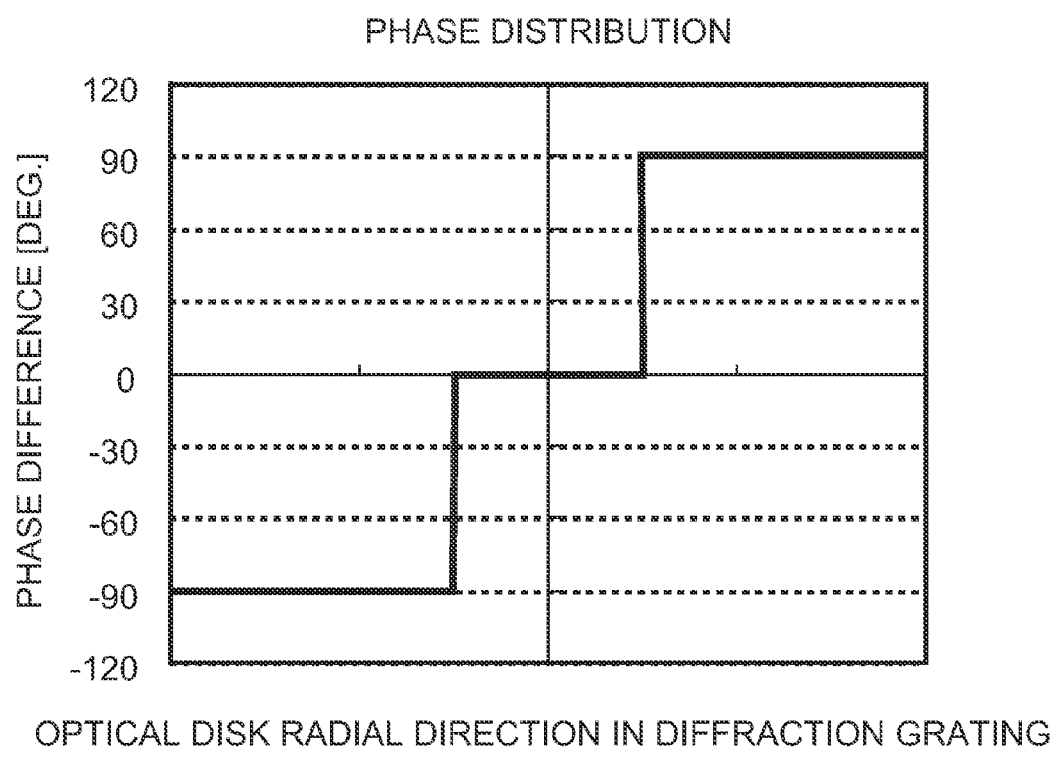
FIG. 23 is a diagram of the relationship between the optical disk radial direction and the phase difference in the diffraction grating of FIG. 22.

The OPU 100 (FIG. 1), which implements the tracking error detection method according to the in-line DPP method with the use of the phase-shift-type, 4-division diffraction grating 10 (FIG. 5), can suppress the TE phase difference amount to a small amount (FIG. 15), as compared with an OPU using the conventional three-division diffraction grating (FIG. 22). Therefore, the optical disk apparatus 200 equipped with the OPU 100 (FIG. 1) having the phase-shift-type, 4-division diffraction grating 10 (FIG. 5) can read or write data or information from or to the medium D in a reliable operation, as to any medium D having, for example, different track pitches Tp (FIGS. 2 and 3).

Since the sub-PP signal amplitude level characteristic when applied on the signal side Da of the optical disk D improves and also the TE phase difference characteristic improves, this OPU 100 is preferably installed in an optical disk apparatus for a desktop-type PC.

Figure 13:
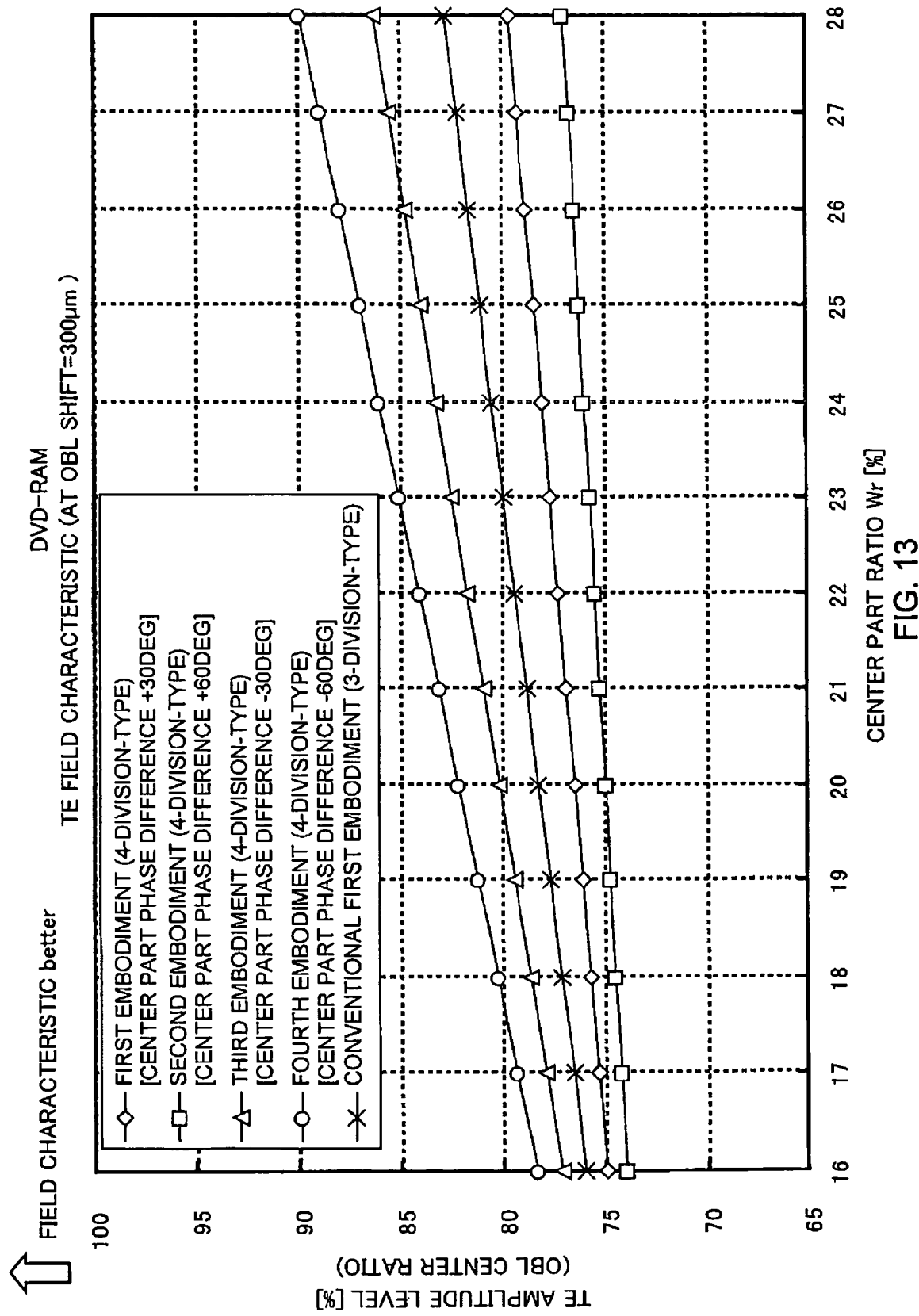
FIG. 13 is an explanatory diagram of the field characteristic of the optical pickup unit.

FIG. 13 is an explanatory diagram of the field characteristic of the optical pickup unit. FIG. 14 is an explanatory diagram of the sub-push-pull signal amplitude level characteristic. FIG. 15 is an explanatory diagram of the tracking error phase difference characteristic.

The regions 12, 13, the combination of the second region 12 and the third region 13 of the diffraction grating 10 (FIG. 5), form a longitudinal center part 10m of the diffraction grating 10. As compared with the diameter 4d of the light passing through the pupil 4e of the OBL 4 (FIG. 1), the width 10w of the center part 10m (FIGS. 1 and 5) of the diffraction grating 10 is from 16 to 28%, preferably 18 to 26%. Namely, a center part ratio Wr of the diffraction grating 10 is from 16 to 28%, preferably 18 to 26% (FIGS. 13 to 15).

By mounting thus configured diffraction grating 10 in the OPU 100, the tracking error signal is easily prevented from deteriorating due to the displacement of the OBL 4 at the times of recording or reproducing data on or from plural kinds of optical disks D of different track pitches Tp.

If, as compared with the diameter 4d of the light passing through the pupil 4e of the OBL 4 (FIG. 1), the width 10w of the center part 10m (FIGS. 1 and 5) of the diffraction grating 10 is set to less than 16%, the TE amplitude level (%) decreases and the TE field characteristic is likely to lower (FIG. 13). Namely, by setting the center part ratio Wr of the diffraction grating to less than 16%, the OBL center ratio (%) decreases and the TE field characteristic is likely to lower. When, as compared with the diameter 4d of the light passing through the pupil 4e of the OBL 4, the width 10w of the center part 10m of the diffraction grating 10 is set to 18% or over, the decrease in the TE amplitude level is suppressed and the lowering of the TE field characteristic is suppressed. Namely, by setting the center part ratio Wr of the diffraction grating 10 at 18% or over, the decrease in the OBL center ratio (%) is suppressed and the lowering of the TE field characteristic is suppressed.

If, as compared with the diameter 4d of the light passing through the pupil 4e of the OBL 4, the width 10w of the center part 10m of the diffraction grating 10 is set to greater than 28%, the sub-PP signal amplitude level (%) decreases and the sub-PP signal amplitude level characteristic is likely to lower (FIG. 14). By setting the width 10w of the center part 10m of the diffraction grating 10 at 26% or less of the diameter 4d of the light passing through the pupil 4e of the OBL 4, the decrease in the sub-PP signal amplitude level (%) is suppressed and the lowering of the sub-PP signal amplitude level characteristic is suppressed.

If, as compared with the diameter 4d of the light passing through the pupil 4e of the OBL 4, the width 10w of the center part 10m of the diffraction grating 10 is set to greater than 28%, the TE phase difference amount increases and the TE phase difference characteristic is likely to lower (FIG. 15). By setting the width 10w of the center part 10m of the diffraction grating 10 at 26% or less of the diameter 4d of the light passing through the pupil 4e of the OBL 4, the increase in the TE phase difference amount is suppressed and the lowering of the TE phase difference characteristic is suppressed.

By setting the width 10w of the center part 10m of the diffraction grating 10 to 16 to 28%, preferably 18 to 26% as compared with the diameter 4d of the light passing through the pupil 4e of the OBL 4, the TE amplitude level (FIG. 13), the sub-PP signal amplitude level (FIG. 14), and the TE phase difference amount (FIG. 15) are likely to be set to proper values.

For example, by setting the width 10w of the center part 10m of the diffraction grating 10 to about 20% as compared with the diameter 4d of the light passing through the pupil 4e of the OBL 4, the TE amplitude level (FIG. 13), the sub-PP signal amplitude level (FIG. 14), and the TE phase difference amount (FIG. 15) are likely to be set to optimum values. Since the TE amplitude level, the sub-PP signal amplitude level, and the TE phase difference amount are set to well-balanced proper values, the tracking control of the OPU 100 can easily be performed.

The width 12w of the second region 12 of the diffraction grating 10 and the width 13w of the third region 13 of the diffraction grating 10 are both set to 10-100 μm, preferably 30-80 μm, more preferably 48-72 μm. Namely, the division part widths 12w and 13w are set to 10-100 μm, preferably 30-80 μm, more preferably to 48-72 μm.

This makes it easier to perform well the tracking of the OPU 100 for the signal side Da of the optical disk D. The tracking error signal is easily prevented from deteriorating due to, for example, the displacement of the OBJ 4, at the tames of recording or reproducing data on or from plural kinds of optical disks of different track pitches Tp.

If the width 12w of the second region 12 of the diffraction grating 10 and the width 13w of the third region 13 of the diffraction grating 10 are both a short width of less than 10 μm, or if the width 12w of the second region 12 of the diffraction grating 10 and the width 13w of the third region 13 of the diffraction grating 10 are both a long width of greater than 100 μm, a balance is lost among the TE field characteristic, the sub-PP signal amplitude level characteristic, and the TE phase difference characteristic. With a loss of balance among these characteristics, the tracking error signal deteriorates and accurate tracking of the OPU 100 can not easily be performed for the signal side Da of the optical disk D.

For example, by setting the width 12w of the second region 12 of the diffraction grating 10 and the width 13w of the third region 13 of the diffraction grating 10 both to around 30-80 μm, a balance can easily be kept substantially among the TE field characteristic, the sub-PP signal amplitude level characteristic, and the TE phase difference characteristic. Accordingly, accurate tracking 16 of the OPU 100 can easily be performed for the signal side Da of the optical disk D.

Preferably, by setting the width 12w of the second region 12 of the diffraction grating 10 and the width 13w of the third region 13 of the diffraction grating 10 both to be within the range of 48-72 μm, balance can be kept among the TE field characteristic, the sub-PP signal amplitude level characteristic, and the TE phase difference characteristic. As a result, the tracking error signal is prevented from deteriorating. Therefore, accurate tracking of the OPU 100 can be performed for the signal side Da of the optical disk D.

If the center part ratio Wr of the diffraction grating 10 is 19.0%, then the division part widths 12w and 13w of the diffraction grating 10 are 52 μm. If the center part ratio Wr of the diffraction grating 10 is 21.8%, then the division part widths 12w and 13w of the diffraction grating are 60 μm. If the center part ratio Wr of the diffraction grating 10 is 24.7%, then the division part widths 12w and 13w of the diffraction grating are 68 μm.

In the OPU equipped with the conventional three-division-type diffraction grating 90 (FIG. 22), any change in the TE field characteristic or the TE phase difference characteristic can be achieved only by changing the width 90w of the center part 90m of the three-division-type diffraction grating 90.

On the other hand, in the OPU 100 (FIG. 1) equipped with the four-division-type diffraction grating 10 (FIG. 5), in the case of changing the TE field characteristic or the TE phase difference characteristic, these characteristics can be adjusted or changed not only by changing the width 10w of the center part 10m of the four-division-type diffraction grating 10 (FIG. 5), but also by changing the phase difference between the grating pitches of the regions 12 and 13 of the center part 10m of the four-division-type diffraction grating 10.

By adjusting and setting the width 10w of the center part 10m of the tour-division-type diffraction grating 10 and the phase difference between the grating pitches of the regions 12 and 13 of the center part 10m of the four-division-type diffraction grating 10, the OPU 100 can be designed that exhibits desired performance and that keeps various characteristics well balanced. Therefore, degrees of freedom improve in designing the OPU 100.

This OPU 100 (FIG. 1) is configured to have at least, for example, the diffraction grating 10 (FIG. 5) of the substantially rectangular shape in plan view, the OBL 4 (FIG. 1) that condenses three luminous fluxes and irradiates at least three focusing spots Sa, Sb, and Sm (FIGS. 2 and 3), independent of each other, onto the signal side Da of the optical disk D (FIG. 1), and the PD 6 (FIGS. 1 and 3) that receives the reflected light of each of the three focusing spots Sa, Sb, and Sm (FIGS. 2 and 3).

If the OPU 100 is configured as above, accurate tracking of the OPU 100 can be performed for the signal side Da of the optical disk D. The amplitude of the tracking error signal deteriorating or an offset remaining in the tracking error signal due to the displacement of the OBL 4 is easily prevented at the times of recording or reproducing data on or from plural kinds of optical disks D of different track pitches.

The OPU 100 configured to have the phase-shift-type, four-division diffraction grating 10 permits a reliable operation of data reproduction or recording of the OPU 100 for the DVD-RAM. The data reproduction or recording operation of the OPU 100 can reliably be performed also for the DVD±R and DVD±RW (not shown).

The three teams diffracted by the diffraction grating 10 (FIGS. 1 and 5) are applied on the signal side Da of the optical disk D in such a manner that the main beam of the zero order diffraction of the laser light and the leading and trailing sub-beams of the ±1 order diffraction stand substantially in a line on the same track T on the signal side Da of the optical disk D, as shown in FIGS. 2 and 3.

The leading sub-spot Sa and the trailing sub-spot Sb, formed by the irradiation of the leading sub-beam and the trailing sub-beam respectively on the disk, are formed on the signal side Da of the optical disk D in such a manner that these two sub-spots stand in a line, inclined relative to the signal track direction Y, due to the phase shift regions 11 and 14 formed on the diffraction grating 10. The leading sub-spot Sa and the trailing sub-spot Sb are on a line inclined relative to the signal track direction Y and are applied on the signal side Da of the optical disk D to sandwich the main spot Sm on the disk D.

The diffraction grating 10 (FIG. 5) is divided into the regions 11, 12, 13, and 14 so that the spots Sa, Sb, and Sm can be applied on the track T on the signal side Da of the optical disk D as described above. The diffraction grating 10 has the phase shift regions 11 and 14 which cause the phase shift of a radian in the laser light so that spots Sa, Sb, and Sm are applied on the track T of the signal side Da of the disk D.

The laser light passing through the phase shift region 11 is given the phase shift of a radian relative to the laser light passing through the region 14 other than this phase shift region 11. Therefore, even if the sub-beams are applied on-track on the signal side Da of the disk D, a sub-push-pull signal according to a differential push-pull method can be generated from the sub-receiving regions of the PD 6 corresponding to the sub-beams.

As shown in FIG. 3, the PD6 is equipped with a pair of photo-detecting faces 6A and 6B that detect the reflected light of the main beam, a pair of photo-detecting faces 6C and 6D that detect the reflected light of the leading sub-beam, and a pair of photo-detecting faces 6E and 6F that detect the reflected light of the trailing sub-beam. The PD 6 receives part including the overlaps of the zero order reflected light and 23 order reflected light of each beam with, for example, two divided sections.

The pair of photo-detecting faces 6A and 6B forming part of the PD 6 are arranged adjacent to each other. The location of the photo-detecting faces 6A and 6B is adjusted so that the center of the zero order reflected light of the main beam strikes the border 6Lm between the photo-detecting faces 6A and 6B. The photo-detecting face 6A receives part including one overlap of the reflected light of the main beam, and the photo-detecting face 6B receives part including the other overlap of the reflected light of the main beam. The photo-detecting faces 6A and 6B output detected values separately.

The pair of photo-detecting faces 6C and 6D forming part of the PD 6 are arranged adjacent to each other. The location of the photo-detecting faces 6C and 6D is adjusted so that the center of the zero order reflected light of the leading sub-beam strikes the border 6La between the photo-detecting faces 6C and 6D. The photo-detecting face 6C receives part including one overlap of the reflected light of the leading sub-beam, and the photo-detecting face 6D receives part including the other overlap of the reflected light of the leading sub-beam. The photo-detecting faces 6C and 6D output detected values separately.

The pair of photo-detecting faces 6E and 6F forming part of the PD 6 are arranged adjacent to each other. The location of the photo-detecting faces 6E and 6F is adjusted so that the center of the zero order reflected light of the trailing sub-beam strikes the border 6Lb between the photo-detecting faces 6E and 67. The photo-detecting face 6E receives part including one overlap of the reflected light of the traveling sub-beam, and the photo-detecting face 6F receives part including the other overlap of the reflected light of the trailing sub-beam. The photo-detecting faces 6E and 6F output detected values separately.

In this PD 6, two photo-detecting faces form one set of photo-detecting parts and respectively receive two halves of part including the overlaps of the zero order reflected light and ±1 order reflected light of the beam. For example, four photo-detecting faces may form one set of photo-detecting parts and respectively receive four quarters of part including the overlaps of the zero order reflected light and ±1 order reflected light of the beam.

The PD 6 is connected to the arithmetic part 7. The signals generated in the PD 6 are sent to the arithmetic part 7. The arithmetic part 7 includes 4 differential amplifiers 7A to 7D, an adder 7E, and an amplifier 7F. The differential amplifier 7A calculates the difference (A-B) between the output signals of the photo-detecting faces 6A and 6B and generates a main push-pull signal. MPP. The differential amplifier 7B calculates the difference (C-D) between the output signals of the photo-detecting faces 6C and 6D and generates a leading sub-push-pull signal FSPP. The differential amplifier 7C calculates the difference (E-F) between the output signals of the photo-detecting faces 6E and 6F and generates a trailing sub-push-pull signal BSPP.

The leading sub-push-pull signal FSPP, the output signal of the differential amplifier 7B, and the trailing sub-push-pull signal BSPP, the output signal of the differential amplifier 7C, are input to the adder 7E. The adder 7E calculates an addition of these signals (FSPP+BSPP) and generates an added sub-push-pull signal SPP. The added sub-push-pull signal SPP, the output signal of the adder 7E, is input to the amplifier 7F. The amplifier 7E amplifies the added sub-push-pull signal with a gain K to a signal level equivalent to that of the main push-pull signal MPP. The output signal of the differential amplifier 7A and the output signal of the amplifier 7F are input to the differential amplifier 7D. The differential amplifier 7D calculates the difference between the main sub-push-pull signal MPP and the amplified signal of the added push-pull signal SPP and generates a tracking error signal. DPP.

The tracking error signal DPP generated in the arithmetic unit 7 is sent to the objective lens driving part 8 (FIG. 1) for automatic tracking adjustment of the OBL 4 (FIG. 1) relative to the track T (FIGS. 2 and 3) on the optical disk D.

The OPU 100 described above is mounted on the optical disk apparatus 200. The optical disk apparatus 200 is configured to have a single OPU 100.

Therefore, the optical disk apparatus 200 equipped with the OPU 100 properly performs the reading of data from the optical disk D or the writing data to the optical disk D. The tracking error signal is prevented from deteriorating due to, for example, the displacement of the OBL 4 at the times of reading data on plural kinds of optical disks D of different track pitches Tp or at the times of writing data to plural kinds of optical disks D of different track pitches Tp which optical disks D have been inserted in the optical disk apparatus 210. Therefore, the optical disk apparatus 200 can be provided that is equipped with a single OPU 100 that is easy to perform its high-accuracy tracking control.

The price of the optical disk apparatus 200 is held down if the optical disk apparatus 200 is equipped with one OPU 100 capable of handling plural kinds of optical disks D of different track pitches Tp. The situation can be avoided in which the optical disk apparatus 200 is equipped with a plurality of OPUs to handle plural kinds of optical disks D of different track pitches Tp and accordingly, the price of the optical disk apparatus 200 considerably increases.

Second Embodiment

Figure 6:
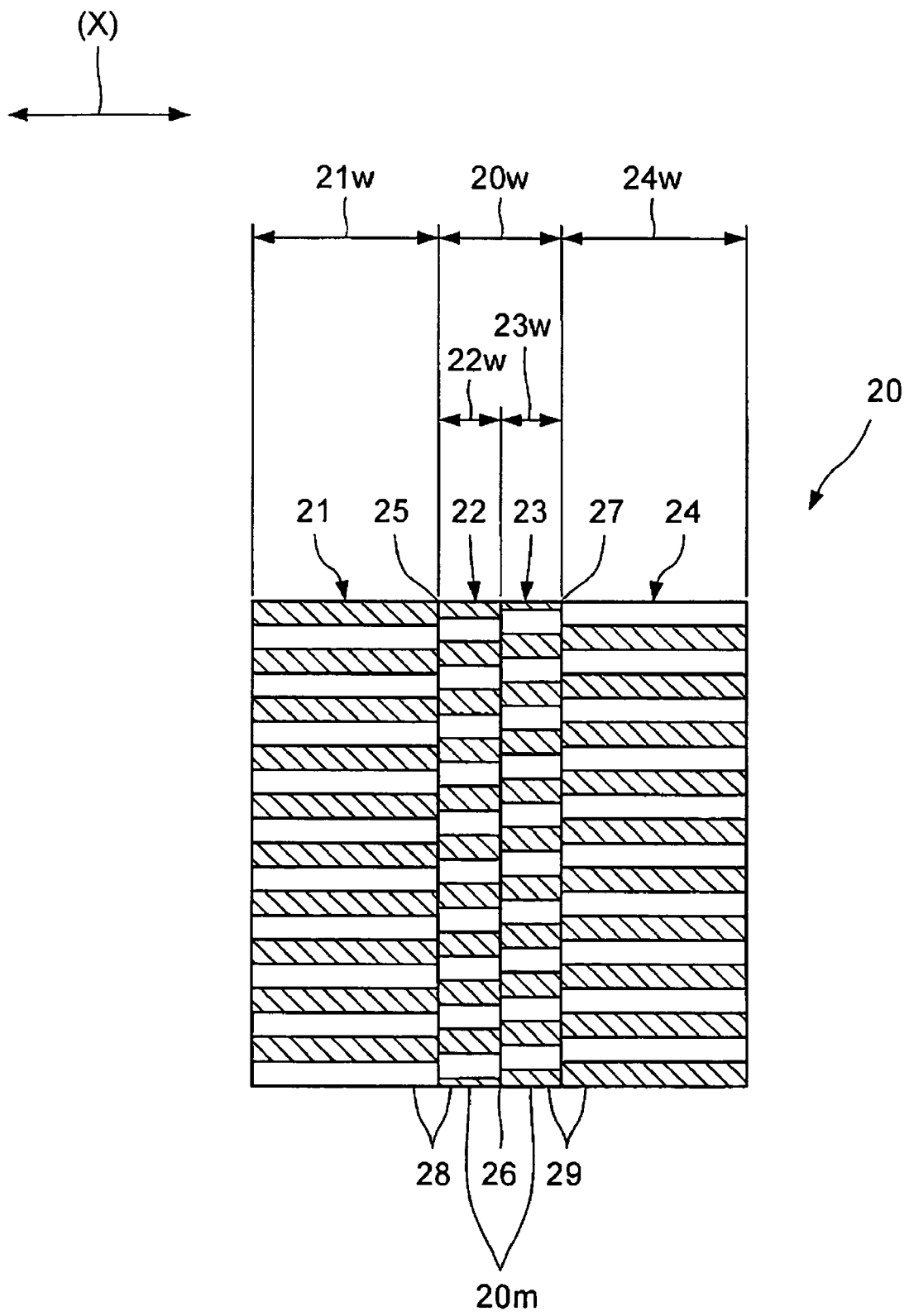
FIG. 6 is a schematic plan view of a second embodiment of the diffraction grating mounted in the optical pickup unit.
Figure 7:
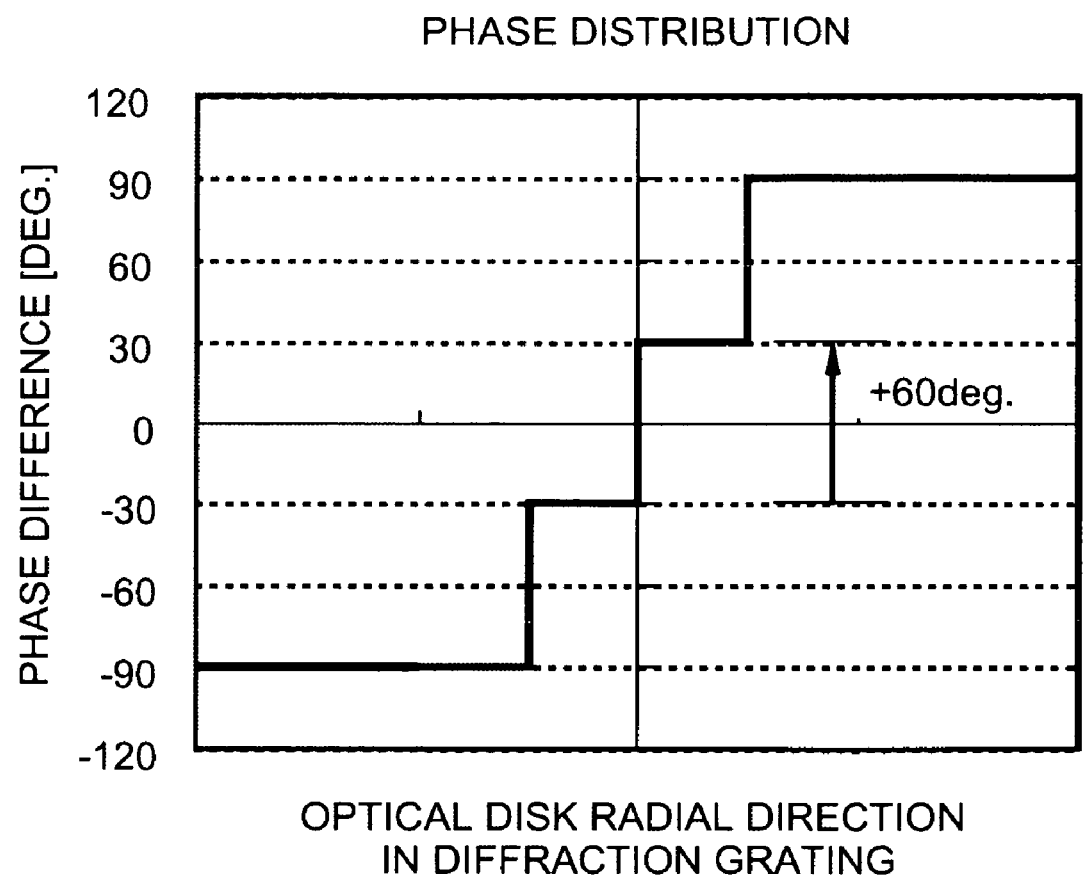
FIG. 7 is a diagram of a relationship between an optical disk radial direction and a phase difference in the diffraction grating of FIG. 6.

FIG. 6 is a schematic plan view of a second embodiment of the diffraction grating mounted in the optical pickup unit. FIG. 7 is a diagram of the relationship between an optical disk radial direction and a phase difference in the diffraction grating of FIG. 6.

A diffraction grating 20 shown in FIG. 6 is mounted in the OPU 100 (FIG. 1), in place of the diffraction grating 10 shown in FIG. 1. There is no change in the OPU 100 and the optical disk apparatus 200, except for the replacement of the diffraction grating 10 shown in FIG. 1 by the diffraction grating 20 shown in FIG. 6. The first embodiment and the second embodiment differ in that the diffraction grating 10 shown in FIG. 1 is replaced by the diffraction grating 20 shown in FIG. 6, but the components are common to the first embodiment and the second embodiment except for the diffraction gratings 10 and 20. The second embodiment will now be described, for convenience, by using FIGS. 1 to 4 and FIGS. 13 to 15 as well. In the second embodiment, the same reference numerals indicate the same components as in the first embodiment with detailed description thereof omitted.

As shown in FIG. 6, the diffraction grating 20 has phase shift regions 21 and 24 (FIG. 6) that cause a phase shift of n radian in part of the laser light applied from the LD 1 (FIG. 1). The diffraction grating 20 is divided into at least four regions, a substantially rectangular first region 21, a substantially rectilinear second region 22 adjacent to the first region 21, a substantially rectilinear third region 23 adjacent to the second region 22, and a substantially rectangular fourth region 24 adjacent to the third region 23. A predetermined periodic structure is built within each of the regions 21, 22, 23, and 24.

In the diffraction grating 20 shown in FIG. 6, for the sake of convenience, the second region 22 and the third region 23 are so drawn as to have a certain width, for easy understanding of the phase state of the second region 22 and the phase state of the third region 23. In practice, however, the second region 22 and the third region 23 of the diffraction grating 20 form a fine line having a width $20w$ of, e.g., about 20 to 200 μm. The periodic structure of each of the regions 21, 22, 23, and 24 making up the diffraction grating 20 is a periodic structure with a minute recess and raised-portion repeated. The diffraction grating 20 is a glass sheet of, e.g., about 3 to 10 mm square and about 0.3 to 3 mm in thickness.

The diffraction grating 23 shown in FIG. 6 mounted in the OPU 100 makes it easier to perform well the tracking of the OPU 100 for the signal side Da of the optical disk D. Because of the division of the diffraction grating 20 into four regions 21, 22, 23, and 24, at least three focusing spots Sa, Sb, and Sm (FIGS. 2 and 3), independent of each other, are applied on the signal side Da of the optical disk D. Since at least three focusing spots Se, Sb, and Sm, are, independently of each other, applied on the signal side Da of the optical disk D, the tracking error signal is easily prevented from deteriorating, for example, due to the displacement of the OBL 4 (FIG. 1), at the times of recording data onto plural kinds of optical disks D of different track pitches Tp or reproducing data from the plural kinds of optical disks D of different track pitches Tp. The single OPU 100 can thus be provided that is easy to perform the tracking control.

As shown in FIG. 6, the diffraction grating 20 has one regional part 28 of a substantially rectangular shape having the first region 21 and the second region 22 adjacent to the first region 21, and the other regional part 29 of a substantially rectangular shape having the third region 23 and the fourth region 24 adjacent to the third region 23. The width $21w$ of the first region 21 of the diffraction grating 20 and the width $24w$ of the fourth region 24 are about the same. The width $22w$ of the second region 22 of the diffraction grating 20 and the width $23w$ of the third region 23 are about the same. A borderline 26 between the second region 22 of the diffraction grating 20 and the third region 23 of the diffraction grating 20 adjacent to the second region 22 divides the diffraction grating 20 into two equal parts, one regional part 28 and the other regional part 29 that make up the diffraction grating 20.

As a result, the focusing spots Sa, Sb, and Sm on the signal side Da of the optical disk D are formed as accurate focusing spots Sa, Sb, and Sm. Since the borderline 26 between the second region 22 of the diffraction grating 20 and the third region 23 adjacent to the second region 22 divides the diffraction grating 20 into two equal parts, one regional part 28 having the first region 21 and the second region 22 adjacent to the first region 21 and the other regional part 29 having the third region 23 and the fourth region 24 adjacent to the third region 23, the laser light from the LD 1 applied on the diffraction grating 20 can have its optical axis easily adjusted, for example, with an optical axis adjusting camera (not shown) at the time of mounting the diffraction grating 20 in the housing (not shown) of the OPU 100. The laser light applied from the LD 1, striking the diffraction grating 20, and then transmitting through the OBL 4 is observable, with the use of, for example, the optical axis adjusting camera.

A conventional three-division-type diffraction grating 90 (FIG. 22) did not have a positioning borderline that divides the diffraction grating 90 into two equal parts, as viewed in plan. Because of the absence of the borderline used as the positioning centerline in the diffraction grating 90, difficulty was faced in irradiating the laser light onto the diffraction grating 90 and accurately mounting the diffraction grating 90 in the housing of the optical pickup unit, using the optical axis adjusting camera.

On the other hand, in the four-division-type diffraction grating 20 shown in FIG. 6, the borderline 26 is provided in the diffraction grating 20 that divides the diffraction grating 20, substantially at its center, into two equal parts, one regional part 28 of the substantially rectangular shape and the other regional, part 29 of the substantially rectangular shape. This borderline 26 makes it easier to irradiate the laser light so as to be substantially equally divided into two parts respectively on one regional part 28 of the substantially rectangular shape and the other regional part 29 of the substantially rectangular shape that make up the diffraction grating 20, at the time of adjusting the optical axis using the optical axis adjusting camera, etc.

Because of increased ease in irradiating the laser light so as to be substantially equally divided into two parts respectively on one regional part 28 of the substantially rectangular shape and the other regional part 29 of the substantially rectangular shape that make up the diffraction grating 20, the diffraction grating 20 can easily be mounted in the housing of the OPU 100, while accurately adjusting the position of the diffraction grating 20. Therefore, the focusing spots Sa, Sb, and Sm can very likely be accurately formed on the signal side Da of the optical disk D. Accordingly, the tracking of the OPU 103 can very likely be accurately performed for the signal side Da of the optical disk D.

As compared with the periodic structure of the second region 22 of the diffraction grating 20, the third region 23 of the diffraction grating 20 has the periodic structure with a phase different by within the range of 3 to 180 degrees.

Therefore, the focusing spots Sa, Sb, and Sm on the signal side Da of the optical disk D can easily be formed as focusing spots Sa, Sb, and Sm having higher accuracy. Since, as compared with the periodic structure of the second region 22 of the diffraction grating 20, the third region 23 of the diffraction grating 20 has the periodic structure with a phase different by within the range of 3 to 180 degrees, the borderline 26 is substantially clear between the second region 22 of the diffraction grating 20 and the third region 23 of the diffraction grating 20 adjacent to the second region 22.

If, as compared with the periodic structure of the second region 22, the third region 23 has the periodic structure with a phase different by less than 3 degrees, the borderline 26 is not clarified between the second region 22 and the third region 23. If, as compared with the periodic structure of the second region 22, the third region 23 has the periodic structure with a phase different by 180 degrees, the borderline 26 is most clarified between the second region 22 and the third region 23. When, as compared with the periodic structure of the second region 22, the third region 23 has the periodic structure with a phase different by, for example, 3 to 90 degrees, the diffraction grating 20 is formed to have proper characteristics, while the borderline 26 is clarified between the second region 22 and the third region 23.

Since the borderline 26 is substantially clarified between the second region 22 of the diffraction grating 20 and the third region 23 of the diffraction grating 20, the borderline 26 is clarified between one regional part 28 of the diffraction grating 20 having the first region 21 and the second region 22 adjacent to the first region 21 and the other regional part 29 of the diffraction grating 20 having the third region 23 and the fourth region 24 adjacent to the third region 23. Therefore, the laser light is applied so as to be substantially equally divided into two parts respectively on one regional part 26 of the diffraction grating 20 and the other regional part 29 of the diffraction grating 20. By irradiating the laser light so as to be substantially equally divided into two parts respectively on one regional part 28 of the diffraction grating 20 and the other regional part 29 of the diffraction grating 20, the diffraction grating 20 is accurately mounted in the housing of the OPU 100.

The substantially rectilinear second region 22 and the substantially rectilinear third region 23 forming part of the diffraction grating 20 are arranged between the substantially stripes-like first region 21 and the substantially stripes-like fourth region 24 forming part of the diffraction grating 20. The periodic structure of the second region 22 is of a different phase from that of the periodic structure of the first region 21. The periodic structure of the third region 23 is of a different phase from that of the periodic structure of the second region 22. The periodic structure of the fourth region 24 is of a different phase from that of the periodic structure of the third region 23. The periodic structure of the fourth region 24 is of a phase about 180 degrees different from that of the periodic structure of the first region 22.

As a result, the first region 21, second region 22, the third region 23, and the fourth region 24 in the diffraction grating 20 are distinguished from each other and the phase difference is clarified between the first region 21 and the fourth region 24 in the diffraction grating 20. Since the periodic structure of the fourth region 24 of the diffraction grating 20 is of a phase about 180 degrees different from that of the periodic structure of the first region 21, at least three focusing spots Sa, Sb, and Sm are formed well on the signal side Da of the optical disk D. With use of the at least three focusing spots Sa, Sb, and Sm formed well on the signal side Da of the optical disk D, the tracking error signal is easily prevented from deteriorating, for example, due to the displacement of the OBL 4, at the times of recording or reproducing data on or from plural kinds of optical disks D having different track pitches Tp.

The first region 21 and the second region 22 are separated by the borderline 25 between the first region 21 and the second region 22. The second region 22 and the third region 23 are separated by the borderline 26 between the second region 22 and the third region 23. The third region 23 and the fourth region 24 are separated by the borderline 27 between the third region 23 and the fourth region 24.

Relative to the periodic structure of the first region 21, the second region 22 has the periodic structure of a phase different by within the range of 30 to 180 degrees. Relative to the periodic structure of the second region 22, the third region 23 has the periodic structure of a phase different by within the range of 3 to 180 degrees. Relative to the periodic structure of the third region 23, the fourth region 24 has the periodic structure of a phase different by within the range of 30 to 180 degrees.

As a result, the first region 21, the second region 22, the third region 23, and the fourth region 24 are substantially clearly distinguished from each other in the diffraction grating 20. Since, relative to the periodic structure of the first region 21 of the diffraction grating 20, the second region 22 of the diffraction grating 20 has the periodic structure of a phase different by within the range of 30 to 180 degrees, the first region 22 of the diffraction grating 20 and the second region 22 of the diffraction grating 20 are clearly distinguished from each other. Since, relative to the periodic structure of the second region 22 of the diffraction grating 20, the third region 23 of the diffraction grating 20 has the periodic structure of a phase different by within the range of 3 to 180 degrees, the second region 22 of the diffraction grating 20 and the third region 23 of the diffraction grating 20 are substantially distinguished from each other. Since, relative to the periodic structure of the third region 23 of the diffraction grating 20, the fourth region 24 of the diffraction grating 20 has the periodic structure of a phase different by within range of 30 to 180 degrees, the third region 23 of the diffraction grating 20 and the fourth region 24 of the diffraction grating 20 are clearly distinguished from each other.

By dividing the diffraction grating 20 into four regions, distinguished from each other, at least three focusing spots Sa, Sb, and Sm, independent of each other, are applied on the signal side Da of the optical disk D. Since at least three focusing spots Sa, Sb, and Sm are applied, independently of each other, on the signal side Da of the optical disk D, the tracking of the OPU 100 can easily be performed for the signal side Da of the optical disk D. By appropriately setting the phase of the periodic structure of each region to be within a predetermined numerical range, degrees of freedom in designing of the diffraction grating 20 improve and at the same time, degrees of freedom in designing of the OPU 100 also improve. Therefore, the OPU 100 is configured that easily shows optimum characteristics corresponding to the location of use.

The diffraction grating 20 is formed as a sheet of a substantially rectangular shape. The diffraction grating 20, as viewed in plan, appears a substantially rectangular sheet.

The diffraction grating 20 is now viewed in plan, with the longitudinal, substantially rectangular first region 21, the longitudinal, substantially rectilinear second region 22, the longitudinal, substantially rectilinear third region 23, and the longitudinal, substantially rectangular fourth region 24 arranged side by side. In this state, if, relative to the phase of one region of the diffraction grating 20, the phase of another region adjacent to the one region at its right side is shifted substantially in a stepwise right ascending manner, the phase of the other region is described as being shifted to the plus (+) side.

The diffraction grating 20 is now viewed in plan, with the longitudinal, substantially rectangular first region 21, the longitudinal, substantially rectilinear second region 22, the longitudinal, substantially rectilinear third region 23, and the longitudinal, substantially rectangular fourth region 24 arranged side by side. In this state, if, relative to the phase of one region of the diffraction grating 20, the phase of another region adjacent to the one region at its right side is shifted substantially in a stepwise right descending manner, the phase of the other region is described as being shifted to the minus (−) side.

In viewing the diffraction grating 20 in plan, relative to the periodic structure of the first region 21, the second region 22 adjacent to the first region 21 at its right side has the periodic structure of a phase shifted to the plus side. In viewing the diffraction grating 20 in plan, relative to the periodic structure of the second region 22, the third region 23 adjacent to the second region 22 at its right side has the periodic structure of a phase shifted to the plus side. In viewing the diffraction grating 20 in plan, relative to the periodic structure of the third region 23, the fourth region 24 adjacent to the third region 23 at its right side has the periodic structure of a phase shifted to the plus side.

The diffraction grating 20 is configured in such a manner that the phases of the regions 21, 22, 23, and 24 are shifted stepwise, one after the other (FIG. 7). The diffraction grating 20 (FIG. 6) has the periodic structures of so-called forward phases.

Depending on the design, specifications, etc., of the OPU, the diffraction grating 20 shown in FIG. 6, for example, may have its stripes turned over laterally with the borderline (26) as the center, with keeping symbols, lead lines, and dimension lines, etc., substantially as they are. Describing specifically, for example, in viewing the diffraction grating (20) in plan, relative to the periodic structure of the first region (21), the second region (22) adjacent to the first region (21) at its right side can have a periodic structure having its phase shifted to the minus side. Further, in viewing the diffraction grating (20) in plan, relative to the periodic structure of the second region (22), the third region (23) adjacent to the second region (22) at its right side can have a periodic structure having its phase shifted to the minus side. Further, in viewing the diffraction grating (20) in plan, relative to the periodic structure of the third region (23), the fourth region (24) adjacent to the third region (23) at its right side can have a periodic structure having its phase shifting to the minus side.

The diffraction grating (20) is configured in such a manner that the phases of the periodic structures of regions (21), (22), (23), and (24) are shifted stepwise, one after the other. The diffraction grating (20) has the periodic structures of so-called forward phases.

By mounting the diffraction grating having the periodic structures of the forward phases on the OPU, the sub-PP signal amplitude level increases, and the sub-PP signal amplitude level characteristic is likely to improve (FIG. 14). The sub-PP signal amplitude level (%) is prevented from decreasing and the sub-PP signal amplitude level characteristic is prevented from lowering.

The TE phase difference amount decreases and TE phase difference characteristic is likely to improve (FIG. 15). The TE phase difference amount is prevented from increasing and the TE phase difference characteristic is prevented from lowering.

Since the sub-PP signal amplitude level characteristic improves and, at the same time, the TE phase difference characteristic improves, this OPU is preferably installed in the optical disk apparatus for a desktop-type PC. Since the OPU used in the optical disk apparatus for the desktop-type PC can use a large-size OBL, still considering the field characteristic, the sub-PP signal amplitude level characteristic and the TE phase difference characteristic may be given greater importance than the field characteristic in designing.

As shown in FIG. 6, relative to the periodic structure of the first region 21, the second region 22 has a periodic structure of a phase differing about +60 degrees. Relative to the periodic structure of the second region 22, the third region 23 has a periodic structure of a phase differing about +60 degrees. Relative to the periodic structure of the first region 21, the third region 23 has a periodic structure of a phase differing about +120 degrees. Relative to the periodic structure of the third region 23, the fourth region 24 has a periodic structure of a phase differing about +60 degrees. Relative to the periodic structure of the first region 21, the fourth region 24 has the periodic structure of the phase differing about +180 degrees.

By mounting thus configured grating 20 on the OPU 100, the sub-PP signal amplitude level (%) increases and the sub-PP signal amplitude level characteristic considerably improves (FIG. 14). The sub-PP signal amplitude level (%) is prevented from decreasing and the sub-PP signal amplitude level characteristic is prevented from lowering. The sub-PP signal amplitude level characteristic of this OPU 100 is much better (FIG. 14) than the sub-PP signal amplitude level characteristic of an OPU (not shown) having the conventional diffraction grating 90, which is divided into three phase regions 91, 92, and 93 (FIG. 22).

The TE phase difference amount decreases and the TE phase difference characteristic considerably improves (FIG. 15). The TE phase difference amount is prevented from increasing and the TE phase difference characteristic is prevented from lowering. The TE phase difference characteristic of this OPU 100 is much better (FIG. 15) than the TE phase difference characteristic of an OPU (not shown) having the conventional diffraction grating 90, which is divided into three phase regions 91, 92, and 93 (FIG. 22).

The OPU 100 (FIG. 1), which implements the tracking error detection method according to the in-line DPP method, with the use of the phase-shift-type, 4-division diffraction grating 20 (FIG. 6) can suppress the TE phase difference amount to a small amount (FIG. 15), as compared with an OPU using the conventional three-division diffraction grating (FIG. 22). Therefore, the optical disk apparatus 200 equipped with the OPU 100 (FIG. 1) having the phase-shift-type, 4-division diffraction grating 20 (FIG. 6) can read or write data or information from or to the medium D in a reliable operation, as to any medium D having, for example, different track pitches Tp (FIGS. 2 and 3).

Since the sub-PP signal amplitude level characteristic of the light applied on the signal side Da of the optical disk D considerably improves and also the TE phase difference characteristic considerably improves, this OPU 100 is preferably installed in the optical disk apparatus for a desktop-type PC.

The regions 22, 23, the combination of the second region 22 and the third region 23 of the diffraction grating 20 (FIG. 6), form a longitudinal center part 20m of the diffraction grating 20. As compared with a diameter 4d of the light passing through the pupil 4e of the OBL 4 (FIG. 1), the width 20w of the center part 20m (FIGS. 1 and 6) of the diffraction grating 20 is from 16 to 28%, preferably 18 to 26%. Namely, a center part ratio Wr of the diffraction grating 20 is from 16 to 28%, preferably be 18 to 26% (FIGS. 13 to 15)

By mounting thus configured diffraction grating 20 in the CPU 130, the tracking error signal is easily prevented from deteriorating due to the displacement of the OBL 4 at the times of recording or reproducing data on or from plural kinds of optical disks D of different track pitches Tp.

If, as compared with the diameter 4d of the light passing through the pupil 4e of the OBL 4 (FIG. 1), the width 20w of the center part 20m (FIGS. 1 and 5) of the diffraction grating 20 is set to less than 16%, the TE amplitude level (%) decreases and the TE field characteristic is likely to lower (FIG. 13). Namely, by setting the center part ratio Wr of the diffraction grating to less than 16%, the OBL center ratio (%) decreases and the TE field characteristics is likely to lower. When, as compared with the diameter 4d of the light passing through the pupil 4e of the OBL 4, the width 20w of the center part 20n of the diffraction grating 20 is set to 18% or over, the decrease in the TE amplitude level is suppressed and the lowering of the TE field characteristic is suppressed. Namely, by setting the center part ratio Wr of the diffraction grating 20 to 18% or over, the decrease in the OBL center ratio (%) is suppressed and the lowering of the TE field characteristic is suppressed.

If, as compared with the diameter 4d of the light passing through the pupil 4e of the OBL 4, the width 20w of the center part 20m of the diffraction grating 20 is set to greater than 28%, the sub-PP signal amplitude level (%) decreases and the sub-PP signal amplitude level characteristic is likely to lower (FIG. 14). By setting the width 20w of the center part 20m of the diffraction grating 20 to 26% or less of the diameter 4d of the light passing through the pupil 4e of the OBL 4, the decrease in the sub-PP signal amplitude level (%) is suppressed and the lowering of the sub-PP signal amplitude level characteristic is suppressed.

When, as compared with the diameter 4d of the light passing through the pupil 4e of the OBL 4, the width 20w of the center part 20m of the diffraction grating 20 is set to greater than 28%, the TE phase difference amount increases and the TE phase difference characteristic is likely to lower (FIG. 15). By setting the width 20w of the center part 20m of the diffraction grating 20 to 26% or less of the diameter 4d of the light passing through the pupil 4e of the OBL 4, the increase in the TE phase difference amount is suppressed and the lowering of the TE phase difference characteristics is suppressed.

By setting the width 20w of the center part 20m of the diffraction grating 20 to 16 to 28%, or preferably 18 to 26% as compared with the diameter 4d of the light passing through the pupil 4e of the OBL 4, the TE amplitude level (FIG. 13), the sub-PP signal amplitude level (FIG. 14), and the TE phase difference amount (FIG. 15) are likely to be set to proper values.

For example, by setting the width 20w of the center part 20m of the diffraction grating 20 to about 20% as compared with the diameter 4d of the light passing through the pupil 4e of the OBL 4, the TE amplitude level (FIG. 13), the sub-PP signal amplitude level (FIG. 14), and the TE phase difference amount (FIG. 15) are likely to be set to optimum values. Since the TE amplitude level, the sub-PP signal amplitude level, and the TE phase difference amount are set to well-balanced proper values, the tracking control of the OPU 100 can easily be performed.

The width 22w of the second region 22 of the diffraction grating 20 and the width 23w of the third region 23 of the diffraction grating 20 are both set to 10-100 μm, preferably 30-80 μm, and much preferably 48-72 ml. Namely, the division part widths 22w and 23w are set to 10-100 μm, preferably 30-90 μm, and much preferably 48-72 μm.

This makes it easier to perform well the tracking of the OPU 100, relative to the signal side Da of the optical disk 3. The tracking error signal is easily prevented from deteriorating due to, for example, the displacement of the OBJ 4, at the times of recording or reproducing data on or from plural kinds of optical disks D of different track pitches Tp.

If the width 22w of the second region 22 of the diffraction grating 20 and the width 23w of the third region 23 of the diffraction grating 20 are both a short width of less than 10 μm, or if the width 22w of the second region 22 of the diffraction grating 20 and the width 23w of the third region 23 of the diffraction grating 20 are both a long width of greater than 100 μm, a balance is lost among the TE field characteristic, the sub-PP signal amplitude level characteristic, and the TE phase difference characteristic. With a loss of balance among these characteristics, the tracking error signal deteriorates and accurate tracking of the OPU 100 can not easily be performed for the signal side Da of the optical disk D.

For example, by setting the width 22w of the second region 22 of the diffraction grating 20 and the width 23w of the third region 23 of the diffraction grating 20 both to around 30-80 μm, a balance can easily be kept substantially among the TE field characteristic, the sub-PP signal amplitude level characteristic, and the TE phase difference characteristic. Accordingly, accurate tracking of the OPU 100 can easily be performed for the signal side Da of the optical disk D.

Preferably, by setting the width 22w of the second region 22 of the diffraction grating 20 and the width 23w of the third region 23 of the diffraction grating 20 both to be within the range of 48-72 μm, a balance can be kept among the TE field characteristic, the sub-PP signal amplitude level characteristic, and the TE phase difference characteristic. As a result, the tracking error signal is prevented from deteriorating. Therefore, accurate tracking of the OPU 100 can be performed for the signal side Da of the optical, disk D.

If the center part ratio Wr of the diffraction grating 20 is 22.9%, then the division part widths 22w and 23w of the diffraction grating 20 are 63 μm. If the center part ratio Wr of the diffraction grating 20 is 25.8%, then the division part widths 22w and 23w of the diffraction grating are 71 μm.

In the OPU equipped with the conventional three-division-type diffraction grating 90 (FIG. 22), any change in the TE field characteristic or the TE phase difference characteristic can be achieved only by changing the width 90w of the center part 90m of the three-division-type diffraction grating 90.

On the other hand, in the OPU 100 (FIG. 1) equipped with the four-division-type diffraction grating 20 (FIG. 6), in the case of changing the TE field characteristic or the TE phase difference characteristic, these characteristics can be adjusted or changed not only by changing the width 20w of the center part 20m of the four-division-type diffraction grating 20 (FIG. 6), but also by changing the phase difference between the grating pitches of the regions 22 and 23 of the center part 20m of the four-division-type diffraction grating 20.

By adjusting and setting the width 20w of the center part 20m of the four-division-type diffraction grating 20 and the phase difference of the grating pitches of the regions 22 and 23 of the center part 20m of the four-division-type diffraction grating 20, the OPU 100 can be designed that exhibits desired performance and that keeps various characteristics well balanced. Therefore, degrees of freedom improve in designing the OPU 100.

This OPU 100 (FIG. 1) is configured to have at least, for example, the diffraction grating 20 (FIG. 6) of the substantially rectangular shape in plan view, the OBL 4 (FIG. 1) that condenses three luminous fluxes and irradiates at least three focusing spots Sa, Sb, and Sm (FIGS. 2 to 3), independent of each other, onto the signal side Da of the optical disk D (FIG. 1), and the PD 6 (FIGS. 1 and 3) that receives the reflected light of each of the three focusing spots Sa, Sb, and Sm (FIGS. 2 and 3).

If the OPU 100 is configured as above, accurate tracking of the OPU 100 can be performed for the signal side Da of the optical disk D. The amplitude of the tracking error signal deteriorating or an offset remaining in the tracking error signal due to the displacement of the OBL 4 is easily prevented at the times of recording or reproducing data on or from plural kinds of optical disks D of different track pitches Tp.

The OPU 100 configured to have the phase-shift-type, four-division diffraction grating 20 permits a reliable operation of data reproduction or recording of the OPU 100 for the DVD-RAM. The data reproduction or recording operation of the OPU 100 can reliably be performed also for the DVD±R and DVD±RW (not shown).

The OPU 100 (FIG. 1) described above is mounted on the optical disk apparatus 200. The optical disk apparatus 200 is configured to have a single OPU 100.

The optical disk apparatus 200 can thus be provided that is equipped with a single OPU 100 that is easy to perform the accurate tracking control. Further, the price of the optical disk apparatus 200 is held down if the optical disk apparatus 200 is equipped with one OPU 200 capable of handling plural kinds of optical discs D of different track pitches Tp.

Third Embodiment

Figure 8:
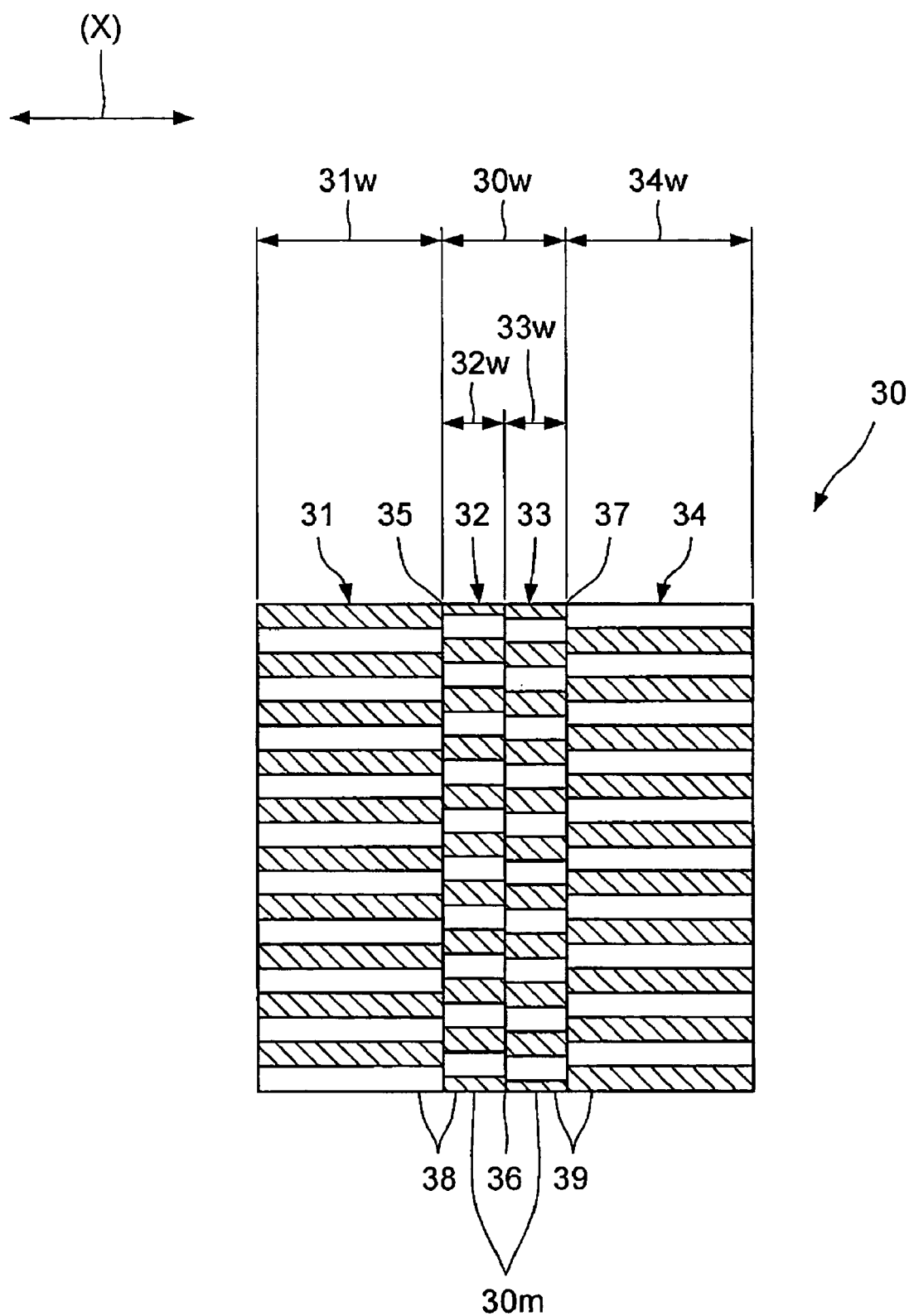
FIG. 8 is a schematic plan view of a third embodiment of the diffraction grating mounted in the optical pickup unit.

FIG. 8 is a schematic plan view of a third embodiment of the diffraction grating mounted in the optical pickup unit.

A diffraction grating 30 shown in FIG. 8 is mounted on the OPU 100 (FIG. 1), in place of the diffraction grating 10 shown in FIG. 1. There is no change in the OPU 100 or the optical disk apparatus 200, except for the replacement of the diffraction grating 10 shown in FIG. 1 by the diffraction grating 30 shown in FIG. 8. The first embodiment and the third embodiment differ in that the diffraction grating 10 shown in FIG. 11s replaced by the diffraction grating 30 shown in FIG. 8, but the components are common to the first embodiment and the third embodiment except for the diffraction gratings 10 and 30. The third embodiment will now be described, for convenience, by using FIGS. 1 to 4 and FIGS. 13 to 15 as well. In the third embodiment, the same reference numerals indicate the same components as in the first embodiment with detailed description thereof omitted.

As shown in FIG. 8, the diffraction grating 30 has phase shift regions 31 and 34 (FIG. 8) that cause a phase shift of n radian in part of the laser light applied from the LD 1 (FIG. 1). The diffraction grating 30 is divided into at least four regions, a substantially rectangular first region 31, a substantially rectilinear second region 32 adjacent to the first region 31, a substantially rectilinear third region 33 adjacent to the second region 32, and a substantially rectangular fourth region 34 adjacent to the third region 33. A predetermined periodic structure is built within each of the regions 31, 32, 33, and 34.

In the diffraction grating 30 shown in FIG. 8, for the sake of convenience, the second region 32 and the third region 33 are so drawn as to have a certain width, for easy understanding of a phase state of the second region 32 and the phase state of the third region 33. In practice, however, the second region 32 and the third region 33 of the diffraction grating 30 form a fine line having a width 30w of, e.g., about 20 to 200 μm. The periodic structure of each of the regions 31, 32, 33, and 34 making up the diffraction grating 30 is a periodic structure with a minute recess and raised-portion repeated. The diffraction grating 30 is a glass sheet of, e.g., about 3 to 10 mm square and about 0.3 to 3 mm in thickness.

The diffraction grating 30 shown in FIG. 8 mounted in the OPU 100 makes it easier to perform well the tracking of the OPU 100 for the signal side Da of the optical disk D. Because of the division of the diffraction grating 30 into four regions 31, 32, 33, and 34, at least three focusing spots Sa, Sb, and Sm (FIGS. 2 to 3), independent of each other, are applied on the signal side Da of the optical disk D. Since at least three focusing spots Sa, Sb, and Sm, independently of each other, are applied on the signal side Da of the optical disk D, the tracking error signal is easily prevented from deteriorating, for example, due to the displacement of the OBL 4 (FIG. 1), at the times of recording data onto plural kinds of optical disk D of different track pitches Tp or reproducing data from the plural kinds of optical disk D of different track pitches Tp. The single-unit OPU 100 can thus be provided that is easy to perform the tracking control.

As shown in FIG. 8, the diffraction grating 30 has one regional part 38 of a substantially rectangular shape having the first region 31 and the second region 32 adjacent to the first region 31, and the other regional part 39 of a substantially rectangular shape having the third region 33 adjacent to the second region 32 and the fourth region 34 adjacent to the third region 33. The width 31w of the first region 31 of the diffraction grating and the width 34w of the fourth region 34 are about the same. The width 32w of the second region 32 of the diffraction grating 30 and the width 33w of the third region 33 are about the same. A borderline 36 between the second region 32 of the diffraction grating 30 and the third region 33 of the diffraction grating 30 adjacent to the second region 32 divides the diffraction grating 30 into two equal parts, one regional part 38 and the other regional part 39 that make up the diffraction grating 30.

As a result, the focusing spots Sa, Sb, and Sm on the signal side of the optical disk D are formed as accurate focusing spots Sa, Sb, and Sm. Since the borderline 36 between the second region 32 of the diffraction grating 30 and the third region 33 adjacent to the second region 32 divides the diffraction grating 30 into two equal parts, one regional part 38 having the first region 31 and the second region 32 adjacent to the first region 31 and the other regional part 39 having the third region 33 and the fourth region 34 adjacent to the third region 33, the laser light from the LD 1 applied on the diffraction grating 30 can have its optical axis easily adjusted, for example, with an optical axis adjusting camera not shown, at the time of mounting the diffraction grating 30 in the housing (not shown) of the OPU 100. The laser light applied from the LD 1, striking the diffraction grating 30, and then transmitting through the OBL 4, is observable, with the use of, for example, the optical axis adjusting camera.

A conventional three-division-type diffraction grating 90 (FIG. 22) did not have a positioning borderline that divides the diffraction grating 90 into two equal parts, as viewed in plan. Because of the absence of the borderline used as the positioning centerline in the diffraction grating 90, difficulty was faced in irradiating the laser light to the diffraction grating 90, while setting the center of the laser light to the center of the diffraction grating 90, and accurately mounting the diffraction grating 90 in the housing of the optical pickup unit, using the optical axis adjusting camera.

On the other hand, in the four-division-type diffraction grating 30 shown in FIG. 8, the borderline 36 is provided in the diffraction grating 30 that divides the diffraction grating 30, substantially at its center, into two equal parts, one regional part 38 of the substantially rectangular shape and the ether regional part 39 of the substantially rectangular shape. This borderline 36 makes it easier to irradiate the laser light so as to be substantially equally divided into two parts respectively on one regional part 38 of the substantially rectangular shape and the other regional part 39 of the substantially rectangular shape that make up the diffraction grating 30, at the time of adjusting the optical axis, using the optical axis adjusting camera, etc.

Because of increased ease in irradiating the laser light so as to be substantially equally divided in two parts respectively on one regional part 38 of the substantially rectangular shape and the other regional part 39 of the substantially rectangular shape that make up the diffraction grating 30, the diffraction grating 30 can more easily be mounted in the housing of the OPU 100, while accurately adjusting the position of the diffraction grating 30. Therefore, the focusing spots Sa, Sb, and Sm can very likely be accurately formed on the signal side Da of the optical disk D. Accordingly, accurate tracking of the OPU 100 can easily be performed for the signal side Da of the optical disk D.

As compared with the periodic structure of the second region 32 of the diffraction grating 30, the third region 33 of the diffraction grating 30 has the periodic structure with a phase different by within the range of 3 to 180 degrees.

Therefore, the focusing spots Sa, Sb, and Sm on the signal side Da of the optical disk D are likely to be formed as focusing spots Sa, Sb, and Sm having higher accuracy. Since, as compared with the periodic structure of the second region 32 of the diffraction grating 30, the third region 33 of the diffraction grating 30 has the periodic structure with a phase different by within the range of 3 to 180 degrees, the borderline 36 is substantially clear between the second region 32 of the diffraction grating 30 and the third region 33 of the diffraction grating 30 adjacent to the second region 32.

If, as compared with the periodic structure of the second region 32, the third region 33 has the periodic structure with a phase different by less than 3 degrees, the borderline 36 is not clarified between the second region 32 and the third region 33. When, as compared with the periodic structure of the second region 32, the third region 33 has the periodic structure with a phase different by 180 degrees, the borderline 36 is most clarified between the second region 32 and the third region 33. When, as compared with the periodic structure of the second region 32, the third region 33 has the periodic structure with a phase different by, for example, 3 to 90 degrees, the diffraction grating 30 is formed to have proper characteristics, while the borderline 36 is clarified between the second region 32 and the third region 33.

Since the borderline 36 is substantially clarified between the second region 32 of the diffraction grating 30 and the third region 33 of the diffraction grating 30, the borderline 36 is clarified between one regional part 38 of the diffraction grating 30 having the first region 31 and the second region 32 adjacent to the first region 31 and the other regional part 39 of the diffraction grating 30 having the third region 33 and the fourth region 34 adjacent to the third region 33. Therefore, the laser light is applied so as to be substantially equally divided into two parts respectively on one regional part 38 of the diffraction grating 30 and the other regional part 39 of the diffraction grating 30. By irradiating the laser light so as to be substantially equally divided into two parts respectively on one regional part 39 of the diffraction grating 30 and the other regional part 39 of the diffraction grating 30, the diffraction grating 30 is accurately mounted in the housing of the OPU 100.

The substantially rectilinear second region 32 and the substantially rectilinear third region 33 forming part of the diffraction grating 30 are arranged between the substantially stripes-like first region 31 and the substantially stripes-like fourth region 34 forming part of the diffraction grating 30. The periodic structure of the second region 32 is of a different phase from that of the periodic structure of the first region 31. The periodic structure of the third region 33 is of a different phase from that of the periodic structure of the second region 32. The periodic structure of the fourth region 34 is of a different phase from that of the periodic structure of the third region 33. The periodic structure of the fourth region 34 is of a phase about 180 degrees different from that of the periodic structure of the first region 31.

As a result, the first region 31, second region 32, the third region 33, and the fourth region 34 in the diffraction grating 30 are distinguished from each other and the phase difference is clarified between the first region 31 and the fourth region 34 in the diffraction grating 30. Since the periodic structure of the fourth region 34 of the diffraction grating 30 is of a phase about 180 degrees different from that of the periodic structure of the first region 31 of the diffraction grating 30, at least three focusing spots Sa, Sb, and Sm are formed well on the signal side Da of the optical disk D. With use of the at least three focusing spots Sa, Sb, and Sm formed well on the signal side Da of the optical disk D, the tracking error signal is easily prevented from deteriorating, for example, due to the displacement of the OBL 4, at the times of recording or reproducing data on or from plural kinds of the optical disks D having different track pitches Tp.

The first region 31 and the second region 32 are separated by the borderline 35 between the first region 31 and the second region 32. The second region 32 and the third region 33 are separated by the borderline 36 between the second region 32 and the third region 33. The third region 33 and the fourth region 34 are separated by the borderline 37 between the third region 33 and the fourth region 34.

Relative to the periodic structure of the first region 31, the second region 32 has the periodic structure with a phase different by within the range of 30 to 180 degrees. Relative to the periodic structure of the second region 32, the third region 33 has the periodic structure with a phase different by within the range of 3 to 180 degrees. Relative to the periodic structure of the third region 33, the fourth region 34 has the periodic structure with a phase different by within the range of 33 to 180 degrees.

As a result, the first region 31, the second region 32, the third region 33, and the fourth region 34 are substantially clearly distinguished from each other in the diffraction grating 30. Since, relative to the periodic structure of the first region 31 of the diffraction grating 30, the second region 32 of the diffraction grating 30 has the periodic structure with a phase different by within the range of 30 to 180 degrees, the first region 31 of the diffraction grating 30 and the second region 32 of the diffraction grating 30 are clearly distinguished from each other. Since, relative to the periodic structure of the second region 32 of the diffraction grating 30, the third region 33 of the diffraction grating 30 has the periodic structure with a phase different by within the range of 3 to 180 degrees, the second region 32 of the diffraction grating 30 and the third region 33 of the diffraction grating 30 are substantially distinguished from each other. Since, relative to the periodic structure of the third region 33 of the diffraction grating 30, the fourth region 34 of the diffraction grating 30 has the periodic structure with a phase different by within the range of 30 to 180 degrees, the third region 33 of the diffraction grating 30 and the fourth region 34 of the diffraction grating 30 are clearly distinguished from each other.

By dividing the diffraction grating 30 into four regions, distinguished from each other, at least three focusing spots Sa, Sb, and Sm, independent of each other, are applied on the signal side Da of the optical disk D. Since at least three focusing spots Sa, Sb, and Sm are applied, independently of each other, on the signal side Da of the optical disk D, the tracking of the OPU 100 can easily be performed for the signal side Da of the optical disk D. By appropriately setting the phase of the periodic structure of each region to be within a predetermined numerical range, degrees of freedom in designing of the diffraction grating 30 improve and at the same time, degrees of freedom in designing of the OPU 100 also improve. Therefore, the OPU 100 is configured that easily shows optimum characteristics corresponding to the location of use.

The diffraction grating 30 is formed as a sheet of a substantially rectangular shape. The diffraction grating 30, as viewed in plan, appears a substantially rectangular sheet.

The diffraction grating 30 is now viewed in plan, with the longitudinal, substantially rectangular first region 31, the longitudinal, substantially rectilinear second region 32, the longitudinal, substantially rectilinear third region 33, and the longitudinal, substantially rectangular fourth region 34 arranged side by side. In this state, if, relative to the phase of one region of the diffraction grating 30, the phase of another region adjacent to the one region at its right side is shifted substantially in a stepwise right ascending manner, the phase of the other region is described as being shifted to the plus (+) side.

The diffraction grating 30 is now viewed in plan, with the longitudinal, substantially rectangular first region 32, the longitudinal, substantially rectilinear second region 32, the longitudinal, substantially rectilinear third region 33, and the longitudinal, substantially rectangular fourth region 34 arranged side by side. In this state, if, relative to the phase of one region of the diffraction grating 30, the phase of the other region adjacent to the one region at its right side is shifted substantially in a stepwise right descending manner, the phase of the other region is described as being shifted to the minus (−) side.

In viewing the diffraction grating 30 in plan, relative to the periodic structure of the first region 31, the second region 32 adjacent to the first region 31 at its right side has the periodic structure of a phase shifted to the plus side. In viewing the diffraction grating 30 in plan, relative to the periodic structure of the second region 32, the third region 33 adjacent to the second region 32 at its right side has the periodic structure of a phase shifted to the minus side. In viewing the diffraction grating 30 in plan, relative to the periodic structure of the third region 33, the fourth region 34 adjacent to the third region 33 at its right side has the periodic structure of a phase shifted to the plus side.

The diffraction grating 30 is configured in such a manner that only the third region 33 has the periodic structure of a phase shifted in the opposite direction to that of the phases of the periodic structures of the first region 31, the second region 32, and the fourth region 34. The diffraction grating 30 has the periodic structures of so-called opposite phases.

Depending on the design, specifications, etc., of the OPU, the diffraction grating 30 shown in FIG. 8, for example, may have its stripes turned over laterally with the borderline (36) as the center, with keeping symbols, lead lines, dimension lines, etc., substantially as they are. Describing specifically, for example, in viewing the diffraction grating (30) in plan, relative to the periodic structure of the first region (31), the second region (32) adjacent to the first region (31) at its right side can have a periodic structure having its phase shifted to the minus side. Further, in viewing the diffraction grating (30) in plan, relative to the periodic structure of the second region (32), the third region (33) adjacent to the second region (32) at its right side can have a periodic structure having its phase shifted to the plus side. Further, in viewing the diffraction grating (30) in plan, relative to the periodic structure of the third region (33), the fourth region (34) adjacent to the third region (33) at its right side can have a periodic structure having its phase shifted to the minus side.

The diffraction grating (30) is configured in such a manner that only the third region (33) has the periodic structure of a phase shifted in the opposite direction to that of the phases of the periodic structures of the first region (31), the second region (32), and the fourth region (34). The diffraction grating (30) has the periodic structures of so-called opposite phases.

By mounting the diffraction grating having the periodic structures of the opposite phases on the OPU, the TE amplitude level (%) increases, and TS field characteristic easily improves (FIG. 13). The TE amplitude level (%) is prevented from decreasing and the field characteristic is prevented from lowering. Since the field characteristic improves, this OPU is preferably installed in the optical disk apparatus for a notebook-type or laptop-type PC. Since the OPU used in the optical disk apparatus for the notebook-type or laptop-type PC uses a small-size OBL, mainly the field characteristic is given importance.

As shown in FIG. 8, relative to the periodic structure of the first region 31, the second region 32 has a periodic structure of a phase differing about +105 degrees. Relative to the periodic structure of the second region 32, the third region 33 has a periodic structure of a phase differing about −30 degrees. Relative to the periodic structure of the first region 31, the third region 33 has a periodic structure of a phase differing about +75 degrees. Relative to the periodic structure of the third region 33, the fourth region 34 has a periodic structure of a phase differing about +105 degrees. Relative to the periodic structure of the first region 31, the fourth region 34 has a periodic structure of a phase differing about +180 degrees.

By mounting thus configured diffraction grating 30 in the OPU 100, the TE amplitude level (%) increases and the field characteristic improves (FIG. 13). The TE amplitude level (%) is prevented from decreasing and the field characteristic is prevented from lowering. The field characteristic of this OPU 100 is better (FIG. 13) than the field characteristic of an OPU (not shown having the conventional diffraction grating 90, which is divided into three phase regions 91, 92, and 93 (FIG. 22). Since the TE field characteristic improves, this OPU 100 is preferably installed in the optical disk apparatus for the notebook-type or laptop-type PC.

The regions 32, 33, the combination of the second region 32 and the third region 33 of the diffraction grating 30 (FIG. 8), form a longitudinal center part 30m of the diffraction grating 30. As compared with the diameter 4d of the light passing through the pupil 4e of the OBL 4 (FIG. 1), the width 30w of the center part 30m (FIGS. 1 and 8) of the diffraction grating 30 is from 16 to 28%, preferably 18 to 26%. Namely, a center part ratio Wr of the diffraction grating 30 is from 16 to 28%, preferably 18 to 26% (FIGS. 13 to 15)

By mounting thus configured diffraction grating 30 in the OPU 100, the tracking error signal is easily prevented from deteriorating due to the displacement of the OBL 4 at the times of recording or reproducing data on or from plural kinds of optical disks D of different track pitches Tp.

If, as compared with the diameter 4d of the light passing through the pupil 4e of the OBL 4, the width 30w of the center part 30m of the diffraction grating 30 is set to less than 16%, the TE amplitude level (%) decreases and the TE field characteristics is likely to lower (FIG. 13). Namely, by setting the center part ratio Wr of the diffraction grating 30 to less than 16%, the OBL center ratio (%) decreases and the TE field characteristic is likely to lower. When, as compared with the diameter 4d of the light passing through the pupil 4e of the OBL 4, the width 30w of the center part 30m of the diffraction grating is set to 18% or over, the TE amplitude level (%) is prevented from decreasing and the TE field characteristic is prevented from lowering. Namely, by setting the center part ratio Wr of the diffraction grating 30 to 18% or over, the OBL center ratio (t) is prevented from decreasing, and the TE field characteristic is prevented from lowering.

If, as compared with the diameter 4d of the light passing through the pupil 4e of the OBL 4, the width 30w of the center part 30m of the diffraction grating 30 is set to greater than 28%, the sub-PP signal amplitude level (%) decreases and the sub-PP signal amplitude level characteristic is likely to lower (FIG. 14). By setting the width 30w of the center part 30m of the diffraction grating 30 to 26% or less of the diameter 4d of the light passing through the pupil 4e of the OBL 4, the sub-PP signal amplitude level (%) is prevented from decreasing and the sub-PP signal amplitude level characteristic is prevented from lowering.

If, as compared with the diameter 4d of the light passing through the pupil 4e of the OBL 4, the width 30w of the center part 33m of the diffraction grating 30 is set to greater than 28%, the TE phase difference amount increases and the TE phase difference characteristic is likely to lower (FIG. 15). By setting the width 30w of the center part 30m of the diffraction grating 30 to 26% or less of the diameter 4d of the light passing through the pupil 4e of the OBL 4, the TE phase difference amount is prevented from increasing and the TE phase difference characteristic is prevented from lowering.

By setting the width 30w of the center part 30m of the diffraction grating 30 to 16 to 28%, or preferably 18 to 26% of the diameter 4d of the light passing through the pupil 4e of the OBL 4, the TE amplitude level (FIG. 13), the sub-PP signal amplitude level (FIG. 14), and the TE phase difference amount (FIG. 15) can easily be set to proper values.

For example, by setting the width 30w of the center part 30m of the diffraction grating 30 to about 20% of the diameter 4d of the light passing through the pupil 4e of the OBL 4, the TE amplitude level (FIG. 13), the sub-PP signal amplitude level (FIG. 14), and the TE phase difference amount (FIG. 15) can easily be set to optimum values. Since the TE amplitude level, the sub-PP signal amplitude level, and the TE phase difference amount are set to well-balanced proper values, the tracking control of the OPU 100 can easily be performed.

The width 32w of the second region 32 of the diffraction grating 30 and the width 33w of the third region 33 of the diffraction grating 30 are both set to 10-100 µm, preferably 30-80 µm, much preferably 48-72 µm. Namely, the division part widths 32w and 33w of the diffraction grating 30 are set to 10-100 µm, preferably 30-80 µm, much preferably 46-72 µm.

This makes it easier to perform well the tracking of the OPU 100 for the signal side Da of the optical disk D. The tracking error signal is easily prevented from deteriorating due to, for example, the displacement of the OBJ 4, at the times of recording or reproducing data on or from plural kinds of optical disks D of different track pitches Tp.

If the width 32w of the second region 32 of the diffraction grating 30 and the width 33w of the third region 33 of the diffraction grating 30 are both a short width of less than 10 µm, or if the width 32w of the second region 32 of the diffraction grating 30 and the width 33w of the third region 33 of the diffraction grating 30 are both a long width of greater than 100 µm, a balance is lost among the TE field characteristic, the sub-PP signal amplitude level characteristic, and the TE phase difference characteristic. With a loss of balance among these characteristics, the tracking error signal deteriorates and accurate tracking of the OPU 100 can not easily be performed for the signal side Da of the optical disk D.

For example, by setting the width 32w of the second region 32 of the diffraction grating 30 and the width 33w of the third region 33 of the diffraction grating 30 both to around 30-80 µm, a balance can easily be kept substantially among the TE field characteristic, the sub-PP signal amplitude level characteristic, and the TE phase difference characteristic. Accordingly, accurate tracking of the OPU 100 can easily be performed for the signal side Da of the optical disk D.

Preferably, by setting the width 32w of the second region 32 of the diffraction grating 30 and the width 33w of the third region 33 of the diffraction grating 30 both within the range of 48-72 µm, a balance can be kept among the TE field characteristic, the sub-PP signal amplitude level characteristic, and the TE phase difference characteristic. As a result, the tracking error signal is prevented from deteriorating. Therefore, accurate tracking of the OPU 100 can be performed for the signal side Da of the optical disk D.

If the center part ratio Wr of the diffraction grating 30 is 17.8%, then the division part widths 32w and 33w of the diffraction grating 30 are 49 µm. If the center part ratio Wr of the diffraction grating 30 is 20.7%, then the division part widths 32w and 33w of the diffraction grating 30 are 57 µm.

In the OPU equipped with the conventional three-division-type diffraction grating 90 (FIG. 22), any change of the TE field characteristic or the TE phase difference characteristic can be achieved only by changing the width 90w of the center part 90m of the three-division-type diffraction grating 90.

On the other hand, in the OPU 100 (FIG. 1) equipped with the four-division-type diffraction grating 30 (FIG. 6), in the case of changing the TE field characteristic or the TE phase difference characteristic, these characteristics can be adjusted or changed not only by changing the width 30w of the center part 30m of the four-division-type diffraction grating 30 (FIG. 6), but also by changing the phase difference between the grating pitches of the regions 32 and 33 of the center part 30m of the four-division-type diffraction grating 30.

By adjusting and setting the width 30w of the center part 30m of the four-division-type diffraction grating 30 and the phase difference between the grating pitches of the regions 32 and 33 of the center part 30m of the four-division-type diffraction grating 30, the OPU 100 can be designed that exhibits desired performance and that keeps various characteristics well balanced. Therefore, degrees of freedom improve in designing the OPU 100.

This OPU 100 (FIG. 1) is configured to have at least, for example, the diffraction grating 30 (FIG. 8) of the substantially rectangular shape in plan view, the OBL 4 (FIG. 1) that condenses three luminous fluxes and irradiates at least three focusing spots Sa, Sb, and Sm (FIGS. 2 to 3), independent of each other, onto the signal side Da of the optical disk D (FIG.

1), and the PD 6 (FIGS. 1 and 3) that receives the reflected light of each of the three focusing spots Sa, Sb, and Se (FIGS. 2 and 3).

If the OPU 100 is configured as above, accurate tracking of the OPU 100 can be performed for the signal side Da of the optical disk D. The amplitude of the tracking error signal is easily prevented from deteriorating, or an offset remaining in the tracking error signal due to the displacement of the OBL 4 is easily prevented at the times of recording or reproducing data on or from plural kinds of optical disks D of different track pitches Tp.

The OPU 100 configured to have the phase-shift-type, four-division diffraction grating 30 permits a reliable operation of data reproduction or recording of the OPU 100 for the DVD-RAM. The data reproduction or recording operation of the OPU 100 can reliably be performed also for the DVD±R and DVD±RW (not shown).

The OPU 100 (FIG. 1) described above is mounted on the optical disk apparatus 200. The optical disk apparatus 20C is configured to have a single OPU 100.

The optical disk apparatus 200 can thus be provided that is equipped with a single OPU 100 that is easy to perform the accurate tracking control. Further, the price of the optical disk apparatus 200 is held down if the optical disk apparatus 200 is equipped with one OPU 100 capable of handling plural kinds of optical disks D of different track pitches Tp.

Fourth Embodiment

Figure 9:
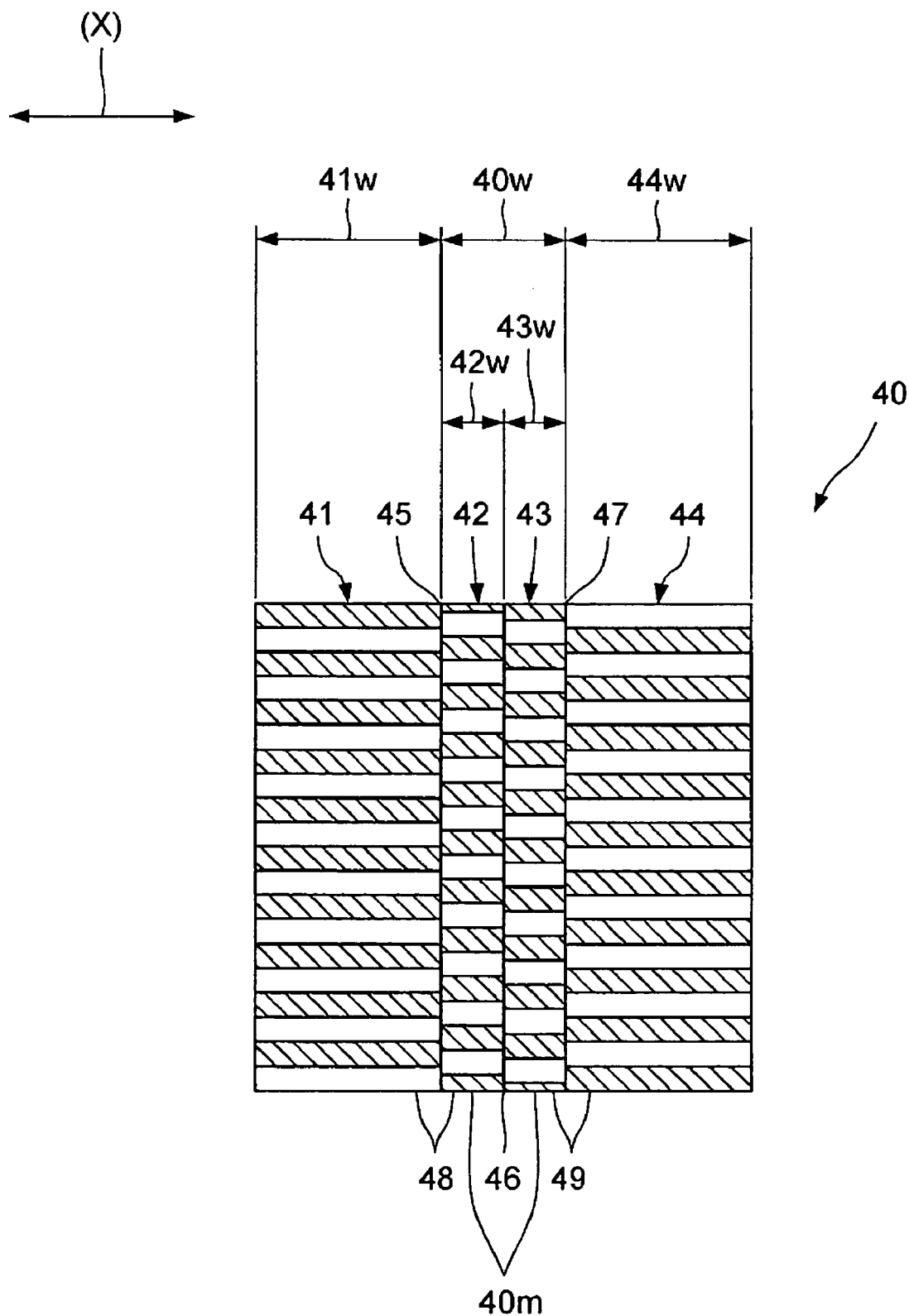
FIG. 9 is a schematic plan view of a fourth embodiment of the diffraction grating mounted in the optical pickup unit.
Figure 10:
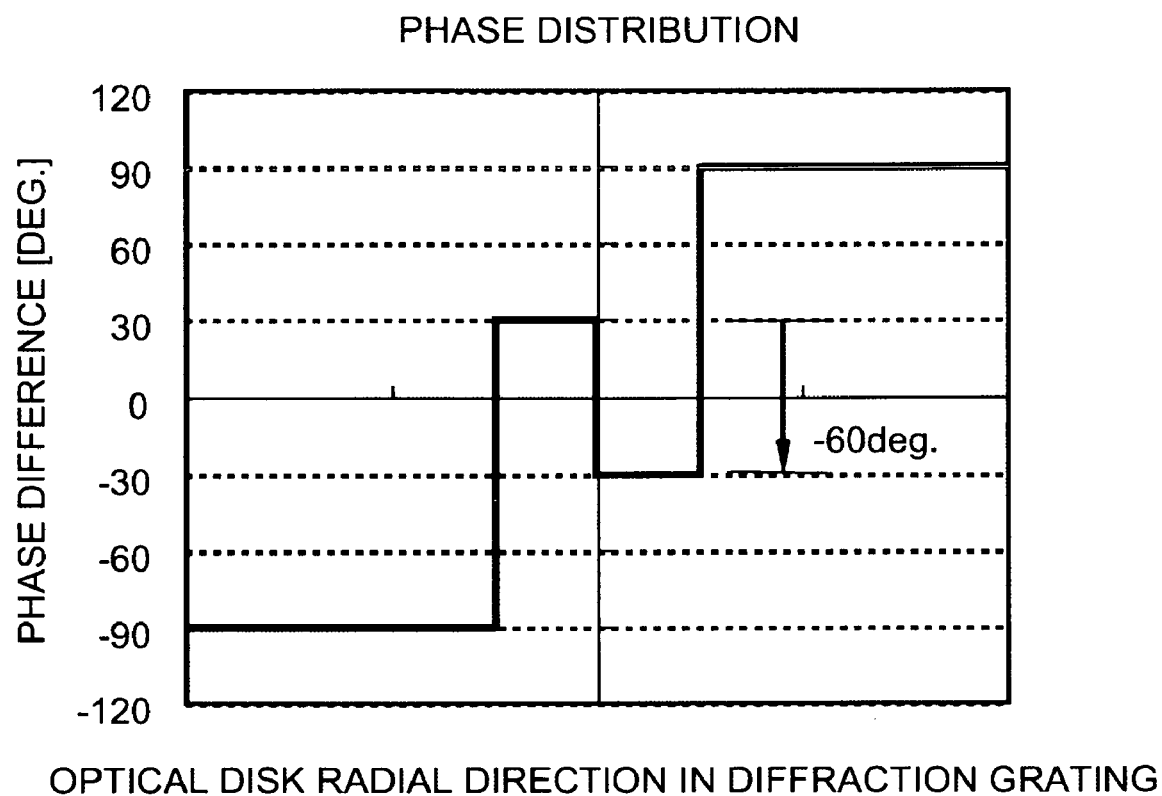
FIG. 10 is a diagram of the relationship between the optical disk radial direction and the phase difference in the diffraction grating of FIG. 9.

FIG. 9 is a schematic plan view of a fourth embodiment of the diffraction grating mounted on the optical pickup unit. FIG. 10 is a diagram of a relationship between an optical disk radial direction and a phase difference in the diffraction grating of FIG. 9.

The diffraction grating 40 shown in FIG. 9 is mounted on the OPU 100 (FIG. 1), in place of the diffraction grating 10 shown in FIG. 1. There is no change in the OPU 100 or the optical disk apparatus 200, except for the replacement of the diffraction grating 10 shown in FIG. 1 by the diffraction grating 40 shown in FIG. 9. The first embodiment and the fourth embodiment differ in that the diffraction grating 10 shown in FIG. 1 is replaced by the diffraction grating 40 shown in FIG. 9, but the components are common to the first embodiment and the fourth embodiment except for the diffraction grating 10 and the diffraction grating 40. The fourth embodiment will now be described, for convenience, by using FIGS. 1 to 4 and FIGS. 13 to 15 as well. In the fourth embodiment, the same reference numerals indicate the same components as in the first embodiment with detailed description thereof omitted.

As shown in FIG. 9, the diffraction grating 40 has phase shift regions 41 and 44 (FIG. 9) that cause a phase shift of n radian in part of the laser light applied from the LD 1 (FIG. 1). The diffraction grating 40 is divided into at least four regions, a substantially rectangular first region 41, a substantially rectilinear second region 42 adjacent to the first region 41, a substantially rectilinear third region 43 adjacent to the second region 42, and a substantially rectangular fourth region 44 adjacent to the third region 43. A predetermined periodic structure is built within each of the regions 41, 42, 43, and 44.

In the diffraction grating 40 shown in FIG. 9, for the sake of convenience, the second region 42 and the third region 43 are so drawn as to have a certain width, for easy understanding of the phase state of the second region 42 and the phase state of the third region 43. In practice, however, the second region 42 and the third region 43 of the diffraction grating 40 form a fine line having a width 40w of, e.g., about 20 to 200 μm. The periodic structure of each of the regions 41, 42, 43, and 44 making up the diffraction grating 40 is a periodic structure with a minute recess and raised-portion repeated. The diffraction grating 40 is a glass sheet of, e.g., about 3 to 10 mm square and about 0.3 to 3 mm in thickness.

The diffraction grating 40 shown in FIG. 9 installed in the OPU 100 makes it easier to perform well the tracking of the OPU 100 for the signal side Da of the optical disk D. Because of the division of the diffraction grating 40 into four regions 41, 42, 43, and 44, at least three focusing spots Sa, Sb, and Sm (FIGS. 2 to 3), independent of each other, are applied on the signal side Da of the optical disk D. Since at least three focusing spots Sa, Sb, and Sm are, independently of each other, applied on the signal side Da of the optical disk D, the tracking error signal is easily prevented from deteriorating, for example, due to the displacement of the OBL 4 (FIG. 1), at the times of recording data on plural kinds of optical disk D of different track pitches Tp or reproducing data from the plural kinds of optical disk D of different track pitches Tp. The single OPU 100 can thus be provided that is easy to perform the tracking control.

As shown in FIG. 9, the diffraction grating 40 has one regional part 49 of a substantially rectangular shape having the first region 41 and the second region 42 adjacent to the first region 41, and the other regional part 49 of a substantially rectangular shape having the third region 43 adjacent to the second region 42 and the fourth region 44 adjacent to the third region 43. The width 41w of the first region 41 of the diffraction grating 40 and the width 44w of the fourth region 44 are about the same. The width 42w of the second region 42 of the diffraction grating 40 and the width 43w of the third region 43 are about the same. A borderline 46 between the second region 42 of the diffraction grating 40 and the third region 43 of the diffraction grating 40 adjacent to the second region 42 divides the diffraction grating 40 into two equal parts, one regional part 48 the diffraction grating 40 and the other regional part 49 that make up the diffraction grating 40.

As a result, the focusing spots Sa, Sb, and Sm on the signal side of the optical disk D are formed as accurate focusing spots Sa, Sb, and Sm. Since the borderline 46 between the second region 42 of the diffraction grating 40 and the third region 43 adjacent to the second region 42 divides the diffraction grating 40 into two equal parts, one regional part 48 having the first region 41 and the second region 42 adjacent to the first region 41 and the other regional part 49 having the third region 43 and the fourth region 44 adjacent to the third region 43, the laser light from the LD 1 applied on the diffraction grating 40 can have its optical axis easily adjusted, for example, with an optical axis adjusting camera (not shown), at the time of mounting the diffraction grating 40 in the housing (not shown) of the OPU 100. The laser light applied from the LD 1, striking the diffraction grating 40, and then transmitting through the OBL 4, is observable, with the use of, for example, the optical axis adjusting camera.

A conventional three-division-type diffraction grating 90 (FIG. 22) did not have a positioning borderline that divides the diffraction grating 90 into two equal parts, as viewed in plan. Because of the absence of the borderline to be used as the positioning centerline in the diffraction grating 90, difficulty was faced in irradiating the laser light onto the diffraction grating 90, while setting the center of the laser light at the center of the diffraction grating 90, and accurately mounting the diffraction grating 90 in the housing of the optical pickup unit, using the optical axis adjusting camera.

On the other hand, in the four-division-type diffraction grating 40 shown in FIG. 9, the borderline 46 is provided in the diffraction grating 40 that divides the diffraction grating 40, substantially at its center, into two equal parts, one regional part 48 of the substantially rectangular shape and the other regional part 49 of the substantially rectangular shape. This borderline 46 makes it easier to irradiate the laser light so as to be substantially equally divided into two parts respectively on one regional part 48 of the substantially rectangular shape and the other regional part 49 of the substantially rectangular shape that make up the diffraction grating 40, at the time of adjusting the optical axis, using the optical axis adjusting camera, etc.

Because of increased ease in irradiating the laser light so as to be substantially equally divided into two parts respectively on one regional part 48 of the substantially rectangular shape and the other regional part 49 of the substantially rectangular shape that make up the diffraction grating 40, the diffraction grating 40 can easily be mounted in the housing of the OPU 100, while accurately adjusting the position of the diffraction grating 4C. Therefore, the focusing spots Sa, Sb, and Sm can very likely be accurately formed on the signal side Da of the optical disk D. Accordingly, accurate tracking of the OPU 100 can easily be performed for the signal side Da of the optical disk D.

As compared with the periodic structure of the second region 42 of the diffraction grating 40, the third region 43 of the diffraction grating 40 has the periodic structure with a phase different by within the range of 3 to 180 degrees.

Therefore, the focusing spots Sa, Sb, and Sm on the signal side Da of the optical disk D can easily be formed as focusing spots Sa, Sb, and Sm having higher accuracy. Since, as compared with the periodic structure of the second region 42 of the diffraction grating 40, the third region 43 of the diffraction grating 43 has the periodic structure with a phase different by within the range of 3 to 180 degrees, the borderline 46 is substantially clear between the second region 42 of the diffraction grating 40 and the third region 43 of the diffraction grating 40 adjacent to the second region 42.

If, as compared with the periodic structure of the second region 42, the third region 43 has the periodic structure with a phase different by less than 3 degrees, the borderline 46 is not clarified between the second region 42 and the third region 43. When, as compared with the periodic structure of the second region 42, the third region 43 has the periodic structure with a phase different by 190 degrees, the borderline 46 is most clarified between the second region 42 and the third region 43. When, as compared with the periodic structure of the second region 42, the third region 43 has the periodic structure with a phase different by, for example, 3 to 90 degrees, the diffraction grating 40 is formed to have proper characteristics, while the borderline 46 is clarified between the second region 42 and the third region 43.

Since the borderline 46 is substantially clarified between the second region 42 of the diffraction grating 40 and the third region 43 of the diffraction grating 40, the borderline 46 is clarified between one regional part 48 of the diffraction grating 40 having the first region 41 and the second region 42 adjacent to the first region 41 and the other regional part 49 of the diffraction grating 40 having the third region 43 and the fourth region 44 adjacent to the third region 43. Therefore, the laser light is applied so as to be substantially equally divided into two parts respectively on one regional part 48 of the diffraction grating 40 and the other regional part 49 of the diffraction grating 40. By irradiating the laser light so as to be substantially equally divided into two parts respectively on one regional part 48 of the diffraction grating 40 and the other regional part 49 of the diffraction grating 40, the diffraction grating 40 is accurately mounted in the housing of the OPU 10C.

The substantially rectilinear second region 42 and the substantially rectilinear third region 43 forming part of the diffraction grating 40 are arranged between the substantially stripes-like first region 41 and the substantially stripes-like fourth region 44 forming part of the diffraction grating 40. The periodic structure of the second region 42 is of a different phase from that of the periodic structure of the first region 41. The periodic structure of the third region 43 is of a different phase from that of the periodic structure of the second region 42. The periodic structure of the fourth region 44 is of a different phase from that of the periodic structure of the third region 43. The periodic structure of the fourth region 44 is of a phase about 180 degrees different from that of the periodic structure of the first region 41.

As a result, the first region 41, second region 42, the third region 43, and the fourth region 44 in the diffraction grating 40 are distinguished from each other and the phase difference is clarified between the first region 41 and the fourth region 44 in the diffraction grating 40. Since the periodic structure of the fourth region 44 of the diffraction grating 40 is of a phase about 180 degrees different from that of the periodic structure of the first region 41, at least three focusing spots Sa, Sb, and Sm are formed well on the signal side Da of the optical disk D. With use of the at least three focusing spots Sa, Sb, and Sm formed well on the signal side Da of the optical disk D, the tracking error signal is easily prevented from deteriorating, for example, due to the displacement of the OBL 4, at the times of recording or reproducing data on or from plural kinds of the optical disks D having different track pitches Tp.

The first region 41 and the second region 42 are separated by the borderline 45 between the first region 41 and the second region 42. The second region 42 and the third region 43 are separated by the borderline 46 between the second region 42 and the third region 43. The third region 43 and the fourth region 44 are separated by the borderline 47 between the third region 43 and the fourth region 44.

Relative to the periodic structure of the first region 41, the second region 42 has the periodic structure of a phase different by within the range of 30 to 180 degrees. Relative to the periodic structure of the second region 42, the third region 43 has the periodic structure of a phase different by within the range of 3 to 180 degrees. Relative to the periodic structure of the third region 43, the fourth region 44 has the periodic structure of a phase different by within the range of 30 to 180 degrees.

As a result, the first region 41, the second region 42, the third region 43, and the fourth region 44 are substantially clearly distinguished from each other in the diffraction grating 40. Since, relative to the periodic structure of the first region 41 of the diffraction grating 40, the second region 42 of the diffraction grating 40 has the periodic structure of a phase different by within the range of 30 to 180 degrees, the first region 41 of the diffraction grating 40 and the second region 42 of the diffraction grating 40 are clearly distinguished from each other. Since, relative to the periodic structure of the second region 42 of the diffraction grating 40, the third region 43 of the diffraction grating 40 has the periodic structure of a phase different by within the range of 3 to 180 degrees, the second region 42 of the diffraction grating 40 and the third region 43 of the diffraction grating 40 are substantially distinguished from each other. Since, relative to the periodic structure of the third region 43 of the diffraction grating 40, the fourth region 44 of the diffraction grating 40 has the periodic structure of a phase different by within the range of 30 to 180 degrees, the third region 43 of the diffraction grating 40 and the fourth region 44 of the diffraction grating 40 are clearly distinguished from each other.

By dividing the diffraction grating 40 into four regions, distinguished from each other, at least three focusing spots Sa, Sb, and Sm, independent of each other, are applied on the signal side Da of the optical disk D. Since at least three focusing spots Sa, Sb, and Sm are applied, independently of each other, on the signal side Da of the optical disk D, the tracking of the OPU 100 can easily be performed for the signal side Da of the optical disk D. By appropriately setting the phase of the periodic structure of each region to be within a predetermined numerical range, degrees of freedom in designing of the diffraction grating 40 improve and at the same time, degrees of freedom in designing of the OPU 100 also improve. Therefore, the OPU 100 is configured that easily shows optimum characteristics corresponding to the location of use.

The diffraction grating 40 is formed as a sheet of a substantially rectangular shape. The diffraction grating 40, as viewed in plan, appears a substantially rectangular sheet.

The diffraction grating 40 is now viewed in plan, with the longitudinal, substantially rectangular first region 41, the longitudinal, substantially rectilinear second region 42, the longitudinal, substantially rectilinear third region 43, and the longitudinal, substantially rectangular fourth region 44 arranged side by side. In this state, if, relative to the phase of one region of the diffraction grating 40, the phase of the other region adjacent to the one region at its right side is shifted substantially in a stepwise right ascending manner, the phase of the other region is described as being shifted to the plus (+) side.

The diffraction grating 40 is now viewed in plan, with the longitudinal, substantially rectangular first region 41, the longitudinal, substantially rectilinear second region 42, the longitudinal, substantially rectilinear third region 43, and the longitudinal, substantially rectangular fourth region 44 arranged side by side. In this state, if, relative to the phase of one region of the diffraction grating 40, the phase of the other region adjacent to the one region at its right side is shifted substantially in a stepwise right descending manner, the phase of the other region is described as being shifted to the minus (−) side.

In viewing the diffraction grating 40 in plan, relative to the periodic structure of the first region 41, the second region 42 adjacent to the first region 41 at its right side has the periodic structure of a phase shifted to the plus side. In viewing the diffraction grating 40 in plan, relative to the periodic structure of the second region 42, the third region 43 adjacent to the second region 42 at its right side has the periodic structure of a phase shifted to the minus side. In viewing the diffraction grating 40 in plan, relative to the periodic structure of the third region 43, the fourth region 44 adjacent to the third region 43 at its right side has the periodic structure of a phase shifted to the plus side.

The diffraction grating 40 is configured in such a manner that only the third region 43 has the periodic structure of a phase shifted in the opposite direction to that of the phases of the periodic structures of the first region 41, the second region 42, and the fourth region 44 (FIG. 10). The diffraction grating 40 (FIG. 9) has the periodic structures of so-called opposite phases.

Depending on the design, specifications, etc., of the OPU, the diffraction grating 40 shown in FIG. 9, for example, can have its stripes turned over laterally with the borderline (46) as the center, with keeping symbols, lead lines, dimension lines, etc. substantially as they are. Describing specifically, for example, in viewing the diffraction grating (40) in plan, relative to the periodic structure of the first region (41), the second region (42) adjacent to the first region (41) at its right side can have a periodic structure having its phase shifted to the minus side. Further, in viewing the diffraction grating (40) in plan, relative to the periodic structure of the second region (42), the third region (43) adjacent to the second region (42) at its right side can have a periodic structure having its phase shifted to the plus side. Further, in viewing the diffraction grating (40) in plan, relative to the periodic structure of the third region (43), the fourth region (44) adjacent to the third region (43) at its right side can have a periodic structure having its phase shifted to the minus side.

The diffraction grating (40) is configured in such a manner that only the third region (43) has the periodic structure of a phase shifted in the opposite direction to that of the phases of the periodic structures of the first region (41), the second region (42), and the fourth region (44). The diffraction grating (40) has the periodic structures of so-called opposite phases.

By mounting the diffraction grating having the periodic structures of the opposite phases on the OPU, the TE amplitude level (%) increases, and TE field characteristic easily improves (FIG. 13). The TE amplitude level (%) is prevented from decreasing and the field characteristic is prevented from lowering. Since the field characteristic improves, this OPU is preferably installed in the optical disk apparatus for a notebook-type or laptop-type PC. Since the OPU used in the optical disk apparatus for the notebook-type or laptop-type PC uses a small-size OBL, mainly the field characteristic is given importance.

As shown in FIG. 9, relative to the periodic structure of the first region 41, the second region 42 has the periodic structure of the phase differing about +120 degrees. Relative to the periodic structure of the second region 42, the third region 43 has a periodic structure of a phase differing about −60 degrees. Relative to the periodic structure of the first region 41, the third region 43 has the periodic structure of a phase differing about +60 degrees. Relative to the periodic structure of the third region 43, the fourth region 44 has the periodic structure of a phase differing about +120 degrees. Relative to the periodic structure of the first region 41, the fourth region 44 has the periodic structure of a phase differing about +180 degrees.

By mounting thus configured diffraction grating 40 in the OPU 100, the TE amplitude level (%) increases and the field characteristic considerably improves (FIG. 13). The TE amplitude level (%) is prevented from decreasing and the field characteristic is prevented from lowering. The field characteristic of this OPU 100 is much better (FIG. 31 than the field characteristic of an OPU (not shown) having the conventional diffraction grating 90, which is divided into three phase regions 91, 92, and 93 (FIG. 22k. Since the TE field characteristic considerably improves, this OPU 100 is preferably installed in the optical disk apparatus for the notebook-type or laptop-type PC.

The regions 42, 43, the combination of the second region 42 and the third region 43 of the diffraction grating 40 (FIG. 9), form a longitudinal center part 40m of the diffraction grating 40. As compared with the diameter 4d of the light passing through the pupil 4e of the OBL 4 (FIG. 1), the width 40w of the center part 40m (FIGS. 1 and 9) of the diffraction grating 40 is from 1.6 to 281, preferably 18 to 26%. Namely, a center part ratio Wr of the diffraction grating 40 is from 16 to 28%, preferably 18 to 26% (FIGS. 13 to 15).

By mounting thus configured diffraction grating 40 in the OPU 100, the tracking error signal is easily prevented from deteriorating due to the displacement of the OBL 4 at the times of recording or reproducing data on or from plural kinds of optical disks D of different track pitches Tp.

If, as compared with the diameter 4d of the light passing through the pupil 4e of the OBL 4, the width 40w of the center part 40m of the diffraction grating 40 is set to less than 16%, the TE amplitude level (%) decreases and the TE field characteristic is likely to lower (FIG. 13). Namely, by setting the center part ratio Wr of the diffraction grating 4C to less than 16%, the OBL center ratio (%) decreases and the TE field characteristic is likely to lower. When, as compared with the diameter 4d of the light passing through the pupil 4e of the OBL 4, the width 40w of the center part 40m of the diffraction grating 40 is set to 18% or over, the TE amplitude level 18) is prevented from decreasing and the TE field characteristic is prevented from lowering. Namely, by setting the center part ratio Wr of the diffraction grating 40 to 18% or over, the OBL center ratio (%) is prevented from decreasing, and the TE field characteristic is prevented from lowering.

If, as compared with the diameter 4d of the light passing through the pupil 4e of the OBL 4, the width 40w of the center part 40m of the diffraction grating 40 is set to greater than 28%, the sub-PP signal amplitude level (%) decreases and the sub-PP signal amplitude level characteristic is likely to lower (FIG. 14). By setting the width 40w of the center part 40m of the diffraction grating 4C to 26% or less, as compared with the diameter 4d of the light passing through the pupil 4e of the OBL 4, the sub-PP signal amplitude level (%) is prevented from decreasing and the sub-PP signal amplitude level characteristic is prevented from lowering.

If, as compared with the diameter 4d of the light passing through the pupil 4e of the OBL 4, the width 40w of the center part 40m of the diffraction grating 40 is set to greater than 28%, the TE phase difference amount increases and the TE phase difference characteristics is likely to lower (FIG. 15). By setting the width 40w of the center part 40m of the diffraction grating 40 to 26% or less, as compared with the diameter 4d of the light passing through the pupil 4e of the OBL 4, the TE phase difference amount is prevented from increasing and the TE phase difference characteristic is prevented from lowering.

By setting the width 40w of the center part 40m of the diffraction grating 40 to 16 to 28%, or preferably 18 to 26% of the diameter 4d of the light passing through the pupil 4e of the OBL 4, the TE amplitude level (FIG. 13), the sub-PP signal amplitude level (FIG. 14), and the TE phase difference amount (FIG. 15) can easily be set to proper values.

For example, by setting the width 40w of the center part 40m of the diffraction grating 40 to about 20% of the diameter 4d of the light passing through the pupil 4e of the OBL 4, the TE amplitude level (FIG. 13), the sub-PP signal amplitude level (FIG. 14), and the TE phase difference amount (FIG. 15) can easily be set to optimum values. Since the TE amplitude level, the sub-PP signal amplitude level, and the TE phase difference amount are set to well-balanced proper values, the tracking control of the OPU 100 can easily be performed.

The width 42w of the second region 42 of the diffraction grating 40 and the width 43w of the third region 43 of the diffraction grating 40 are both set to 10-100 μm, preferably 30-80 μm, and much preferably 48-72 μm.

Namely, the division part widths 42w and 43w of the diffraction grating 40 are set to 10-100 μm, preferably 30-80 μm, and much preferably 48-72 μm.

This makes it easier to perform well the tracking of the OPU 100 for the signal side Da of the optical disk D. The tracking error signal is easily prevented from deteriorating due to, for example, the displacement of the OBJ 4, at the times of recording or reproducing data on or from plural, kinds of optical disks D of different track pitches Tp.

If the width 42w of the second region 42 of the diffraction grating 40 and the width 43w of the third region 43 of the diffraction grating 40 are both a short width of less than 10 μm, or if the width 42w of the second region 42 of the diffraction grating 40 and the width 43w of the third region 43 of the diffraction grating 40 are both a long width of greater than 100 μm, a balance is lost among the TE field characteristic, the sub-PP signal amplitude level characteristic, and the TE phase difference characteristic. With a loss of balance among these characteristics, the tracking error signal deteriorates and accurate tracking of the OPU 100 can not easily be performed for the signal side Da of the optical disk D.

For example, by setting the width 42w of the second region 42 of the diffraction grating 40 and the width 43w of the third region 43 of the diffraction grating 40 both to around 30-80 μm, a substantial balance can easily be kept among the TE field characteristic, the sub-PP signal amplitude level characteristic, and the TE phase difference characteristic. Accordingly, accurate tracking of the OPU 100 can easily be performed for the signal side Da of the optical disk D.

Preferably, by setting the width 42w of the second region 42 of the diffraction grating 40 and the width 43w of the third region 43 of the diffraction grating 40 both to be within the range of 48-72 μm, a balance can be kept among the TE field characteristic, the sub-PP signal amplitude level characteristic, and the TE phase difference characteristic. As a result, the tracking error signal is prevented from deteriorating. Therefore, accurate tracking of the OPU 100 can be performed for the signal side Da of the optical disk D.

In the OPU equipped with the conventional three-division-type diffraction grating 90 (FIG. 22), any change of the TE field characteristic or the TE phase difference characteristic can be achieved only by changing the width 90w of the center part 90m of the three-division-type diffraction grating 9C.

On the other hand, in the OPU 100 (FIG. 1) equipped with the four-division-type diffraction grating 40 (FIG. 9), in the case of changing the TE field characteristic or the TE phase difference characteristic, these characteristics can be adjusted or changed not only by changing the width 43w of the center part 40m of the four-division-type diffraction grating 40, but also by changing the phase difference between the grating pitches of the regions 42 and 43 of the center part 40m of the four-division-type diffraction grating 40. By adjusting and setting the width 40w of the center part 40m of the four-division-type diffraction grating 40 and the phase difference between the grating pitches of the regions 42 and 43 of the center part 40m of the four-division-type diffraction grating 40, the OPU 100 can be designed that exhibits desired performance and that keeps various characteristics well balanced. Therefore, degrees of freedom improve in designing the OPU 100.

This OPU 100 (FIG. 1) is configured to have at least, for example, the diffraction grating 40 (FIG. 9) of the substantially rectangular shape in plan view, the OBL 4 (FIG. 1) that condenses three luminous fluxes and irradiates at least three focusing spots Sa, Sb, and Sm (FIGS. 2 and 3), independent of each other, onto the signal side Da of the optical disk D (FIG. 1), and the PD 6 (FIGS. 1 and 3) that receives the reflected light of each of the three focusing spots Sa, Sb, and Sm (FIGS. 2 and 3).

If the OPU 100 is configured as above, accurate tracking of the OPU 100 can be performed for the signal side Da of the optical disk D. The amplitude of the tracking error signal is easily prevented from deteriorating, or an offset remaining in the tracking error signal due to the displacement of the OBL 4 is easily prevented at the times of recording or reproducing data on or from plural kinds of optical disks D of different track pitches Tp.

The OPU 100 configured to have the phase-shift-type, four-division diffraction grating 40 permits a reliable operation of data reproduction or recording of the OPU 100 for the DVD-RAM. The data reproduction or recording operation of the OPU 100 can reliably be performed also for the DVD±R and DVD±RW (not shown).

The OPU 100 (FIG. 1) described above is mounted on the optical disk apparatus 200. The optical disk apparatus 200 is configured to have a single OPU 100.

The optical disk apparatus 200 can thus be provided that is equipped with a single OPU 100 that is easy to perform the accurate tracking control. Further, the price of the optical disk apparatus 200 is held down if the optical disk apparatus 200 is equipped with one OPU 100 capable of handling plural kinds of optical disks D of different track pitches Tp.

Fifth Embodiment

Figure 11:
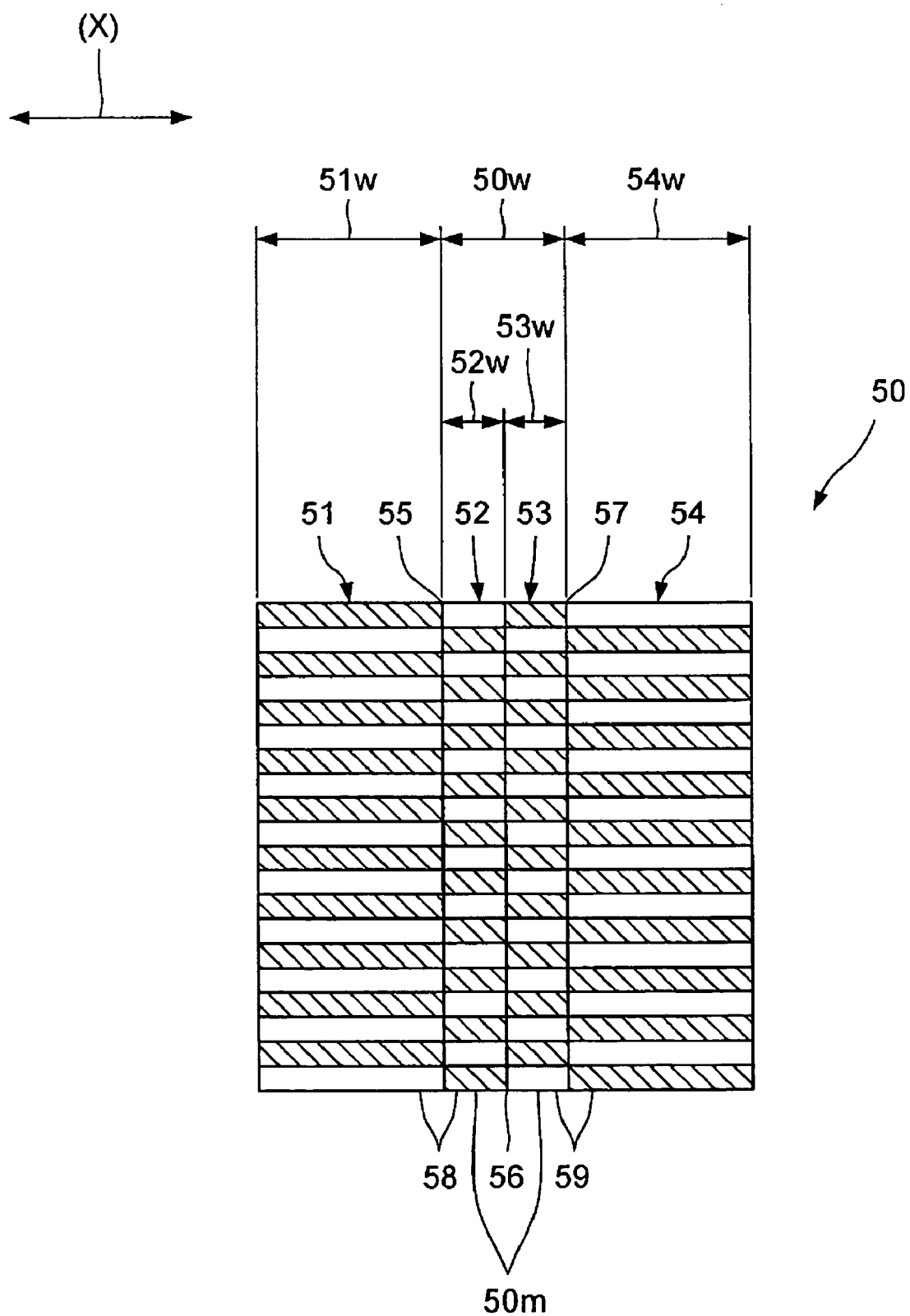
FIG. 11 is a schematic plan view of a fifth embodiment of the diffraction grating mounted in the optical pickup unit.
Figure 12:
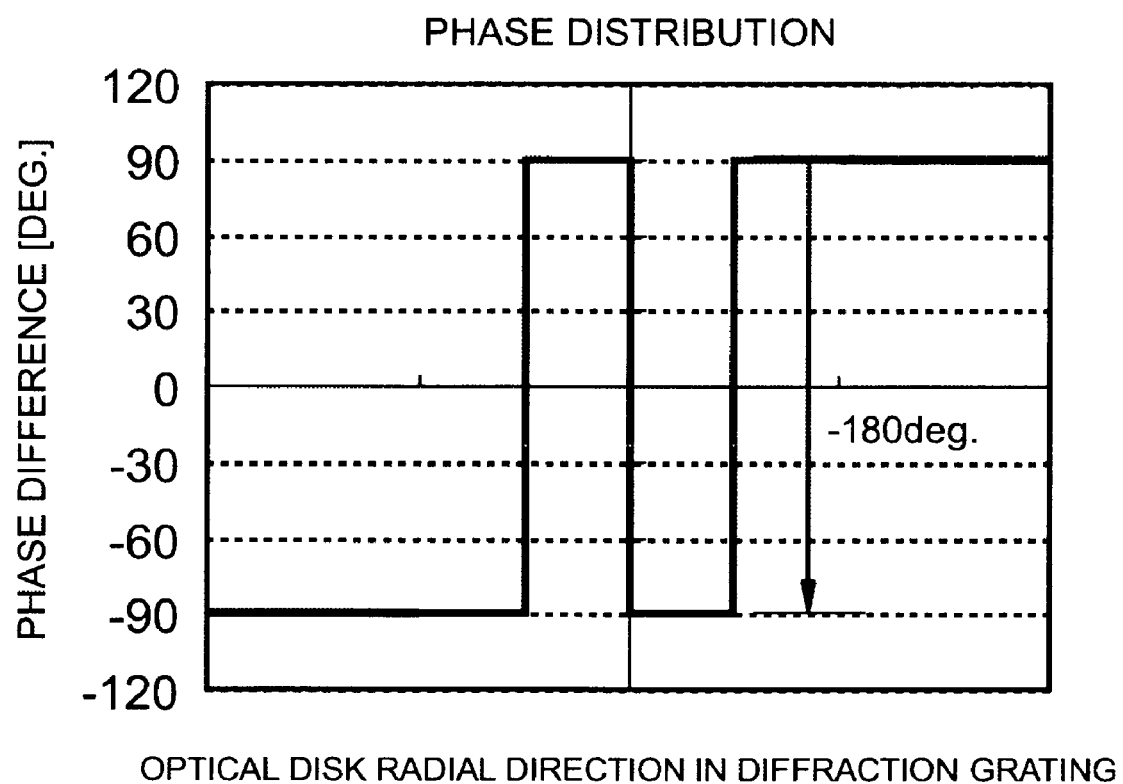
FIG. 12 is a diagram of the relationship between the optical disk radial direction and the phase difference in the diffraction grating of FIG. 11.

FIG. 11 is a schematic plan view of a fifth embodiment of the diffraction grating mounted on the optical pickup unit. FIG. 12 is a diagram of a relationship between an optical disk radial direction and a phase difference in the diffraction grating of FIG. 11.

The diffraction grating 50 shown in FIG. 11 is mounted in the OPU 100 (FIG. 1), in place of the diffraction grating 10 shown in FIG. 1. There is no change in the OPU 100 or the optical disk apparatus 200, except for the replacement of the diffraction grating 10 shown in FIG. 1 by the diffraction grating 50 shown in FIG. 11. The first embodiment and the fifth embodiment differ in that the diffraction grating 10 shown in FIG. 1 is replaced by the diffraction grating 50 shown in FIG. 11, but the components are common to the first embodiment and the fifth embodiment except for the diffraction grating 10 and the diffraction grating 50. The fifth embodiment will now be described, for convenience, by using FIGS. 1 to 4 as well. In the fifth embodiment, the same reference numerals indicate the same components as in the first embodiment with detailed description thereof omitted.

As shown in FIG. 11, the diffraction grating 50 has phase shift regions 51 and 54 (FIG. 11) that cause a phase shift of n radian in part of the laser light applied from the LD 1 (FIG. 1). The diffraction grating 50 is divided into at least four regions, a substantially rectangular first region 51, a substantially rectilinear second region 52 adjacent to the first region 51, a substantially rectilinear third region 53 adjacent to the second region 52, and a substantially rectangular fourth region 54 adjacent to the third region 53. A predetermined periodic structure is built within each of the regions 51, 52, 53, and 54.

In the diffraction grating 50 shown in FIG. 11, for the sake of convenience, the second region 52 and the third region 53 are so drawn as to have a certain width, for easy understanding of the phase state of the second region 52 and the phase state of the third region 53. In practice, however, in the second region 52 and the third region 53 of the diffraction grating 50, for example, the width 50w is a fine line of about 20 to 200 µm. The periodic structure of each of the regions 51, 52, 53, and 54 making up the diffraction grating 50 is a periodic structure with a minute recess and raised-portion repeated. The diffraction grating 50 is a glass sheet of, e.g., about 3 to 10 mm square and about 0.3 to 3 nm in thickness.

The diffraction grating 50 has one regional part 58 of a substantially rectangular shape having the first region 51 and the second region 52 adjacent to the first region 51, and the other regional part 59 of a substantially rectangular shape having the third region 53 adjacent to the second region 52 and the fourth region 54 adjacent to the third region 53. The width 51w of the first region 51 of the diffraction grating 50 and the width 54w of the fourth region 54 are about the same. The width 52w of the second region 52 of the diffraction grating 53 and the width 53w of the third region 53 are about the same. A borderline 56 between the second region 52 of the diffraction grating 50 and the third region 53 of the diffraction grating 50 adjacent to the second region 52 divides the diffraction grating 50 into two equal parts, one regional part 58 and the other regional part 59 that make up the diffraction grating 50.

As compared with the periodic structure of the second region 52 of the diffraction grating 50, the third region 53 of the diffraction grating 50 has the periodic structure with a phase different by within the range of 3 to 190 degrees.

The substantially rectilinear second region 52 and the substantially rectilinear third region 53 forming part of the diffraction grating 50 are arranged between the substantially stripes-like first region 51 and the substantially stripes-like fourth region 54 forming part of the diffraction grating 50. The periodic structure of the second region 52 is of a different phase from that of the periodic structure of the first region 51. The periodic structure of the third region 53 is of a different phase from that of the periodic structure of the second region 52. The periodic structure of the fourth region 54 is of a different phase from that of the periodic structure of the third region 53. The periodic structure of the fourth region 54 is of a phase about 180 degrees different from that of the periodic structure of the first region 51.

The first region 51 and the second region 52 are separated by the borderline 55 between the first region 51 and the second region 52. The second region 52 and the third region 53 are separated by the borderline 56 between the second region 52 and the third region 53. The third region 53 and the fourth region 54 are separated by the borderline 57 between the third region 53 and the fourth region 54.

Relative to the periodic structure of the first region 51, the second region 52 has the periodic structure of a phase different by within the range of 30 to 180 degrees. Relative to the periodic structure of the second region 52, the third region 53 has the periodic structure of a phase different by within the range of 3 to 180 degrees. Relative to the periodic structure of the third region 53, the fourth region 54 has the periodic structure of a phase different by within the range of 30 to 180 degrees.

The diffraction grating 50 is formed as a sheet of a substantially rectangular shape. The diffraction grating 50, as viewed in plan, appears a substantially rectangular sheet.

The diffraction grating 50 is now viewed in plan, with the longitudinal, substantially rectangular first region 51, the longitudinal, substantially rectilinear second region 52, the longitudinal, substantially rectilinear third region 53, and the longitudinal, substantially rectangular fourth region 54 arranged side by side. In this state, if, relative to the phase of one region of the diffraction grating 50, the phase of the other region adjacent to the one region at its right side is shifted substantially in a stepwise right ascending manner, the phase of the other region is described as being shifted to the plus (+) side.

The diffraction grating 50 is now viewed in plan, with the longitudinal, substantially rectangular first region 51, the longitudinal, substantially rectilinear second region 52, the longitudinal, substantially rectilinear third region 53, and the longitudinal, substantially rectangular fourth region 54 arranged side by side. In this state, if, relative to the phase of one region of the diffraction grating 50, the phase of the other region adjacent to the one region at its right side is shifted substantially in a stepwise right descending manner, the phase of the other region is described as being shifted to the minus (−) side.

In viewing the diffraction grating 50 in plan, relative to the periodic structure of the first region 51, the second region 52 adjacent to the first region 51 at its right side has the periodic structure of a phase shifted to the plus side. In viewing the diffraction grating 5C in plan, relative to the periodic structure of the second region 52, the third region 53 adjacent to the second region 52 at its right side has the periodic structure of a phase shifted to the minus side. In viewing the diffraction grating 50 in plan, relative to the periodic structure of the third region 53, the fourth region 54 adjacent to the third region 53 at its right side has the periodic structure of a phase shifted to the plus side.

The diffraction grating 50 is configured in such a manner that only the third region 53 has the periodic structure of a phase shifted in the opposite direction to that of the phases of the periodic structures of the first region 51, the second region 52, and the fourth region 54 (FIG. 12). The diffraction grating 50 (FIG. 12) has the periodic structures of so-called opposite phases.

Depending on the design, specifications, etc., of the OPU, the diffraction grating 50 shown in FIG. 11, for example, may have its stripes turned over laterally with the borderline (56) as the center, with keeping symbols, lead lines, dimension lines, etc., substantially as they are. Describing specifically, for example, in viewing the diffraction grating (50) in plan, relative to the periodic structure of the first region (51), the second region (52) adjacent to the first region (51) at its right side can have a periodic structure having its phase shifted to the minus side. Further, in viewing the diffraction grating (50) in plan, relative to the periodic structure of the second region (52), the third region (531 adjacent to the second region 152) at its right side can have a periodic structure having its phase shifting to the plus side. Further, in viewing the diffraction grating (50) in plan, relative to the periodic structure of the third region (53), the fourth region (54) adjacent to the third region (53) at its right side can have a periodic structure having its phase shifted to the minus side.

The diffraction grating (50) is configured in such a manner that only the third region (53) has the periodic structure of a phase shifted in the opposite direction to that of the phases of the periodic structures of the first region (51), the second region (521, and the fourth region (54). The diffraction grating (50) has the periodic structure of so-called opposite phases.

Relative to the periodic structure of the first region 51, the second region 52 has the periodic structure of a phase differing about +180 degrees. Relative to the periodic structure of the second region 52, the third region 53 has the periodic structure of a phase differing about −180 degrees. Relative to the periodic structure of the first region 51, the third region 53 has the periodic structure of the same phase. Relative to the periodic structure of the third region 53, the fourth region 54 has the periodic structure of the phase differing about +180 degrees. Relative to the periodic structure of the first region 51, the fourth region 54 has the periodic structure of the phase differing about +180 degrees.

By mounting thus configured diffraction grating 50 in the OPU 100, for example, the TE phase difference amount is easily prevented from considerably increasing and the TE phase difference characteristic is easily prevented from considerably lowering.

The regions 52, 53, the combination of the second region 52 and the third region 53 of the diffraction grating 50, form a longitudinal center part 50m of the diffraction grating 50. As compared with the diameter 4d of the light passing through the pupil 4e of the OBL 4 (FIG. 1), the width 50w of the center part 50m (FIGS. 1 and 11) of the diffraction grating 50 is from 16 to 28%, preferably 18 to 26%. Namely, a center part ratio Wr of the diffraction grating 50 is from 16 to 28%, preferably 18 to 26%.

The width 52w of the second region 52 of the diffraction grating 50 and the width 53w of the third region 53 of the diffraction grating 50 are both set to 10-100 μm, preferably 30-80 μm, much preferably 40-72 μm. Namely, the division part widths 52w and 53w of the diffraction grating 50 are set to 10-100 μm, preferably 30-80 μm, and much preferably 48-72 μm.

This OPU 100 (FIG. 1) is configured to have at least, for example, the diffraction grating 50 (FIG. 11) of the substantially rectangular shape in plan view, the OBL 4 that condenses three luminous fluxes and irradiates at least three focusing spots Sa, Sb, and Sm, independent of each other, onto the signal side Da of the optical disk D (FIG. 1, and the PD 6 (FIGS. 1 and 3) that receives the reflected light of each of the three focusing spots Sa, Sb, and Sm.

The OPU 100 (FIG. 1) described above is mounted in the optical disk apparatus 200. The optical disk apparatus 200 is configured to have a single OPU 100.

The optical pickup unit and the optical disk apparatus of the present invention are not intended to be limited to the above units and apparatuses as illustrated. Without departing from the spirit of the present invention, various changes and alterations can be made to the optical pickup units and the optical disk apparatuses of the present invention and the present invention encompasses equivalents thereof.

What is claimed is:

1. An optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region, wherein:
the diffraction grating includes:
one regional part having the first region and the second region adjacent to the first region, and
the other regional part having the third region and the fourth region adjacent to the third region,
the diffraction grating is divided into two equal parts, the one regional part and the other regional part, by a border between the second region and the third region adjacent to the second region,
the second region and the third region are disposed between the first region and the fourth region,
periodic structures of the first to fourth regions each are a periodic structure with a recess and raised-portion repeated in a same direction,
the periodic structure of the second region is a periodic structure having a phase different by less than 180 degrees from that of the periodic structure of the first region;
the periodic structure of the third region is a periodic structure having a phase different by less than or equal to 180 degrees from that of the periodic structure of the second region;
the periodic structure of the fourth region is a periodic structure having a phase different by less than 180 degrees from that of the periodic structure of the third region, the periodic structure of the fourth region is a periodic structure having a phase differing by about 180 degrees from that of the periodic structure of the first region, and the second region is smaller in width than each of the first region and the fourth region, and the third region is smaller in width than each of the first region and the fourth region.

2. The optical pickup unit of claim 1, wherein a periodic structure of the third region is a periodic structure having a phase differing by 3 to 180 degrees from that of a periodic structure of the second region.

3. The optical pickup unit of claim 1, wherein the second region and the third region are disposed between the first region and the fourth region, and wherein the periodic structure of the second region is a periodic structure having a phase differing by 30 to less than 180 degrees from that of a periodic structure of the first region;

the periodic structure of the third region is a periodic structure having a phase differing by 3 to 180 degrees from that of the periodic structure of the second region; and the periodic structure of the fourth region is a periodic structure having a phase differing by 30 to less than 180 degrees from that of the periodic structure of the third region.

4. The optical pickup unit of claim 1, wherein the diffraction grating is formed in a substantially rectangular sheet shape, wherein in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side, and wherein in viewing the diffraction grating in plan, the periodic structure of the second region adjacent to the first region at its right side is a periodic structure having a phase shifted to the plus side relative to that of a periodic structure of the first region;

the periodic structure of the third region adjacent to the second region at its right side is a periodic structure having a phase shifted to the plus side relative to that of the periodic structure of the second region; and the periodic structure of the fourth region adjacent to the third region at its right side is a periodic structure having a phase shifted to the plus side relative to that of the periodic structure of the third region.

5. The optical pickup unit of claim 1, wherein the diffraction grating is formed in a substantially rectangular sheet shape, wherein in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side, and wherein in viewing the diffraction grating in plan, the periodic structure of the second region adjacent to the first region at its right side is a periodic structure having a phase shifted to the minus side relative to that of a periodic structure of the first region;

the periodic structure of the third region adjacent to the second region at its right side is a periodic structure having a phase shifted to the minus side relative to that of the periodic structure of the second region; and the periodic structure of the fourth region adjacent to the third region at its right side is a periodic structure having a phase shifted to the minus side relative to that of the periodic structure of the third region.

6. The optical pickup unit of claim 1, wherein the diffraction grating is formed in a substantially rectangular sheet shape, wherein in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side, and wherein in viewing the diffraction grating in plan, the periodic structure of the second region adjacent to the first region at its right side is a periodic structure having a phase shifted to the plus side relative to that of a periodic structure of the first region;

the periodic structure of the third region adjacent to the second region at its right side is a periodic structure having a phase shifted to the minus side relative to that of the periodic structure of the second region; and the periodic structure of the fourth region adjacent to the third region at its right side is a periodic structure having a phase shifted to the plus side relative to that of the periodic structure of the third region.

7. The optical pickup unit of claim 1, wherein the diffraction grating is formed in a substantially rectangular sheet shape, wherein in viewing the diffraction grating in plan, with the first region of a longitudinally extended shape, the second region of a longitudinally extended shape, the third region of a longitudinally extended shape, and the fourth region of a longitudinally extended shape arranged side by side, if, relative to the phase of one region of the diffraction grating, the phase of the other region adjacent to the one region at its right side is shifted substantially in a stepwise right ascending manner, the phase of the other region is described as being shifted to a plus side, and if, relative to the phase of the one region of the diffraction grating, the phase of the other region adjacent to the one region at its right side is shifted substantially in a stepwise right descending manner, the phase of the other region is described as being shifted to a minus side, and wherein in viewing the diffraction grating in plan,
the periodic structure of the second region adjacent to the first region at its right side is a periodic structure having a phase shifted to the minus side relative to that of a periodic structure of the first region;
the periodic structure of the third region adjacent to the second region at its right side is a periodic structure having a phase shifted to the plus side relative to that of the periodic structure of the second region; and
the periodic structure of the fourth region adjacent to the third region at its right side is a periodic structure having a phase shifted to the minus side relative to that of the periodic structure of the third region.

8. The optical pickup unit of claim 1, comprising an objective lens that condenses the three luminous fluxes to apply the at least three focusing spots, independent of each other, onto the signal side of the medium, wherein
the second region and the third region are disposed between the first region and the fourth region;
a combined region of the second region and the third region is a central part of the diffraction grating; and
the width of the central part is from 16 to 28% of the diameter of the light passing through a pupil of the objective lens.

9. The optical pickup unit of claim 1, wherein
the width of the second region or the third region is from 10 to 100 μm.

10. The optical pickup unit of claim 1, comprising:
an objective lens that condenses the three luminous fluxes to apply the at least three focusing spots, independent of each other, onto the signal side of the medium; and
a photodetector that receives reflected light of the three focusing spots from the medium.

11. An optical disk apparatus comprising the optical pickup unit of claim 1.

12. An optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region, wherein
the second region and the third region are disposed between the first region and the fourth region, and wherein
a periodic structure of the second region is a periodic structure having a phase differing by about 75 degrees from that of a periodic structure of the first region;
a periodic structure of the third region is a periodic structure having a phase differing by about 30 degrees from that of the periodic structure of the second region; and
a periodic structure of the fourth region is a periodic structure having a phase differing by about 75 degrees from that of the periodic structure of the third region.

13. An optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region, wherein
the second region and the third region are disposed between the first region and the fourth region, and wherein
a periodic structure of the second region is a periodic structure having a phase differing by about 60 degrees from that of a periodic structure of the first region;
a periodic structure of the third region is a periodic structure having a phase differing by about 60 degrees from that of the periodic structure of the second region; and
a periodic structure of the fourth region is a periodic structure having a phase differing by about 60 degrees from that of the periodic structure of the third region.

14. An optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region, wherein
the second region and the third region are disposed between the first region and the fourth region, and wherein
a periodic structure of the second region is a periodic structure having a phase differing by about 105 degrees from that of a periodic structure of the first region;
a periodic structure of the third region is a periodic structure having a phase differing by about 30 degrees from that of the periodic structure of the second region; and
a periodic structure of the fourth region is a periodic structure having a phase differing by about 105 degrees from that of the periodic structure of the third region.

15. An optical pickup unit comprising a diffraction grating that divides light into at least three luminous fluxes, the optical pickup unit condensing the three luminous fluxes to apply at least three focusing spots, independent of each other, onto a signal side of a medium, the diffraction grating being divided into at least four regions, a first region, a second region, a third region, and a fourth region, wherein
the second region and the third region are disposed between the first region and the fourth region, and wherein
a periodic structure of the second region is a periodic structure having a phase differing by about 120 degrees from that of a periodic structure of the first region,
a periodic structure of the third region is a periodic structure having a phase differing by about 60 degrees from that of the periodic structure of the second region; and
a periodic structure of the fourth region is a periodic structure having a phase differing by about 120 degrees from that of the periodic structure of the third region.

16. An optical pickup unit comprising:
a diffraction grating configured to diffract laser light to generate at least three beams including a main beam of zero order, a sub-beam of +1 order diffraction, and a sub-beam of −1 order diffraction; and
an objective lens configured to condense at least the three beams, to be applied to a signal face of an optical disk, the diffraction grating including a first region, a second region disposed adjacently to the first region in a width direction across a direction in which a periodic structure is repeated, a third region disposed adjacently to the second region in the width direction, and a fourth region disposed adjacently to the third region in the width direction, a periodic structure of the first region being different in phase by less than 180 degrees from a periodic structure of the second region, the periodic structure of the second region being different in phase by less than or equal to 180 degrees from a periodic structure of the third region, the periodic structure of the third region being different in phase by less than 180 degrees from a periodic structure of the fourth region, the periodic structure of the fourth region being different in phase by less than 180 degrees from the periodic structure of the first region, the second region being smaller in width than each of the first region and the fourth region, the third region being smaller in width than each of the first region and the fourth region, the diffraction grating divided into two equal parts in the width direction by a border between the second region and the third region.

17. The optical pickup unit of claim 16, wherein
the first region is substantially equal in width to the fourth region, and
the second region is substantially equal in width to the third region.

18. The optical pickup unit of claim 16, wherein
the diffraction grating is formed in a substantially rectangular sheet shape.

* * * * *